United States Patent
Konrardy et al.

(10) Patent No.: US 11,136,024 B1
(45) Date of Patent: Oct. 5, 2021

(54) DETECTING AND RESPONDING TO AUTONOMOUS ENVIRONMENT INCIDENTS

(71) Applicant: State Farm Mutual Automobile Insurance Company, Bloomington, IL (US)

(72) Inventors: Blake S. Konrardy, San Francisco, CA (US); Gregory L. Hayward, Bloomington, IL (US); Scott Farris, Bloomington, IL (US); Scott T. Christensen, Salem, OR (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 104 days.

(21) Appl. No.: 16/583,512

(22) Filed: Sep. 26, 2019

Related U.S. Application Data

(63) Continuation of application No. 15/409,371, filed on Jan. 18, 2017, now Pat. No. 10,469,282.
(Continued)

(51) Int. Cl.
*B60W 30/095* (2012.01)
*B60R 25/102* (2013.01)
(Continued)

(52) U.S. Cl.
CPC ......... *B60W 30/0956* (2013.01); *B60L 53/36* (2019.02); *B60L 58/12* (2019.02);
(Continued)

(58) Field of Classification Search
None
See application file for complete search history.

(56) References Cited

U.S. PATENT DOCUMENTS

| | | |
|---|---|---|
| 4,386,376 A | 5/1983 | Takimoto et al. |
| 4,833,469 A | 5/1989 | David |

(Continued)

FOREIGN PATENT DOCUMENTS

| | | |
|---|---|---|
| DE | 102010001006 A1 | 7/2011 |
| DE | 102015208358 A1 | 11/2015 |

(Continued)

OTHER PUBLICATIONS

Eriksson et al. "Tuning for Ride Quality in Autonomous Vehicle Application to Linear Quadratic Path Planning Algorithm" Jun. 2015, 75 pages. (Year: 2015).
(Continued)

*Primary Examiner* — Carlos R Ortiz Rodriguez

(57) ABSTRACT

Methods and systems for assessing, detecting, and responding to malfunctions involving components of autonomous vehicles and/or smart homes are described herein. Autonomous operation features and related components can be assessed using direct or indirect data regarding operation. Vehicle collision and/or smart home incident monitoring, damage detection, and responses are also described, with particular focus on the particular challenges associated with incident response for unoccupied vehicles and/or smart homes. Operating data associated with the autonomous vehicle and/or smart home may be received. Within the operating data, a divergence between sensor data from one or more sensors and control data from one or more autonomous operation features may be identified. Based on the divergence, it may be determined that an incident has occurred. Accordingly, a response to the incident may be determined. The response may be implemented by the autonomous vehicle and/or smart home.

20 Claims, 12 Drawing Sheets

Related U.S. Application Data

(60) Provisional application No. 62/286,017, filed on Jan. 22, 2016, provisional application No. 62/287,659, filed on Jan. 27, 2016, provisional application No. 62/302,990, filed on Mar. 3, 2016, provisional application No. 62/303,500, filed on Mar. 4, 2016, provisional application No. 62/312,109, filed on Mar. 23, 2016, provisional application No. 62/349,884, filed on Jun. 14, 2016, provisional application No. 62/351,559, filed on Jun. 17, 2016, provisional application No. 62/373,084, filed on Aug. 10, 2016, provisional application No. 62/376,044, filed on Aug. 17, 2016, provisional application No. 62/380,686, filed on Aug. 29, 2016, provisional application No. 62/381,848, filed on Aug. 31, 2016, provisional application No. 62/406,595, filed on Oct. 11, 2016, provisional application No. 62/406,600, filed on Oct. 11, 2016, provisional application No. 62/406,605, filed on Oct. 11, 2016, provisional application No. 62/406,611, filed on Oct. 11, 2016, provisional application No. 62/415,668, filed on Nov. 1, 2016, provisional application No. 62/415,672, filed on Nov. 1, 2016, provisional application No. 62/415,673, filed on Nov. 1, 2016, provisional application No. 62/415,678, filed on Nov. 1, 2016, provisional application No. 62/418,988, filed on Nov. 8, 2016, provisional application No. 62/418,999, filed on Nov. 8, 2016, provisional application No. 62/419,002, filed on Nov. 8, 2016, provisional application No. 62/419,009, filed on Nov. 8, 2016, provisional application No. 62/419,017, filed on Nov. 8, 2016, provisional application No. 62/419,023, filed on Nov. 8, 2016, provisional application No. 62/424,078, filed on Nov. 18, 2016, provisional application No. 62/424,093, filed on Nov. 18, 2016, provisional application No. 62/428,843, filed on Dec. 1, 2016, provisional application No. 62/430,215, filed on Dec. 5, 2016, provisional application No. 62/434,355, filed on Dec. 14, 2016, provisional application No. 62/434,359, filed on Dec. 14, 2016, provisional application No. 62/434,361, filed on Dec. 14, 2016, provisional application No. 62/434,365, filed on Dec. 14, 2016, provisional application No. 62/434,368, filed on Dec. 14, 2016, provisional application No. 62/434,370, filed on Dec. 14, 2016.

(51) Int. Cl.
| | | |
|---|---|---|
| *B60R 25/10* | (2013.01) | |
| *B60R 25/25* | (2013.01) | |
| *G06F 21/32* | (2013.01) | |
| *B60R 21/0136* | (2006.01) | |
| *B60R 21/34* | (2011.01) | |
| *G05D 1/00* | (2006.01) | |
| *G01C 21/34* | (2006.01) | |
| *G06Q 40/08* | (2012.01) | |
| *B60R 16/023* | (2006.01) | |
| *G07C 5/00* | (2006.01) | |
| *G07C 5/08* | (2006.01) | |
| *G05D 1/02* | (2020.01) | |
| *G08G 1/0965* | (2006.01) | |
| *G08G 1/16* | (2006.01) | |
| *G01C 21/36* | (2006.01) | |
| *G08G 1/00* | (2006.01) | |
| *B60W 40/04* | (2006.01) | |
| *B60L 53/36* | (2019.01) | |
| *B60L 58/12* | (2019.01) | |
| *B60W 10/04* | (2006.01) | |
| *B60W 10/18* | (2012.01) | |
| *B60W 10/20* | (2006.01) | |
| *B60W 30/12* | (2020.01) | |
| *B60W 30/16* | (2020.01) | |
| *B60W 30/18* | (2012.01) | |
| *G01S 19/13* | (2010.01) | |
| *G08G 1/14* | (2006.01) | |
| *G05B 15/02* | (2006.01) | |
| *G08B 25/01* | (2006.01) | |
| *H04L 12/28* | (2006.01) | |
| *G06F 16/2455* | (2019.01) | |
| *B60R 25/04* | (2013.01) | |
| *G06N 20/00* | (2019.01) | |
| *B60R 21/00* | (2006.01) | |
| *B60R 21/01* | (2006.01) | |

(52) U.S. Cl.
CPC ...... *B60R 16/0234* (2013.01); *B60R 21/0136* (2013.01); *B60R 21/34* (2013.01); *B60R 25/04* (2013.01); *B60R 25/10* (2013.01); *B60R 25/102* (2013.01); *B60R 25/252* (2013.01); *B60R 25/255* (2013.01); *B60W 10/04* (2013.01); *B60W 10/18* (2013.01); *B60W 10/20* (2013.01); *B60W 30/12* (2013.01); *B60W 30/16* (2013.01); *B60W 30/18163* (2013.01); *B60W 40/04* (2013.01); *G01C 21/3453* (2013.01); *G01C 21/3461* (2013.01); *G01C 21/3469* (2013.01); *G01C 21/3697* (2013.01); *G01S 19/13* (2013.01); *G05B 15/02* (2013.01); *G05D 1/0011* (2013.01); *G05D 1/0061* (2013.01); *G05D 1/0088* (2013.01); *G05D 1/0212* (2013.01); *G05D 1/0214* (2013.01); *G05D 1/0231* (2013.01); *G05D 1/0255* (2013.01); *G05D 1/0285* (2013.01); *G05D 1/0287* (2013.01); *G05D 1/0289* (2013.01); *G06F 16/2455* (2019.01); *G06F 21/32* (2013.01); *G06Q 40/08* (2013.01); *G07C 5/006* (2013.01); *G07C 5/008* (2013.01); *G07C 5/0808* (2013.01); *G07C 5/0816* (2013.01); *G08B 25/014* (2013.01); *G08G 1/0965* (2013.01); *G08G 1/146* (2013.01); *G08G 1/148* (2013.01); *G08G 1/161* (2013.01); *G08G 1/166* (2013.01); *G08G 1/167* (2013.01); *G08G 1/20* (2013.01); *H04L 12/2803* (2013.01); *H04L 12/2816* (2013.01); *H04L 12/2825* (2013.01); *B60R 2021/0027* (2013.01); *B60R 2021/01013* (2013.01); *B60R 2025/1013* (2013.01); *G05D 2201/0212* (2013.01); *G05D 2201/0213* (2013.01); *G06N 20/00* (2019.01)

(56) References Cited

U.S. PATENT DOCUMENTS

| | | |
|---|---|---|
| 5,214,582 A | 5/1993 | Gray |
| 5,363,298 A | 11/1994 | Survanshi et al. |
| 5,453,939 A | 9/1995 | Hoffman et al. |
| 5,488,353 A | 1/1996 | Kawakami et al. |
| 5,574,641 A | 11/1996 | Kawakami et al. |
| 5,689,241 A | 11/1997 | Clarke et al. |
| 6,151,539 A | 11/2000 | Bergholz et al. |
| 6,271,745 B1 | 8/2001 | Anzai et al. |
| 6,323,761 B1 | 11/2001 | Son |
| 6,353,396 B1 | 3/2002 | Atlas |
| 6,477,177 B1 | 11/2002 | Potts |
| 6,579,233 B2 | 6/2003 | Hursh |

(56) References Cited

U.S. PATENT DOCUMENTS

| | | |
|---|---|---|
| 6,609,051 B2 | 8/2003 | Fiechter et al. |
| 6,701,234 B1 | 3/2004 | Vogelsang |
| 6,727,800 B1 | 4/2004 | Dutu |
| 6,734,685 B2 | 5/2004 | Rudrich |
| 6,754,490 B2 | 6/2004 | Okoro et al. |
| 6,889,137 B1 | 5/2005 | Rychlak |
| 6,944,536 B2 | 9/2005 | Singleton |
| 6,983,313 B1 | 1/2006 | Korkea-Aho |
| 7,102,496 B1 | 9/2006 | Ernst et al. |
| 7,266,532 B2 | 9/2007 | Sutton et al. |
| 7,290,275 B2 | 10/2007 | Baudoin et al. |
| 7,349,860 B1 | 3/2008 | Wallach et al. |
| 7,423,540 B2 | 9/2008 | Kisacanin |
| 7,499,774 B2 | 3/2009 | Barrett et al. |
| 7,596,242 B2 | 9/2009 | Breed et al. |
| 7,676,062 B2 | 3/2010 | Breed et al. |
| 7,783,426 B2 | 8/2010 | Kato et al. |
| 7,791,503 B2 | 9/2010 | Breed et al. |
| 7,797,107 B2 | 9/2010 | Shiller |
| 7,813,888 B2 | 10/2010 | Vian et al. |
| 7,877,275 B2 | 1/2011 | Ball |
| 7,973,674 B2 | 7/2011 | Bell et al. |
| 7,983,802 B2 | 7/2011 | Breed |
| 8,068,983 B2 | 11/2011 | Vian et al. |
| 8,078,334 B2 | 12/2011 | Goodrich |
| 8,106,769 B1 | 1/2012 | Maroney et al. |
| 8,108,655 B2 | 1/2012 | Abernathy et al. |
| 8,123,686 B2 | 2/2012 | Fennell et al. |
| 8,139,109 B2 | 3/2012 | Schmiedel et al. |
| 8,140,249 B2 | 3/2012 | Hessling et al. |
| 8,164,432 B2 | 4/2012 | Broggi et al. |
| 8,255,144 B2 | 8/2012 | Breed et al. |
| 8,275,417 B2 | 9/2012 | Flynn |
| 8,332,242 B1 | 12/2012 | Medina, III |
| 8,437,966 B2 | 5/2013 | Connolly et al. |
| 8,520,695 B1 | 8/2013 | Rubin et al. |
| 8,605,947 B2 | 12/2013 | Zhang et al. |
| 8,618,922 B2 | 12/2013 | Debouk et al. |
| 8,634,980 B1 | 1/2014 | Urmson et al. |
| 8,660,734 B2 | 2/2014 | Zhu et al. |
| 8,725,311 B1 | 5/2014 | Breed |
| 8,725,472 B2 | 5/2014 | Hagelin et al. |
| 8,731,977 B1 | 5/2014 | Hardin et al. |
| 8,818,608 B2 | 8/2014 | Cullinane et al. |
| 8,825,258 B2 | 9/2014 | Cullinane et al. |
| 8,868,288 B2 | 10/2014 | Plante et al. |
| 8,874,301 B1 | 10/2014 | Rao et al. |
| 8,874,305 B2 | 10/2014 | Dolgov et al. |
| 8,892,271 B2 | 11/2014 | Breed |
| 8,902,054 B2 | 12/2014 | Morris |
| 8,909,428 B1 | 12/2014 | Lombrozo |
| 8,917,182 B2 | 12/2014 | Chang et al. |
| 8,928,495 B2 | 1/2015 | Hassib et al. |
| 8,935,036 B1 | 1/2015 | Christensen et al. |
| 8,954,205 B2 | 2/2015 | Sagar et al. |
| 8,954,217 B1 | 2/2015 | Montemerlo et al. |
| 8,972,100 B2 | 3/2015 | Mullen et al. |
| 8,989,959 B2 | 3/2015 | Plante et al. |
| 8,996,228 B1 | 3/2015 | Ferguson et al. |
| 8,996,240 B2 | 3/2015 | Plante |
| 9,008,952 B2 | 4/2015 | Caskey et al. |
| 9,020,876 B2 | 4/2015 | Rakshit |
| 9,063,543 B2 | 6/2015 | An et al. |
| 9,075,413 B2 | 7/2015 | Cullinane et al. |
| 9,081,650 B1 | 7/2015 | Brinkmann et al. |
| 9,098,080 B2 | 8/2015 | Norris et al. |
| 9,123,250 B2 | 9/2015 | Duncan et al. |
| 9,144,389 B2 | 9/2015 | Srinivasan et al. |
| 9,151,692 B2 | 10/2015 | Breed |
| 9,177,475 B2 | 11/2015 | Sellschopp |
| 9,182,764 B1 | 11/2015 | Kolhouse et al. |
| 9,182,942 B2 | 11/2015 | Kelly et al. |
| 9,188,985 B1 | 11/2015 | Hobbs et al. |
| 9,194,168 B1 | 11/2015 | Lu et al. |
| 9,194,769 B1 | 11/2015 | Senibi et al. |
| 9,205,805 B2 | 12/2015 | Cudak et al. |
| 9,205,842 B1 | 12/2015 | Fields et al. |
| 9,221,396 B1 | 12/2015 | Zhu et al. |
| 9,224,293 B2 | 12/2015 | Taylor |
| 9,235,211 B2 | 1/2016 | Davidsson et al. |
| 9,308,891 B2 | 4/2016 | Cudak et al. |
| 9,311,271 B2 | 4/2016 | Wright |
| 9,342,074 B2 | 5/2016 | Dolgov et al. |
| 9,352,752 B2 | 5/2016 | Cullinane et al. |
| 9,361,599 B1 | 6/2016 | Biemer et al. |
| 9,371,072 B1 | 6/2016 | Sisbot |
| 9,381,916 B1 | 7/2016 | Zhu et al. |
| 9,390,452 B1 | 7/2016 | Biemer et al. |
| 9,390,567 B2 | 7/2016 | Kim et al. |
| 9,399,445 B2 | 7/2016 | Abou et al. |
| 9,401,054 B2 | 7/2016 | Fountain et al. |
| 9,406,177 B2 | 8/2016 | Attard et al. |
| 9,424,607 B2 | 8/2016 | Bowers et al. |
| 9,440,657 B1 | 9/2016 | Fields et al. |
| 9,443,152 B2 | 9/2016 | Atsmon et al. |
| 9,443,207 B2 | 9/2016 | Przybylko et al. |
| 9,443,436 B2 | 9/2016 | Scheidt |
| 9,475,496 B2 | 10/2016 | Attard et al. |
| 9,477,990 B1 | 10/2016 | Binion et al. |
| 9,478,150 B1 | 10/2016 | Fields et al. |
| 9,489,635 B1 | 11/2016 | Zhu |
| 9,495,874 B1 | 11/2016 | Zhu et al. |
| 9,511,767 B1 | 12/2016 | Okumura et al. |
| 9,511,779 B2 | 12/2016 | Cullinane et al. |
| 9,517,771 B2 | 12/2016 | Attard et al. |
| 9,524,648 B1 | 12/2016 | Gopalakrishnan et al. |
| 9,529,361 B2 | 12/2016 | You et al. |
| 9,530,333 B1 | 12/2016 | Fields et al. |
| 9,542,846 B2 | 1/2017 | Zeng et al. |
| 9,557,741 B1 | 1/2017 | Elie et al. |
| 9,558,667 B2 | 1/2017 | Bowers et al. |
| 9,566,959 B2 | 2/2017 | Breuer et al. |
| 9,587,952 B1 | 3/2017 | Slusar |
| 9,594,373 B2 | 3/2017 | Solyom et al. |
| 9,604,652 B2 | 3/2017 | Strauss |
| 9,632,502 B1 | 4/2017 | Levinson et al. |
| 9,633,318 B2 | 4/2017 | Plante |
| 9,646,428 B1 | 5/2017 | Konrardy et al. |
| 9,650,051 B2 | 5/2017 | Hoye et al. |
| 9,656,606 B1 | 5/2017 | Vose et al. |
| 9,663,033 B2 | 5/2017 | Bharwani |
| 9,663,112 B2 | 5/2017 | Abou-Nasr et al. |
| 9,665,101 B1 | 5/2017 | Templeton |
| 9,679,487 B1 | 6/2017 | Hayward |
| 9,688,288 B1 | 6/2017 | Lathrop et al. |
| 9,692,778 B1 | 6/2017 | Mohanty |
| 9,697,733 B1 | 7/2017 | Penilla et al. |
| 9,707,942 B2 | 7/2017 | Cheatham et al. |
| 9,712,549 B2 | 7/2017 | Almurayh |
| 9,715,711 B1 | 7/2017 | Konrardy et al. |
| 9,718,405 B1 | 8/2017 | Englander et al. |
| 9,720,415 B2 | 8/2017 | Levinson et al. |
| 9,720,419 B2 | 8/2017 | O'Neill et al. |
| 9,725,036 B1 | 8/2017 | Tarte |
| 9,727,920 B1 | 8/2017 | Healy et al. |
| 9,734,685 B2 | 8/2017 | Fields et al. |
| 9,753,390 B2 | 9/2017 | Kabai |
| 9,754,325 B1 | 9/2017 | Konrardy et al. |
| 9,754,424 B2 | 9/2017 | Ling et al. |
| 9,754,490 B2 | 9/2017 | Kentley et al. |
| 9,760,702 B1 | 9/2017 | Kursun et al. |
| 9,761,139 B2 | 9/2017 | Acker et al. |
| 9,766,625 B2 | 9/2017 | Boroditsky et al. |
| 9,767,516 B1 | 9/2017 | Konrardy et al. |
| 9,773,281 B1 | 9/2017 | Hanson |
| 9,792,656 B1 | 10/2017 | Konrardy et al. |
| 9,805,423 B1 | 10/2017 | Konrardy et al. |
| 9,805,601 B1 | 10/2017 | Fields et al. |
| 9,816,827 B1 | 11/2017 | Slusar |
| 9,817,400 B1 | 11/2017 | Poeppel et al. |
| 9,842,496 B1 | 12/2017 | Hayward |
| 9,846,978 B1 | 12/2017 | Tseng et al. |
| 9,847,033 B1 | 12/2017 | Carmack et al. |
| 9,852,475 B1 | 12/2017 | Konrardy et al. |

(56) References Cited

U.S. PATENT DOCUMENTS

| | | |
|---|---|---|
| 9,858,621 B1 | 1/2018 | Konrardy et al. |
| 9,868,394 B1 | 1/2018 | Fields et al. |
| 9,870,649 B1 | 1/2018 | Fields et al. |
| 9,884,611 B2 | 2/2018 | Abou et al. |
| 9,892,567 B2 | 2/2018 | Binion et al. |
| 9,904,928 B1 | 2/2018 | Leise |
| 9,939,279 B2 | 4/2018 | Pan et al. |
| 9,940,676 B1 | 4/2018 | Biemer |
| 9,940,834 B1 | 4/2018 | Konrardy et al. |
| 9,944,282 B1 | 4/2018 | Fields et al. |
| 9,944,404 B1 | 4/2018 | Gentry |
| 9,946,531 B1 | 4/2018 | Fields et al. |
| 9,948,477 B2 | 4/2018 | Marten |
| 9,972,054 B1 | 5/2018 | Konrardy et al. |
| 9,986,404 B2 | 5/2018 | Mehta et al. |
| 10,007,263 B1 | 6/2018 | Fields et al. |
| 10,013,697 B1 | 7/2018 | Cote et al. |
| 10,019,901 B1 | 7/2018 | Fields et al. |
| 10,026,130 B1 | 7/2018 | Konrardy et al. |
| 10,026,237 B1 | 7/2018 | Fields et al. |
| 10,042,359 B1 | 8/2018 | Konrardy et al. |
| 10,042,364 B1 | 8/2018 | Hayward |
| 10,043,323 B1 | 8/2018 | Konrardy et al. |
| 10,049,505 B1 | 8/2018 | Harvey et al. |
| 10,055,794 B1 | 8/2018 | Konrardy et al. |
| 10,065,517 B1 | 9/2018 | Konrardy et al. |
| 10,086,782 B1 | 10/2018 | Konrardy et al. |
| 10,089,693 B1 | 10/2018 | Konrardy et al. |
| 10,102,586 B1 | 10/2018 | Marlow et al. |
| 10,102,590 B1 | 10/2018 | Farnsworth et al. |
| 10,106,083 B1 | 10/2018 | Fields et al. |
| 10,134,278 B1 | 11/2018 | Konrardy et al. |
| 10,134,280 B1 | 11/2018 | You |
| 10,156,848 B1 | 12/2018 | Konrardy et al. |
| 10,157,423 B1 | 12/2018 | Fields et al. |
| 10,163,350 B1 | 12/2018 | Fields et al. |
| 10,166,994 B1 | 1/2019 | Fields et al. |
| 10,168,703 B1 | 1/2019 | Konrardy et al. |
| 10,181,161 B1 | 1/2019 | Konrardy et al. |
| 10,185,997 B1 | 1/2019 | Konrardy et al. |
| 10,185,998 B1 | 1/2019 | Konrardy et al. |
| 10,185,999 B1 | 1/2019 | Konrardy et al. |
| 10,295,363 B1 | 5/2019 | Konrardy et al. |
| 10,359,782 B1 | 7/2019 | Hayward |
| 10,414,376 B1 | 9/2019 | Ghannam et al. |
| 10,416,205 B2 | 9/2019 | Marti et al. |
| 10,482,689 B2 | 11/2019 | McAfee et al. |
| 10,543,838 B2 | 1/2020 | Kentley-Klay et al. |
| 10,599,155 B1 | 3/2020 | Konrardy et al. |
| 10,657,597 B1 | 5/2020 | Billman et al. |
| 10,679,296 B1 | 6/2020 | Devereaux et al. |
| 10,755,566 B2 | 8/2020 | Tennent et al. |
| 10,824,145 B1 | 11/2020 | Konrardy et al. |
| 2002/0049535 A1 | 4/2002 | Rigo et al. |
| 2002/0091483 A1 | 7/2002 | Douet |
| 2002/0099527 A1 | 7/2002 | Bomar et al. |
| 2002/0103622 A1 | 8/2002 | Burge |
| 2002/0103678 A1 | 8/2002 | Burkhalter et al. |
| 2002/0128751 A1 | 9/2002 | Engstrom et al. |
| 2002/0135618 A1 | 9/2002 | Maes et al. |
| 2003/0061116 A1 | 3/2003 | Tago |
| 2003/0095039 A1 | 5/2003 | Shimomura et al. |
| 2003/0102997 A1 | 6/2003 | Levin et al. |
| 2003/0112133 A1 | 6/2003 | Webb et al. |
| 2003/0139948 A1 | 7/2003 | Strech |
| 2003/0146850 A1 | 8/2003 | Fallenstein |
| 2003/0182042 A1 | 9/2003 | Watson et al. |
| 2003/0182183 A1 | 9/2003 | Pribe |
| 2004/0019539 A1 | 1/2004 | Raman et al. |
| 2004/0099462 A1 | 5/2004 | Fuertsch et al. |
| 2004/0169034 A1 | 9/2004 | Park |
| 2004/0252027 A1 | 12/2004 | Torkkola et al. |
| 2005/0007438 A1 | 1/2005 | Busch et al. |
| 2005/0046584 A1 | 3/2005 | Breed |
| 2005/0055249 A1 | 3/2005 | Helitzer et al. |
| 2005/0059151 A1 | 3/2005 | Bosch |
| 2005/0065678 A1 | 3/2005 | Smith et al. |
| 2005/0071052 A1 | 3/2005 | Coletrane et al. |
| 2005/0071202 A1 | 3/2005 | Kendrick |
| 2005/0080519 A1 | 4/2005 | Oesterling et al. |
| 2005/0088291 A1 | 4/2005 | Blanco et al. |
| 2005/0088521 A1 | 4/2005 | Blanco et al. |
| 2005/0093684 A1 | 5/2005 | Cunnien |
| 2005/0154513 A1 | 7/2005 | Matsunaga et al. |
| 2005/0216136 A1 | 9/2005 | Lengning et al. |
| 2005/0237784 A1 | 10/2005 | Kang |
| 2005/0246256 A1 | 11/2005 | Gastineau et al. |
| 2006/0052929 A1 | 3/2006 | Bastian et al. |
| 2006/0055565 A1 | 3/2006 | Kawamata et al. |
| 2006/0089766 A1 | 4/2006 | Allard et al. |
| 2006/0149461 A1 | 7/2006 | Rowley et al. |
| 2006/0294514 A1 | 12/2006 | Bauchot et al. |
| 2007/0048707 A1 | 3/2007 | Caamano et al. |
| 2007/0093947 A1 | 4/2007 | Gould et al. |
| 2007/0124599 A1 | 5/2007 | Morita et al. |
| 2007/0159354 A1 | 7/2007 | Rosenberg |
| 2007/0203866 A1 | 8/2007 | Kidd et al. |
| 2007/0208498 A1 | 9/2007 | Barker et al. |
| 2007/0265540 A1 | 11/2007 | Fuwamoto et al. |
| 2007/0282489 A1 | 12/2007 | Boss et al. |
| 2008/0028974 A1 | 2/2008 | Bianco |
| 2008/0097796 A1 | 4/2008 | Birchall |
| 2008/0114530 A1 | 5/2008 | Petrisor et al. |
| 2008/0147265 A1 | 6/2008 | Breed |
| 2008/0161989 A1 | 7/2008 | Breed |
| 2008/0167821 A1 | 7/2008 | Breed |
| 2008/0258885 A1 | 10/2008 | Akhan |
| 2008/0294690 A1 | 11/2008 | McClellan et al. |
| 2008/0300733 A1 | 12/2008 | Rasshofer et al. |
| 2008/0313007 A1 | 12/2008 | Callahan et al. |
| 2009/0005979 A1 | 1/2009 | Nakao et al. |
| 2009/0027188 A1 | 1/2009 | Saban |
| 2009/0081923 A1 | 3/2009 | Dooley et al. |
| 2009/0085770 A1 | 4/2009 | Mergen |
| 2009/0106135 A1 | 4/2009 | Steiger |
| 2009/0140887 A1 | 6/2009 | Breed et al. |
| 2009/0174573 A1 | 7/2009 | Smith |
| 2009/0228160 A1 | 9/2009 | Eklund et al. |
| 2009/0254240 A1 | 10/2009 | Olsen et al. |
| 2010/0042318 A1 | 2/2010 | Kaplan et al. |
| 2010/0063672 A1 | 3/2010 | Anderson |
| 2010/0085171 A1 | 4/2010 | Do |
| 2010/0094532 A1 | 4/2010 | Vorona |
| 2010/0106346 A1 | 4/2010 | Badli et al. |
| 2010/0143872 A1 | 6/2010 | Lankteee |
| 2010/0148923 A1 | 6/2010 | Takizawa |
| 2010/0157255 A1 | 6/2010 | Togino |
| 2010/0164737 A1 | 7/2010 | Lu et al. |
| 2010/0198491 A1 | 8/2010 | Mays |
| 2010/0253541 A1 | 10/2010 | Seder et al. |
| 2010/0256836 A1 | 10/2010 | Mudalige |
| 2010/0274629 A1 | 10/2010 | Walker et al. |
| 2010/0286845 A1 | 11/2010 | Rekow et al. |
| 2010/0289632 A1 | 11/2010 | Seder et al. |
| 2011/0009093 A1 | 1/2011 | Self et al. |
| 2011/0010042 A1 | 1/2011 | Boulet et al. |
| 2011/0043350 A1 | 2/2011 | Ben David |
| 2011/0043377 A1 | 2/2011 | McGrath et al. |
| 2011/0077809 A1 | 3/2011 | Leary |
| 2011/0084824 A1 | 4/2011 | Tewari et al. |
| 2011/0093134 A1 | 4/2011 | Emanuel et al. |
| 2011/0109462 A1 | 5/2011 | Deng et al. |
| 2011/0118907 A1 | 5/2011 | Elkins |
| 2011/0128161 A1 | 6/2011 | Bae et al. |
| 2011/0140919 A1 | 6/2011 | Hara et al. |
| 2011/0144854 A1 | 6/2011 | Cramer et al. |
| 2011/0161116 A1 | 6/2011 | Peak et al. |
| 2011/0161119 A1 | 6/2011 | Collins |
| 2011/0187559 A1 | 8/2011 | Applebaum |
| 2011/0190972 A1 | 8/2011 | Timmons et al. |
| 2011/0224865 A1 | 9/2011 | Gordon et al. |
| 2011/0224900 A1 | 9/2011 | Hiruta et al. |
| 2011/0251751 A1 | 10/2011 | Knight |
| 2011/0270513 A1 | 11/2011 | Shida |

(56) References Cited

U.S. PATENT DOCUMENTS

| | | |
|---|---|---|
| 2011/0279263 A1 | 11/2011 | Rodkey et al. |
| 2011/0288770 A1 | 11/2011 | Greasby |
| 2011/0295546 A1 | 12/2011 | Khazanov |
| 2011/0307336 A1 | 12/2011 | Smirnov et al. |
| 2012/0013582 A1 | 1/2012 | Inoue et al. |
| 2012/0019001 A1 | 1/2012 | Hede et al. |
| 2012/0053824 A1 | 3/2012 | Nam et al. |
| 2012/0056758 A1 | 3/2012 | Kuhlman et al. |
| 2012/0059227 A1 | 3/2012 | Friedlander et al. |
| 2012/0072214 A1 | 3/2012 | Cox et al. |
| 2012/0083964 A1 | 4/2012 | Montemerlo et al. |
| 2012/0143391 A1 | 6/2012 | Gee |
| 2012/0191373 A1 | 7/2012 | Soles et al. |
| 2012/0200427 A1 | 8/2012 | Kamata |
| 2012/0203418 A1 | 8/2012 | Braennstroem et al. |
| 2012/0209692 A1 | 8/2012 | Bennett et al. |
| 2012/0239242 A1 | 9/2012 | Uehara |
| 2012/0239281 A1 | 9/2012 | Hinz |
| 2012/0239821 A1 | 9/2012 | Hozumi |
| 2012/0256769 A1 | 10/2012 | Satpathy |
| 2012/0271500 A1 | 10/2012 | Tsimhoni et al. |
| 2012/0277949 A1 | 11/2012 | Ghimire et al. |
| 2012/0286974 A1 | 11/2012 | Claussen et al. |
| 2012/0289819 A1 | 11/2012 | Snow |
| 2012/0303177 A1 | 11/2012 | Jauch et al. |
| 2012/0306663 A1 | 12/2012 | Mudalige |
| 2013/0030606 A1 | 1/2013 | Mudalige et al. |
| 2013/0066751 A1 | 3/2013 | Glazer et al. |
| 2013/0097128 A1 | 4/2013 | Suzuki et al. |
| 2013/0121239 A1 | 5/2013 | Hicks, III |
| 2013/0131907 A1 | 5/2013 | Green et al. |
| 2013/0151027 A1 | 6/2013 | Petrucci et al. |
| 2013/0151058 A1 | 6/2013 | Zagorski et al. |
| 2013/0190966 A1 | 7/2013 | Collins et al. |
| 2013/0191189 A1 | 7/2013 | Aparicio et al. |
| 2013/0226391 A1 | 8/2013 | Nordbruch et al. |
| 2013/0237194 A1 | 9/2013 | Davis |
| 2013/0245857 A1 | 9/2013 | Gariepy et al. |
| 2013/0245883 A1 | 9/2013 | Humphrey |
| 2013/0274940 A1 | 10/2013 | Wei et al. |
| 2013/0278442 A1 | 10/2013 | Rubin et al. |
| 2013/0317786 A1 | 11/2013 | Kuhn |
| 2014/0004734 A1 | 1/2014 | Hoang |
| 2014/0006660 A1 | 1/2014 | Frei et al. |
| 2014/0018940 A1 | 1/2014 | Casilli |
| 2014/0019170 A1 | 1/2014 | Coleman et al. |
| 2014/0052479 A1 | 2/2014 | Kawamura |
| 2014/0074345 A1 | 3/2014 | Gabay et al. |
| 2014/0095009 A1 | 4/2014 | Oshima et al. |
| 2014/0104405 A1 | 4/2014 | Weidl et al. |
| 2014/0129053 A1 | 5/2014 | Kleve et al. |
| 2014/0129301 A1 | 5/2014 | Van et al. |
| 2014/0130035 A1 | 5/2014 | Desai et al. |
| 2014/0135598 A1 | 5/2014 | Weidl et al. |
| 2014/0136242 A1 | 5/2014 | Weekes et al. |
| 2014/0137257 A1 | 5/2014 | Martinez et al. |
| 2014/0148988 A1 | 5/2014 | Lathrop et al. |
| 2014/0149148 A1 | 5/2014 | Luciani |
| 2014/0152422 A1 | 6/2014 | Breed |
| 2014/0156176 A1 | 6/2014 | Caskey et al. |
| 2014/0163768 A1 | 6/2014 | Purdy et al. |
| 2014/0188322 A1 | 7/2014 | Oh et al. |
| 2014/0207325 A1 | 7/2014 | Mudalige et al. |
| 2014/0207707 A1 | 7/2014 | Na et al. |
| 2014/0218520 A1 | 8/2014 | Teich et al. |
| 2014/0221781 A1 | 8/2014 | Schrauf et al. |
| 2014/0250515 A1 | 9/2014 | Jakobsson |
| 2014/0266655 A1 | 9/2014 | Palan |
| 2014/0272811 A1 | 9/2014 | Palan |
| 2014/0278571 A1 | 9/2014 | Mullen et al. |
| 2014/0306799 A1 | 10/2014 | Ricci |
| 2014/0306814 A1 | 10/2014 | Ricci |
| 2014/0309870 A1 | 10/2014 | Ricci et al. |
| 2014/0337930 A1 | 11/2014 | Hoyos et al. |
| 2014/0343972 A1 | 11/2014 | Fernandes et al. |
| 2014/0350970 A1 | 11/2014 | Schumann et al. |
| 2014/0358592 A1 | 12/2014 | Wedig et al. |
| 2014/0379201 A1 | 12/2014 | Wanami et al. |
| 2014/0380264 A1 | 12/2014 | Misra et al. |
| 2015/0006278 A1 | 1/2015 | Di et al. |
| 2015/0019266 A1 | 1/2015 | Stempora |
| 2015/0025917 A1 | 1/2015 | Stempora |
| 2015/0032581 A1 | 1/2015 | Blackhurst et al. |
| 2015/0035685 A1 | 2/2015 | Strickland et al. |
| 2015/0039350 A1 | 2/2015 | Martin et al. |
| 2015/0039397 A1 | 2/2015 | Fuchs |
| 2015/0045983 A1 | 2/2015 | Fraser et al. |
| 2015/0046022 A1 | 2/2015 | Bai et al. |
| 2015/0051787 A1 | 2/2015 | Doughty et al. |
| 2015/0066284 A1 | 3/2015 | Yopp |
| 2015/0073834 A1 | 3/2015 | Gurenko et al. |
| 2015/0081202 A1 | 3/2015 | Levin |
| 2015/0088358 A1 | 3/2015 | Yopp |
| 2015/0100189 A1 | 4/2015 | Tellis et al. |
| 2015/0100190 A1 | 4/2015 | Yopp |
| 2015/0100191 A1 | 4/2015 | Yopp |
| 2015/0109450 A1 | 4/2015 | Walker |
| 2015/0113521 A1 | 4/2015 | Suzuki et al. |
| 2015/0120082 A1 | 4/2015 | Cuddihy et al. |
| 2015/0128123 A1 | 5/2015 | Eling |
| 2015/0149018 A1 | 5/2015 | Attard et al. |
| 2015/0153733 A1 | 6/2015 | Ohmura et al. |
| 2015/0161564 A1 | 6/2015 | Sweeney et al. |
| 2015/0161738 A1 | 6/2015 | Stempora |
| 2015/0169311 A1 | 6/2015 | Dickerson et al. |
| 2015/0170290 A1 | 6/2015 | Bowne et al. |
| 2015/0178997 A1 | 6/2015 | Ohsaki |
| 2015/0179062 A1 | 6/2015 | Ralston et al. |
| 2015/0187019 A1 | 7/2015 | Fernandes et al. |
| 2015/0187194 A1 | 7/2015 | Hypolite et al. |
| 2015/0189241 A1 | 7/2015 | Kim et al. |
| 2015/0193219 A1 | 7/2015 | Pandya et al. |
| 2015/0193220 A1 | 7/2015 | Rork et al. |
| 2015/0203107 A1 | 7/2015 | Lippman |
| 2015/0203113 A1 | 7/2015 | Duncan et al. |
| 2015/0229885 A1 | 8/2015 | Offenhaeuser |
| 2015/0234384 A1 | 8/2015 | Taira et al. |
| 2015/0235323 A1 | 8/2015 | Oldham |
| 2015/0235480 A1 | 8/2015 | Cudak et al. |
| 2015/0239436 A1 | 8/2015 | Kanai et al. |
| 2015/0241853 A1 | 8/2015 | Vechart et al. |
| 2015/0246672 A1 | 9/2015 | Pilutti et al. |
| 2015/0266489 A1 | 9/2015 | Solyom et al. |
| 2015/0266490 A1 | 9/2015 | Coelingh et al. |
| 2015/0271201 A1 | 9/2015 | Ruvio et al. |
| 2015/0274072 A1 | 10/2015 | Croteau et al. |
| 2015/0293534 A1 | 10/2015 | Takamatsu |
| 2015/0307110 A1 | 10/2015 | Grewe et al. |
| 2015/0310758 A1 | 10/2015 | Daddona et al. |
| 2015/0332407 A1 | 11/2015 | Wilson et al. |
| 2015/0334545 A1 | 11/2015 | Maier et al. |
| 2015/0336502 A1 | 11/2015 | Hillis et al. |
| 2015/0338852 A1 | 11/2015 | Ramanujam |
| 2015/0339928 A1 | 11/2015 | Ramanujam |
| 2015/0343947 A1 | 12/2015 | Bernico et al. |
| 2015/0346718 A1 | 12/2015 | Stenneth |
| 2015/0346727 A1 | 12/2015 | Ramanujam |
| 2015/0348335 A1 | 12/2015 | Ramanujam |
| 2015/0356797 A1 | 12/2015 | McBride et al. |
| 2015/0382085 A1 | 12/2015 | Lawrie-Fussey et al. |
| 2016/0005130 A1 | 1/2016 | Devereaux et al. |
| 2016/0014252 A1 | 1/2016 | Biderman et al. |
| 2016/0019790 A1 | 1/2016 | Tobolski et al. |
| 2016/0025027 A1 | 1/2016 | Mentele |
| 2016/0034363 A1 | 2/2016 | Poledna |
| 2016/0042463 A1 | 2/2016 | Gillespie |
| 2016/0042644 A1 | 2/2016 | Velusamy |
| 2016/0042650 A1 | 2/2016 | Stenneth |
| 2016/0055750 A1 | 2/2016 | Linder et al. |
| 2016/0068103 A1 | 3/2016 | McNew et al. |
| 2016/0069694 A1 | 3/2016 | Tao et al. |
| 2016/0071418 A1 | 3/2016 | Oshida et al. |
| 2016/0078403 A1 | 3/2016 | Sethi et al. |
| 2016/0083285 A1 | 3/2016 | De et al. |

(56) References Cited

U.S. PATENT DOCUMENTS

| | | |
|---|---|---|
| 2016/0086393 A1 | 3/2016 | Collins et al. |
| 2016/0098561 A1 | 4/2016 | Keller et al. |
| 2016/0104250 A1 | 4/2016 | Allen et al. |
| 2016/0112445 A1 | 4/2016 | Abramowitz |
| 2016/0116913 A1 | 4/2016 | Niles |
| 2016/0117871 A1 | 4/2016 | McClellan et al. |
| 2016/0117928 A1 | 4/2016 | Hodges et al. |
| 2016/0125735 A1 | 5/2016 | Tuukkanen |
| 2016/0129883 A1 | 5/2016 | Penilla et al. |
| 2016/0129917 A1 | 5/2016 | Gariepy et al. |
| 2016/0140783 A1 | 5/2016 | Catt et al. |
| 2016/0140784 A1 | 5/2016 | Akanuma et al. |
| 2016/0147226 A1 | 5/2016 | Akselrod et al. |
| 2016/0153806 A1 | 6/2016 | Ciasulli et al. |
| 2016/0163217 A1 | 6/2016 | Harkness |
| 2016/0167652 A1 | 6/2016 | Slusar |
| 2016/0171521 A1 | 6/2016 | Ramirez et al. |
| 2016/0180610 A1 | 6/2016 | Ganguli et al. |
| 2016/0187127 A1 | 6/2016 | Purohit et al. |
| 2016/0187368 A1 | 6/2016 | Modi et al. |
| 2016/0189303 A1 | 6/2016 | Fuchs |
| 2016/0203560 A1 | 7/2016 | Parameshwaran |
| 2016/0221575 A1 | 8/2016 | Posch et al. |
| 2016/0231746 A1 | 8/2016 | Hazelton et al. |
| 2016/0236638 A1 | 8/2016 | Lavie et al. |
| 2016/0239921 A1 | 8/2016 | Bray et al. |
| 2016/0248598 A1 | 8/2016 | Lin et al. |
| 2016/0255154 A1 | 9/2016 | Kim et al. |
| 2016/0272219 A1 | 9/2016 | Ketfi-Cherif et al. |
| 2016/0275790 A1 | 9/2016 | Kang et al. |
| 2016/0282874 A1 | 9/2016 | Kurata et al. |
| 2016/0285907 A1 | 9/2016 | Nguyen et al. |
| 2016/0291153 A1 | 10/2016 | Mossau et al. |
| 2016/0292679 A1 | 10/2016 | Kolin et al. |
| 2016/0301698 A1 | 10/2016 | Katara et al. |
| 2016/0303969 A1 | 10/2016 | Akula |
| 2016/0304027 A1 | 10/2016 | Di et al. |
| 2016/0304038 A1 | 10/2016 | Chen et al. |
| 2016/0304091 A1 | 10/2016 | Remes |
| 2016/0313132 A1 | 10/2016 | Larroy |
| 2016/0314224 A1 | 10/2016 | Wei et al. |
| 2016/0321674 A1 | 11/2016 | Lux |
| 2016/0323233 A1 | 11/2016 | Song et al. |
| 2016/0343249 A1 | 11/2016 | Gao et al. |
| 2016/0347329 A1 | 12/2016 | Zelman et al. |
| 2016/0358497 A1 | 12/2016 | Nguyen et al. |
| 2016/0371977 A1 | 12/2016 | Wingate et al. |
| 2017/0001637 A1 | 1/2017 | Nguyen Van |
| 2017/0004421 A1 | 1/2017 | Gatson et al. |
| 2017/0004710 A1 | 1/2017 | Dozono et al. |
| 2017/0008487 A1 | 1/2017 | Ur et al. |
| 2017/0015263 A1 | 1/2017 | Makled et al. |
| 2017/0017734 A1 | 1/2017 | Groh et al. |
| 2017/0023945 A1 | 1/2017 | Cavalcanti et al. |
| 2017/0024938 A1 | 1/2017 | Lindsay |
| 2017/0036678 A1 | 2/2017 | Takamatsu |
| 2017/0038773 A1 | 2/2017 | Gordon et al. |
| 2017/0043780 A1 | 2/2017 | Yoon |
| 2017/0061712 A1 | 3/2017 | Li et al. |
| 2017/0066452 A1 | 3/2017 | Scofield |
| 2017/0067764 A1 | 3/2017 | Skupin et al. |
| 2017/0069144 A1 | 3/2017 | Lawrie-Fussey et al. |
| 2017/0072967 A1 | 3/2017 | Fendt et al. |
| 2017/0076599 A1 | 3/2017 | Gupta et al. |
| 2017/0076606 A1 | 3/2017 | Gupta et al. |
| 2017/0080900 A1 | 3/2017 | Huennekens et al. |
| 2017/0084175 A1 | 3/2017 | Sedlik et al. |
| 2017/0086028 A1 | 3/2017 | Hwang et al. |
| 2017/0106876 A1 | 4/2017 | Gordon et al. |
| 2017/0108870 A1 | 4/2017 | Miller et al. |
| 2017/0116794 A1 | 4/2017 | Gortsas |
| 2017/0120761 A1 | 5/2017 | Kapadia et al. |
| 2017/0120803 A1 | 5/2017 | Kentley et al. |
| 2017/0123421 A1 | 5/2017 | Kentley et al. |
| 2017/0123428 A1 | 5/2017 | Levinson et al. |
| 2017/0136902 A1 | 5/2017 | Ricci |
| 2017/0139412 A1 | 5/2017 | Keohane et al. |
| 2017/0147722 A1 | 5/2017 | Greenwood |
| 2017/0148102 A1 | 5/2017 | Franke et al. |
| 2017/0148324 A1 | 5/2017 | High et al. |
| 2017/0154479 A1 | 6/2017 | Kim |
| 2017/0168493 A1 | 6/2017 | Miller et al. |
| 2017/0169627 A1 | 6/2017 | Kim et al. |
| 2017/0176641 A1 | 6/2017 | Zhu et al. |
| 2017/0190331 A1 | 7/2017 | Gupta et al. |
| 2017/0192428 A1 | 7/2017 | Vogt et al. |
| 2017/0200367 A1 | 7/2017 | Mielenz |
| 2017/0212511 A1 | 7/2017 | Paiva et al. |
| 2017/0234689 A1 | 8/2017 | Gibson et al. |
| 2017/0236210 A1 | 8/2017 | Kumar et al. |
| 2017/0249839 A1 | 8/2017 | Becker et al. |
| 2017/0249844 A1 | 8/2017 | Perkins et al. |
| 2017/0270490 A1 | 9/2017 | Penilla et al. |
| 2017/0270617 A1 | 9/2017 | Fernandes et al. |
| 2017/0274897 A1 | 9/2017 | Rink et al. |
| 2017/0278312 A1 | 9/2017 | Minster et al. |
| 2017/0297568 A1 | 10/2017 | Kentley et al. |
| 2017/0308082 A1 | 10/2017 | Ullrich et al. |
| 2017/0309092 A1 | 10/2017 | Rosenbaum |
| 2017/0330399 A1 | 11/2017 | Nordbruch et al. |
| 2017/0330448 A1 | 11/2017 | Moore et al. |
| 2018/0004223 A1 | 1/2018 | Baldwin |
| 2018/0013831 A1 | 1/2018 | Dey et al. |
| 2018/0029489 A1 | 2/2018 | Nordbruch |
| 2018/0029607 A1 | 2/2018 | Khalifeh et al. |
| 2018/0039274 A1 | 2/2018 | Saibel |
| 2018/0046198 A1 | 2/2018 | Nordbruch et al. |
| 2018/0053411 A1 | 2/2018 | Wieskamp et al. |
| 2018/0074501 A1 | 3/2018 | Boniske et al. |
| 2018/0075538 A1 | 3/2018 | Konrardy et al. |
| 2018/0080995 A1 | 3/2018 | Heinen |
| 2018/0091981 A1 | 3/2018 | Sharma et al. |
| 2018/0099678 A1 | 4/2018 | Absmeier et al. |
| 2018/0194343 A1 | 7/2018 | Lorenz |
| 2018/0224844 A1 | 8/2018 | Zhang et al. |
| 2018/0231979 A1 | 8/2018 | Miller et al. |
| 2018/0276905 A1 | 9/2018 | Makke et al. |
| 2018/0284807 A1 | 10/2018 | Wood et al. |
| 2018/0307250 A1 | 10/2018 | Harvey |
| 2018/0326991 A1 | 11/2018 | Wendt et al. |
| 2018/0345811 A1 | 12/2018 | Michels et al. |
| 2018/0357493 A1 | 12/2018 | Takamatsu et al. |
| 2019/0005464 A1 | 1/2019 | Harris et al. |
| 2019/0005745 A1 | 1/2019 | Patil et al. |
| 2019/0051173 A1 | 2/2019 | Kang |
| 2019/0146491 A1 | 5/2019 | Hu et al. |
| 2019/0146496 A1 | 5/2019 | Woodrow et al. |
| 2020/0005633 A1 | 1/2020 | Jin et al. |
| 2020/0320807 A1 | 10/2020 | Gorti et al. |
| 2020/0326698 A1 | 10/2020 | Kikuchi et al. |

FOREIGN PATENT DOCUMENTS

| | | |
|---|---|---|
| EP | 3239686 A1 | 11/2017 |
| GB | 2488956 A | 9/2012 |
| KR | 10-1515496 B1 | 5/2015 |
| WO | 2010/062899 A1 | 6/2010 |
| WO | 2014/092769 A1 | 6/2014 |
| WO | 2016/067610 A1 | 5/2016 |
| WO | 2017/142931 A1 | 8/2017 |

OTHER PUBLICATIONS

Quora, "What is baseline testing?" Oct. 24, 2015, 4 pages, Accessed at http://www.quora.com/What-is-baseline-testing (Year: 2015).

Synnott et al. "Simulation of Smart Home Activity Datasets". Sensors 2015, 15, 14162-14179; doi:10.3390/s150614162. 18 Pages.

Vanus et al. "Development and testing of a visualization application software, implemented with wireless control system in smart home care". Human-centric Computing and Information Sciences 4, Article No. 18 (Dec. 2014) 126 Pages.

(56) References Cited

OTHER PUBLICATIONS

Schindler et al. "JDVE: A Joint Driver-Vehicle-Environment Simulation Platform for the Development and Accelerated Testing of Automotive Assistance and Automation Systems", Jan. 2011, 6 pages. (Year: 2011).

U.S. Patent Application filed Oct. 10, 2014, Fields et al., "Real-Time Driver Observation and Scoring for Driver's Education"., U.S. Appl. No. 14/511,750.

"The Influence of Telematics on Customer Experience: Case Study of Progressive's Snapshot Program", J.D. Power nsightsk, McGaw Hill Financial (2013).

Al-Shihabi, Talal et al., "A Framework for Modeling Human-like Driving Behaviors for Autonomous Vehicles in Driving Simulators", Copyright 2001, Northeastern University, 6 pages.

Birch, Stuart, "Mercedes-Benz' world class driving simulator complex enhances moose safety", Nov. 13, 2010, SAE International, Automobile Engineering (Year: 2010).

Davies, Alex, "Here's How Mercedes-Benz Tested Its New Self-Driving Car", Nov. 20, 2012, Business Insider, 4 pages (Year: 2012).

Dittrich et al. "Multi-Sensor Navigation System for an Autonomous Helicopter" IEEE, 9 pages (Year: 2002).

Duffy et al., Sit, Stay, Drive: The Future of Autonomous Car Liability, SMU Science & Technology Law Review, vol. 16, DD. 101-23 (Winter 2013).

EP-3239686-A1 EPO english publication NPL.

Fanke et al., "Autonomous Driving Goes Downtown", IEEE Intelligent Systems. 13, 1998, pp. 40-48.

Filev et al., Future Mobility: Integrating Vehicle Control with Cloud Computing, Mechanical Engineering, 135.3:S18-S24 American Society of Mechanical Engineers (Mar. 2013).

Funkhouse, Kevin, "Paving the Road Ahead: Autonomous Vehicles, Products Liability, and the Need for a New Approach", Copyright 2013, Issue 1, 2013 Utah L. Rev. 437 2013, 33 pages.

Garza, Andrew P., "Look Ma, No Hands: Wrinkles and Wrecks in the Age of Autonomous Vehicles", 46 New Eng. L. Rev. 581, 616 (2012).

Gerdes et al., Implementable ethics for autonomous vehicles, Chapter 5, IN: Maurer et al. (eds.), Autonomes Fahren, Soringer Vieweg, Berlin (2015).

Gietelink et al. "Development of advanced driver assistance systems with vehicle hardware-in-the-loop simulations", Vehicle System Dynamics, vol. 44, No. 7, pp. 569-590, Jul. 2006. (Year 2006).

Gleeson, "How much is a monitored alarm insurance deduction?", Demand Media (Oct. 30, 2014).

Gray et al., A unified approach to threat assessment and control for automotive active safety, IEEE, 14(3):1490-9 (Sep. 2013).

Gumey, Jeffrey K., "Sue My Car Not Me: Products Liability and Accidents Involving Autonomous Vehicles", Nov. 15, 2013, 2013 U. Ill. J.L. Tech. & Pol'y 247, 31 pages.

Lattner et al., Knowledge-based risk assessment for intelligent vehicles, pp. 191-196, IEEE KIMAS, Apr. 18-21, 2005, Waltham, Massachusetts (Apr. 2005).

Lewis, The History of Driverless Cars, downloaded from the Internet at: <www.thefactsite.com/2017/06/driverless-cars-history.html> (Jun. 2017).

Marchant et al., The coming collision between autonomous vehicles and the liability system, Santa Clara Law Review, 52(4): Article 6 (2012).

Martin et al. "Certification for Autonomous Vehicles", 34 pages. (Year: 2015).

Mercedes-Benz, "Press Information", Nov. 2012 , Mercedes-Benz Driving Simulator (Year; 2012).

Peterson, Robert W., "New Technology—Old Law: Autonomous Vehicles and California's Insurance Framework", Dec. 18, 2012, Santa Clara Law Review, vol. 52, No. 4, Article 7, 60 pages.

Pohanka et al., Sensors simulation environment for sensor data fusion, 14th International Conference on Information Fusion, Chicaao, IL, pp. 1-8 (2011).

Private Ownership Costs, RACO, Wayback Machine, http://www.racq.com.au:80/-/media/pdf/racqpdfs/cardsanddriving/cars/0714_vehicle_running_cost s.ashx/ (Oct. 6, 2014).

Saberi et al. "An Approach for Functional Safety Improvement of an Existing Automotive System" IEEE, 6 pages. (Year: 2015).

Sepulcre et al., "Cooperative Vehicle-to-Vehicle Active Safety Testing Under Challenging Conditions", Transportation Research Part C 26 (2013), Jan. 2013, pp. 233-255.

Tiberkak et al., An architecture for policy-based home automation system (PBHAS), 2010 IEEE Green Technologies Conference (Apr. 15-16, 2010).

Vasudevan et al., Safe semi-autonomous control with enhanced driver modeling, 2012 American Control Conference, Fairmont Queen Elizabeth, Montreal, Canada (Jun. 27-29, 2012).

Villasenor, Products liability and driverless cars: Issues and guiding principles for legislation, Brookinas Center for Technoloav Innovation, 25 paaes (Apr. 2014).

Wang et al., Shader-based sensor simulation for autonomous car testing, 15th International IEEE Conference on Intelligent Transportation Systems, Anchorage, Alaska, pp. 224-229 (2012).

Wardzinski, Dynamic risk assessment in autonomous vehicles motion planning, Proceedings of the 2008 1st International Conference on Information Technology, IT 2008, Gdansk, Poland (May 19-21, 2008).

Young et al., "Cooperative Collision Warning Based Highway Vehicle Accident Reconstruction", Eight International Conference on Intelligent Systems Design and Applications, Nov. 26-28, 2008, pp. 561-565.

Zhou et al., A Simulation Model to Evaluate and Verify Functions of Autonomous Vehicle Based on Simulink, Tonaii University, 12 pages (2009).

"Rupak Rathore, Carroll Gau, Integrating Biometric Sensors into Automotive Internet of Things (2014), International Conference on Cloud Computing and Internet of Things (CCIOT 2014), 178-179" (Year: 2014).

DETECTING AND RESPONDING TO AUTONOMOUS ENVIRONMENT INCIDENTS

CROSS-REFERENCE TO RELATED APPLICATIONS

This application is a continuation of U.S. patent application Ser. No. 15/409,371, filed Jan. 18, 2017, which is incorporated herein by reference in its entirety for all purposes.

This application also claims priority to and the benefit of the filing date of the following applications: (1) provisional U.S. Patent Application No. 62/286,017 entitled "Autonomous Vehicle Routing, Maintenance, & Fault Determination," filed on Jan. 22, 2016; (2) provisional U.S. Patent Application No. 62/287,659 entitled "Autonomous Vehicle Technology," filed on Jan. 27, 2016; (3) provisional U.S. Patent Application No. 62/302,990 entitled "Autonomous Vehicle Routing," filed on Mar. 3, 2016; (4) provisional U.S. Patent Application No. 62/303,500 entitled "Autonomous Vehicle Routing," filed on Mar. 4, 2016; (5) provisional U.S. Patent Application No. 62/312,109 entitled "Autonomous Vehicle Routing," filed on Mar. 23, 2016; (6) provisional U.S. Patent Application No. 62/349,884 entitled "Autonomous Vehicle Component and System Assessment," filed on Jun. 14, 2016; (7) provisional U.S. Patent Application No. 62/351,559 entitled "Autonomous Vehicle Component and System Assessment," filed on Jun. 17, 2016; (8) provisional U.S. Patent Application No. 62/373,084 entitled "Autonomous Vehicle Communications," filed on Aug. 10, 2016; (9) provisional U.S. Patent Application No. 62/376,044 entitled "Autonomous Operation Expansion through Caravans," filed on Aug. 17, 2016; (10) provisional U.S. Patent Application No. 62/380,686 entitled "Autonomous Operation Expansion through Caravans," filed on Aug. 29, 2016; (11) provisional U.S. Patent Application No. 62/381,848 entitled "System and Method for Autonomous Vehicle Sharing Using Facial Recognition," filed on Aug. 31, 2016; (12) provisional U.S. Patent Application No. 62/406,595 entitled "Autonomous Vehicle Action Communications," filed on Oct. 11, 2016; (13) provisional U.S. Patent Application No. 62/406,600 entitled "Autonomous Vehicle Path Coordination," filed on Oct. 11, 2016; (14) provisional U.S. Patent Application No. 62/406,605 entitled "Autonomous Vehicle Signal Control," filed on Oct. 11, 2016; (15) provisional U.S. Patent Application No. 62/406,611 entitled "Autonomous Vehicle Application," filed on Oct. 11, 2016; (16) provisional U.S. Patent Application No. 62/415,668 entitled "Method and System for Enhancing the Functionality of a Vehicle," filed on Nov. 1, 2016; (17) provisional U.S. Patent Application No. 62/415,672 entitled "Method and System for Repairing a Malfunctioning Autonomous Vehicle," filed on Nov. 1, 2016; (18) provisional U.S. Patent Application No. 62/415,673 entitled "System and Method for Autonomous Vehicle Sharing Using Facial Recognition," filed on Nov. 1, 2016; (19) provisional U.S. Patent Application No. 62/415,678 entitled "System and Method for Autonomous Vehicle Ride Sharing Using Facial Recognition," filed on Nov. 1, 2016; (20) provisional U.S. Patent Application No. 62/418,988 entitled "Virtual Testing of Autonomous Vehicle Control System," filed on Nov. 8, 2016; (21) provisional U.S. Patent Application No. 62/418,999 entitled "Detecting and Responding to Autonomous Vehicle Collisions," filed on Nov. 8, 2016; (22) provisional U.S. Patent Application No. 62/419,002 entitled "Automatic Repair on Autonomous Vehicles," filed on Nov. 8, 2016; (23) provisional U.S. Patent Application No. 62/419,009 entitled "Autonomous Vehicle Component Malfunction Impact Assessment," filed on Nov. 8, 2016; (24) provisional U.S. Patent Application No. 62/419,017 entitled "Autonomous Vehicle Sensor Malfunction Detection," filed on Nov. 8, 2016; (25) provisional U.S. Patent Application No. 62/419,023 entitled "Autonomous Vehicle Damage and Salvage Assessment," filed on Nov. 8, 2016; (26) provisional U.S. Patent Application No. 62/424,078 entitled "Systems and Methods for Sensor Monitoring," filed Nov. 18, 2016; (27) provisional U.S. Patent Application No. 62/424,093 entitled "Autonomous Vehicle Sensor Malfunction Detection," filed on Nov. 18, 2016; (28) provisional U.S. Patent Application No. 62/428,843 entitled "Autonomous Vehicle Control," filed on Dec. 1, 2016; (29) provisional U.S. Patent Application No. 62/430,215 entitled Autonomous Vehicle Environment and Component Monitoring," filed on Dec. 5, 2016; (30) provisional U.S. Patent Application No. 62/434,355 entitled "Virtual Testing of Autonomous Environment Control System," filed Dec. 14, 2016; (31) provisional U.S. Patent Application No. 62/434,359 entitled "Detecting and Responding to Autonomous Environment Incidents," filed Dec. 14, 2016; (32) provisional U.S. Patent Application No. 62/434,361 entitled "Component Damage and Salvage Assessment," filed Dec. 14, 2016; (33) provisional U.S. Patent Application No. 62/434,365 entitled "Sensor Malfunction Detection," filed Dec. 14, 2016; (34) provisional U.S. Patent Application No. 62/434,368 entitled "Component Malfunction Impact Assessment," filed Dec. 14, 2016; and (35) provisional U.S. Patent Application No. 62/434,370 entitled "Automatic Repair of Autonomous Components," filed Dec. 14, 2016. The entire contents of each of the preceding applications are hereby expressly incorporated herein by reference.

Additionally, the present application is related to the following co-pending U.S. patent applications: (1) U.S. patent application Ser. No. 15/409,143 entitled "Autonomous Operation Suitability Assessment and Mapping," filed Jan. 18, 2017; (2) U.S. patent application Ser. No. 15/409,146 entitled "Autonomous Vehicle Routing," filed Jan. 18, 2017; (3) U.S. patent application Ser. No. 15/409,149 entitled "Autonomous Vehicle Routing During Emergencies," filed Jan. 18, 2017; (4) U.S. patent application Ser. No. 15/409,159 entitled "Autonomous Vehicle Trip Routing," filed Jan. 18, 2017; (5) U.S. patent application Ser. No. 15/409,163 entitled "Autonomous Vehicle Parking," filed Jan. 18, 2017; (6) U.S. patent application Ser. No. 15/409,167 entitled "Autonomous Vehicle Retrieval," filed Jan. 18, 2017; (7) U.S. patent application Ser. No. 15/409,092 entitled "Autonomous Vehicle Action Communications," filed Jan. 18, 2017; (8) U.S. patent application Ser. No. 15/409,099 entitled "Autonomous Vehicle Path Coordination," filed Jan. 18, 2017; (9) U.S. patent application Ser. No. 15/409,107 entitled "Autonomous Vehicle Signal Control," filed Jan. 18, 2017; (10) U.S. patent application Ser. No. 15/409,115 entitled "Autonomous Vehicle Application," filed Jan. 18, 2017; (11) U.S. patent application Ser. No. 15/409,136 entitled "Method and System for Enhancing the Functionality of a Vehicle," filed Jan. 18, 2017; (12) U.S. patent application Ser. No. 15/409,180 entitled "Method and System for Repairing a Malfunctioning Autonomous Vehicle," filed Jan. 18, 2017; (13) U.S. patent application Ser. No. 15/409,148 entitled "System and Method for Autonomous Vehicle Sharing Using Facial Recognition," filed Jan. 18, 2017; (14) U.S. patent application Ser. No. 15/409,198 entitled "System and Method for Autonomous Vehicle Ride Sharing Using Facial Recognition," filed Jan. 18, 2017; (15) U.S. patent application Ser. No. 15/409,215 entitled "Autonomous Vehicle Sensor Malfunction Detection," filed Jan. 18, 2017; (16) U.S. patent application Ser. No. 15/409,248 entitled "Sensor Malfunction Detection," filed Jan. 18, 2017; (17) U.S. patent application Ser. No. 15/409,271 entitled "Autonomous Vehicle Component Malfunction Impact Assessment," filed Jan. 18, 2017; (18) U.S. patent application Ser. No. 15/409,305 entitled "Component Malfunction Impact Assessment," filed Jan. 18, 2017; (19) U.S. patent application Ser. No. 15/409,318 entitled "Automatic Repair of Autonomous Vehicles," filed Jan. 18, 2017; (20) U.S. patent application Ser. No. 15/409,336 entitled "Automatic Repair of Autonomous Components," filed Jan. 18, 2017; (21) U.S. patent application Ser. No. 15/409,340 entitled "Autonomous Vehicle Damage and Salvage Assessment," filed Jan. 18, 2017; (22) U.S. patent application Ser. No. 15/409,349 entitled "Component Damage and Salvage Assessment," filed Jan. 18, 2017; (23) U.S. patent application Ser. No. 15/409,359 entitled "Detecting and Responding to Autonomous Vehicle Collisions," filed Jan. 18, 2017; (24) U.S. patent application Ser. No. 15/409,445 entitled "Virtual Testing of Autonomous Vehicle Control System," filed Jan. 18, 2017; (25) U.S. patent application Ser. No. 15/409,473 entitled "Virtual Testing of Autonomous Environment Control System," filed Jan. 18, 2017; (26) U.S. patent application Ser. No. 15/409,220 entitled "Autonomous Electric Vehicle Charging," filed Jan. 18, 2017; (27) U.S. patent application Ser. No. 15/409,213 entitled "Coordinated Autonomous Vehicle Automatic Area Scanning," filed Jan. 18, 2017; (28) U.S. patent application Ser. No. 15/409,228 entitled "Operator-Specific Configuration of Autonomous Vehicle Operation," filed Jan. 18, 2017; (29) U.S. patent application Ser. No. 15/409,236 entitled "Autonomous Vehicle Operation Adjustment Based Upon Route," filed Jan. 18, 2017; (30) U.S. patent application Ser. No. 15/409,239 entitled "Autonomous Vehicle Component Maintenance and Repair," filed Jan. 18, 2017; and (31) U.S. patent application Ser. No. 15/409,243 entitled "Anomalous Condition Detection and Response for Autonomous Vehicles," filed Jan. 18, 2017.

FIELD

The present disclosure generally relates to systems and methods for component monitoring and assessment for damage or other malfunctions.

BACKGROUND

Vehicles are typically operated by a human vehicle operator who controls both steering and motive controls. Operator error, inattention, inexperience, misuse, or distraction leads to many vehicle collisions each year, resulting in injury and damage. Autonomous or semi-autonomous vehicles augment vehicle operators' information or replace vehicle operators' control commands to operate the vehicle, in whole or part, with computer systems based upon information from sensors within, or attached to, the vehicle. Such vehicles may be operated with or without passengers, thus requiring different means of control than traditional vehicles. Such vehicles also may include a plurality of advanced sensors, capable of providing significantly more data (both in type and quantity) than is available even from GPS navigation assistance systems installed in traditional vehicles.

Ensuring safe operation of such autonomous or semi-autonomous vehicles is of the utmost importance because the automated systems of these vehicles may not function properly in all environments. Although autonomous operation may be safer than manual operation under ordinary driving conditions, unusual or irregular environmental conditions may significantly impair the functioning of the autonomous operation features controlling the autonomous vehicle. Under some conditions, autonomous operation may become impractical or excessively dangerous. As an example, fog or heavy rain may greatly reduce the ability of autonomous operation features to safely control the vehicle. Additionally, damage or other impairment of sensors or other components of autonomous systems may significantly increase the risks associated with autonomous operation. Such conditions may change frequently, thereby changing the safety of autonomous vehicle operation. Similar risks associated with impaired sensors may also be present in a smart home environment.

BRIEF SUMMARY

The present embodiments may be related to autonomous or semi-autonomous vehicle operation, including driverless operation of fully autonomous vehicles. The embodiments described herein relate particularly to various aspects of autonomous operation feature, component, and software monitoring and/or assessment. When malfunctions or other problems are detected, remedial responses may be determined and implemented. Alternatively, some aspects relate to assessment of features, components, or software, either generally or in particular situations. Specific systems and methods are summarized below. The methods and systems summarized below may include additional, less, or alternate actions, including those discussed elsewhere herein.

In one aspect, a computer-implemented method for improving the functioning of a computer and/or detecting and responding to an autonomous vehicle collision may be provided. The method may include (1) detecting that an autonomous vehicle is operating in a fully autonomous mode and/or without passengers; (2) monitoring operation of the autonomous vehicle by receiving and processing operating data associated with a plurality of autonomous operation features while the autonomous vehicle is operating; (3) identifying an unusual condition in the operating data, such unusual condition indicative of a likelihood of an incident occurring during operation of the autonomous vehicle; (4) determining that a collision has occurred based upon a portion of the operating data associated with the unusual condition; (5) determining a response to the collision based upon the received operating data; and/or (6) causing the autonomous vehicle to implement the determined response. The method may include additional, less, or alternate actions, including those discussed elsewhere herein.

For instance, the operating data may include sensor data from a plurality of sensors associated with the autonomous operation features and control data generated by the plurality of autonomous operation features. The unusual condition may include a discontinuity in the operating data, a divergence between sensor data from one or more sensors and control data from one or more autonomous operation features, or a plurality of sensor malfunctions.

Determining the response to the collision may include determining to continue operating the autonomous vehicle based upon the received operating data, and causing the autonomous vehicle to implement the determined response may include causing the autonomous vehicle to continue operating to a destination. Alternatively, determining the response to the collision may include determining not to continue operating the autonomous vehicle based upon the received operating data, and causing the autonomous vehicle to implement the determined response may include causing the autonomous vehicle to cease operation.

In some embodiments, the method may further include transmitting (i) image data from one or more image capture devices within the autonomous vehicle and/or (ii) operating data associated with the autonomous vehicle via a communication network to a computing device associated with a human reviewer. Such embodiments may further include receiving an indication verifying the determined collision via the communication network. The response may be determined based upon the received indication verifying the determined collision. The indication verifying the determined collision may further include one or more instructions regarding the response to be implemented by the autonomous vehicle.

In further embodiments, the method may include determining that damage to another object has occurred based upon the received operating data. The method may further include communicating information regarding the damage to another object. In yet further embodiments, the method may include determining that the determined collision has resulted in an injury to a person outside the autonomous vehicle. The method may further include causing an emergency action to be implemented. Such emergency action may include enabling communication between the person and an emergency assistance representative using (i) one or more speakers disposed within the autonomous vehicle and/or (ii) video equipment disposed within the autonomous vehicle. The emergency action may also include operating the autonomous vehicle in the fully autonomous mode to convey the person to a facility associated with emergency services, which facility may be a hospital.

In still further embodiments, the method may further include determining damage to the autonomous vehicle from the collision. The response may then include (i) causing the autonomous vehicle to travel to a vehicle repair facility for repair of the determined damage and/or (ii) causing the autonomous vehicle to resume travel to a destination following repair.

The response may include causing the autonomous vehicle to move out of a traffic lane of a roadway. The response may include allowing manual control of the vehicle for a limited distance or duration of operation following the collision. The response may similarly include granting autonomous control of the vehicle to a remote agent following the collision. In some embodiments, the response may likewise include establishing a two-way communication link between the autonomous vehicle and a remote user using input and output components of the autonomous. The remote user may be an owner or operator of the autonomous vehicle. The input component may include a microphone and/or a camera. The output component may include a speaker and/or a display.

In another aspect, a computer-implemented method for improving the functioning of a computer and/or detecting and responding to a smart home incident may be provided. The method may include (1) detecting that an smart home is operating in a fully autonomous mode and/or without occupants; (2) monitoring operation of the smart home by receiving and processing operating data associated with a plurality of autonomous operation features while the smart home is operating; (3) identifying an unusual condition in the operating data, such unusual condition indicative of a likelihood of an incident occurring during operation of the smart home; (4) determining that an incident has occurred based upon a portion of the operating data associated with the unusual condition; (5) determining a response to the incident based upon the received operating data; and/or (6) causing the smart home to implement the determined response. The method may include additional, less, or alternate actions, including those discussed elsewhere herein.

For instance, the operating data may include sensor data from a plurality of sensors associated with the autonomous operation features and control data generated by the plurality of autonomous operation features. The unusual condition may include a discontinuity in the operating data, a divergence between sensor data from one or more sensors and control data from one or more autonomous operation features, or a plurality of sensor malfunctions.

Determining the response to the incident may include determining to continue operating the smart home based upon the received operating data, and causing the autonomous vehicle to implement the determined response may include causing the smart home to continue operating. Alternatively, determining the response to the incident may include determining not to continue operating the smart home based upon the received operating data, and causing the smart home to implement the determined response may include causing the smart home to cease operation.

In some embodiments, the method may further include transmitting (i) image data from one or more image capture devices within the smart home and/or (ii) operating data associated with the autonomous vehicle via a communication network to a computing device associated with a human reviewer. Such embodiments may further include receiving an indication verifying the determined incident via the communication network. The response may be determined based upon the received indication verifying the determined incident. The indication verifying the determined incident may further include one or more instructions regarding the response to be implemented by the smart home.

In further embodiments, the method may include determining that damage to another object has occurred based upon the received operating data. The method may further include communicating information regarding the damage to another object. In yet further embodiments, the method may include determining that the determined incident has resulted in an injury to a person outside the smart home. The method may further include causing an emergency action to be implemented. Such emergency action may include enabling communication between the person and an emergency assistance representative using (i) one or more speakers disposed within the smart home and/or (ii) video equipment disposed within the smart home.

In still further embodiments, the method may further include determining damage to the smart home from the incident. The response may include allowing manual control of the smart home for a limited duration of operation following the incident. The response may similarly include granting autonomous control of the smart home to a remote agent following the incident. In some embodiments, the response may likewise include establishing a two-way communication link between the smart home and a remote user using input and output components of the smart home. The remote user may be an owner or operator of the smart home. The input component may include a microphone and/or camera. The output component may include a speaker and/or display.

Systems or computer-readable media storing instructions for implementing all or part of the methods described above may also be provided in some aspects. Systems for implementing such methods may include one or more of the following: a special-purpose assessment computing device, a mobile computing device, an on-board computer, a remote server, one or more sensors, one or more communication modules configured to communicate wirelessly via radio links, radio frequency links, and/or wireless communication channels, and/or one or more program memories coupled to one or more processors of the mobile computing device, on-board computer, or remote server. Such program memories may store instructions to cause the one or more processors to implement part or all of the method described above. Additional or alternative features described herein below may be included in some aspects.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1A:
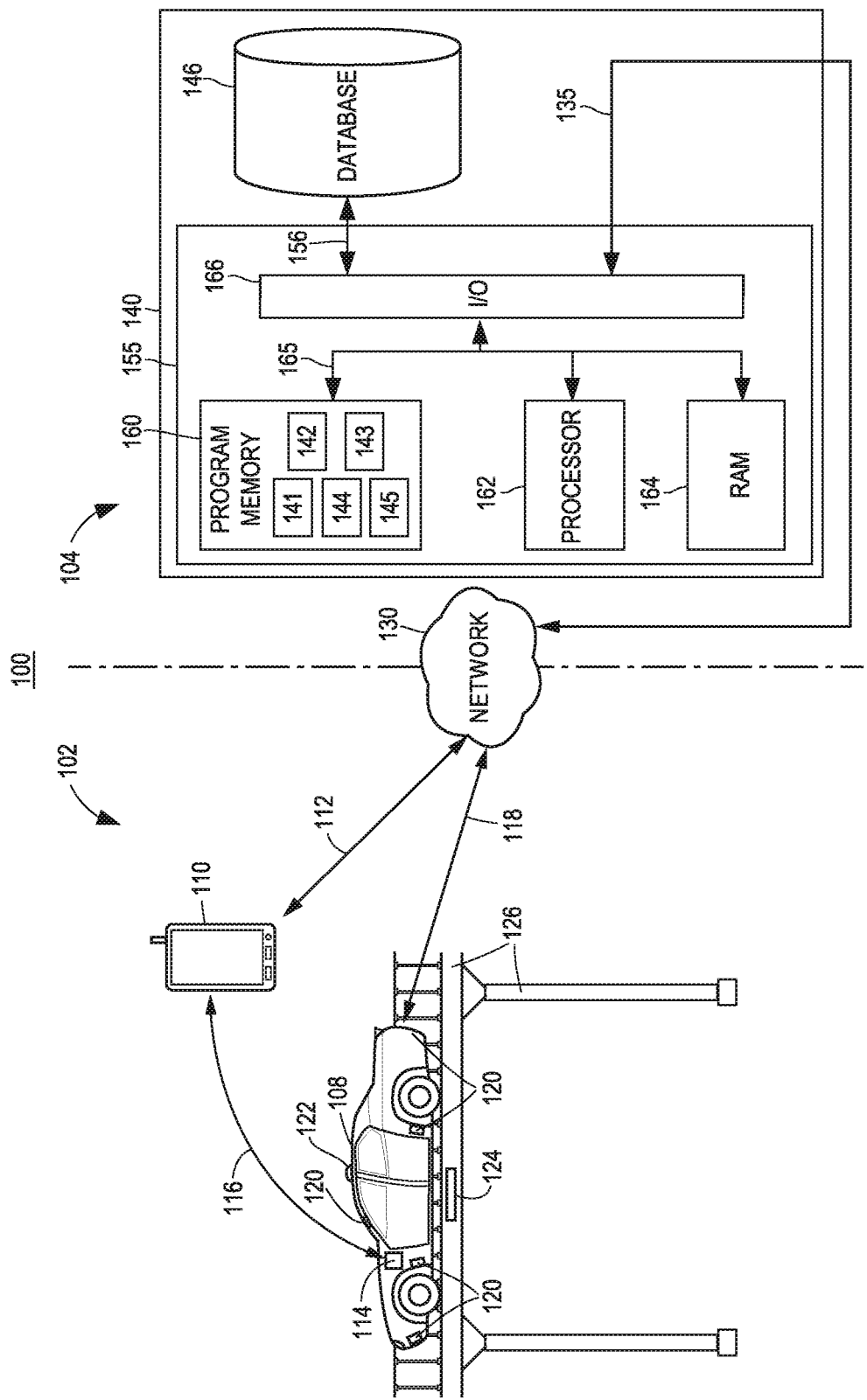
FIG. 1A illustrates a block diagram of an exemplary autonomous vehicle data system for autonomous vehicle operation, monitoring, and related functions.

The systems and methods disclosed herein generally relate to various aspects of autonomous operation feature, component, and software monitoring and/or assessment. Responses to accidents, collisions, and other events causing malfunctions or damage are discussed below. Assessment of components and features may be performed as part of detecting malfunctions, determining repairs, determining component operating status, or generally evaluating effectiveness or reliability of components and features. To this end, the systems and methods may include collecting, communicating, evaluating, predicting, and/or utilizing data associated with autonomous or semi-autonomous operation features for controlling a vehicle. The autonomous operation features may take full control of the vehicle under certain conditions, viz. fully autonomous operation, or the autonomous operation features may assist the vehicle operator in operating the vehicle, viz. partially autonomous operation.

Fully autonomous operation features may include systems within the vehicle that pilot the vehicle to a destination with or without a vehicle operator present (e.g., an operating system for a driverless car) and/or systems within smart homes capable of automatically controlling smart equipment disposed therein. Partially autonomous operation features may assist the vehicle operator in limited ways (e.g., automatic braking or collision avoidance systems). Fully or partially autonomous operation features may perform specific functions to control or assist in controlling some aspect of vehicle operation, or such features may manage or control other autonomous operation features. For example, a vehicle operating system may control numerous subsystems that each fully or partially control aspects of vehicle operation.

In addition to information regarding the position or movement of a vehicle, autonomous operation features may collect and utilize other information, such as data about other vehicles or control decisions of the vehicle. Such additional information may be used to improve vehicle operation, route the vehicle to a destination, warn of component malfunctions, advise others of potential hazards, or for other purposes described herein. Information may be collected, assessed, and/or shared via applications installed and executing on computing devices associated with various vehicles or vehicle operators, such as on-board computers of vehicles or smartphones of vehicle operators. By using computer applications to obtain data, the additional information generated by autonomous features of autonomous vehicles and/or smart homes may be used to assess the autonomous features themselves while in operation or to provide pertinent information to non-autonomous vehicles and/or smart homes through an electronic communication network. These and other advantages are further described below.

Autonomous operation features utilize data not available to a human operator, respond to conditions in the vehicle operating environment faster than human operators, and do not suffer fatigue or distraction. Thus, the autonomous operation features may also significantly affect various risks associated with operating a vehicle and/or a smart home.

Alternatively, autonomous operation features may be incapable of some actions typically taken by human operators, particularly when the features or other components of the vehicle are damaged or inoperable and/or a smart home is unoccupied. Moreover, combinations of autonomous operation features may further affect operating risks due to synergies or conflicts between features. To account for these effects on risk, some embodiments evaluate the quality of each autonomous operation feature and/or combination of features. This may be accomplished by testing the features and combinations in controlled environments, as well as analyzing the effectiveness of the features in the ordinary course of vehicle operation. New autonomous operation features may be evaluated based upon controlled testing and/or estimating ordinary-course performance based upon data regarding other similar features for which ordinary-course performance is known.

Some autonomous operation features may be adapted for use under particular conditions, such as city driving or highway driving. Additionally, the vehicle operator may be able to configure settings relating to the features or may enable or disable the features at will. Therefore, some embodiments monitor use of the autonomous operation features, which may include the settings or levels of feature use during operation. Information obtained by monitoring feature usage may be used to determine risk levels associated with operation, either generally or in relation to a vehicle operator and/or smart home occupant. In such situations, total risk may be determined by a weighted combination of the risk levels associated with operation while autonomous operation features are enabled (with relevant settings) and the risk levels associated with operation while autonomous operation features are disabled. For fully autonomous vehicles, settings or configurations relating to vehicle operation may be monitored and used in determining vehicle operating risk.

In some embodiments, information regarding the risks associated with operation with and without the autonomous operation features may be used to determine risk categories or premiums for a vehicle insurance policy covering a vehicle with autonomous operation features and/or for a home insurance policy covering a smart home with autonomous operation features, as described elsewhere herein. Risk category or price may be determined based upon factors relating to the evaluated effectiveness of the autonomous features. The risk or price determination may also include traditional factors, such as location, vehicle type, and level of vehicle use. For fully autonomous vehicles, factors relating to vehicle operators may be excluded entirely. For partially autonomous vehicles, factors relating to vehicle operators may be reduced in proportion to the evaluated effectiveness and monitored usage levels of the autonomous operation features. For vehicles with autonomous communication features that obtain information from external sources (e.g., other vehicles or infrastructure), the risk level and/or price determination may also include an assessment of the availability of external sources of information. Location and/or timing of vehicle use may thus be monitored and/or weighted to determine the risk associated with operation of the vehicle.

Exemplary Autonomous Vehicle Operation System

FIG. 1A illustrates a block diagram of an exemplary autonomous vehicle data system 100 on which the exemplary methods described herein may be implemented. The high-level architecture includes both hardware and software applications, as well as various data communications channels for communicating data between the various hardware and software components. The autonomous vehicle data system 100 may be roughly divided into front-end components 102 and back-end components 104. The front-end components 102 may obtain information regarding a vehicle 108 (e.g., a car, truck, motorcycle, etc.) and the surrounding environment. An on-board computer 114 may utilize this information to operate the vehicle 108 according to an autonomous operation feature or to assist the vehicle operator in operating the vehicle 108. To monitor the vehicle 108, the front-end components 102 may include one or more sensors 120 installed within the vehicle 108 that may communicate with the on-board computer 114. The front-end components 102 may further process the sensor data using the on-board computer 114 or a mobile device 110 (e.g., a smart phone, a tablet computer, a special purpose computing device, smart watch, wearable electronics, etc.) to determine when the vehicle is in operation and information regarding the vehicle.

In some embodiments of the system 100, the front-end components 102 may communicate with the back-end components 104 via a network 130. Either the on-board computer 114 or the mobile device 110 may communicate with the back-end components 104 via the network 130 to allow the back-end components 104 to record information regarding vehicle usage. The back-end components 104 may use one or more servers 140 to receive data from the front-end components 102, store the received data, process the received data, and/or communicate information associated with the received or processed data.

The front-end components 102 may be disposed within or communicatively connected to one or more on-board computers 114, which may be permanently or removably installed in the vehicle 108. The on-board computer 114 may interface with the one or more sensors 120 within the vehicle 108 (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.), which sensors may also be incorporated within or connected to the on-board computer 114.

The front end components 102 may further include a communication component 122 to transmit information to and receive information from external sources, including other vehicles, infrastructure, or the back-end components 104. In some embodiments, the mobile device 110 may supplement the functions performed by the on-board computer 114 described herein by, for example, sending or receiving information to and from the mobile server 140 via the network 130, such as over one or more radio frequency links or wireless communication channels. In other embodiments, the on-board computer 114 may perform all of the functions of the mobile device 110 described herein, in which case no mobile device 110 may be present in the system 100.

Either or both of the mobile device 110 or on-board computer 114 may communicate with the network 130 over links 112 and 118, respectively. Either or both of the mobile device 110 or on-board computer 114 may run a Data Application for collecting, generating, processing, analyzing, transmitting, receiving, and/or acting upon data associated with the vehicle 108 (e.g., sensor data, autonomous operation feature settings, or control decisions made by the autonomous operation features) or the vehicle environment (e.g., other vehicles operating near the vehicle 108). Additionally, the mobile device 110 and on-board computer 114 may communicate with one another directly over link 116.

The mobile device 110 may be either a general-use personal computer, cellular phone, smart phone, tablet computer, smart watch, wearable electronics, or a dedicated vehicle monitoring or control device. Although only one mobile device 110 is illustrated, it should be understood that a plurality of mobile devices 110 may be used in some embodiments. The on-board computer 114 may be a general-use on-board computer capable of performing many functions relating to vehicle operation or a dedicated computer for autonomous vehicle operation. Further, the on-board computer 114 may be installed by the manufacturer of the vehicle 108 or as an aftermarket modification or addition to the vehicle 108. In some embodiments or under certain conditions, the mobile device 110 or on-board computer 114 may function as thin-client devices that outsource some or most of the processing to the server 140.

The sensors 120 may be removably or fixedly installed within the vehicle 108 and may be disposed in various arrangements to provide information to the autonomous operation features. Among the sensors 120 may be included one or more of a GPS unit, a radar unit, a LIDAR unit, an ultrasonic sensor, an infrared sensor, an inductance sensor, a camera, an accelerometer, a tachometer, or a speedometer. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. Information generated or received by the sensors 120 may be communicated to the on-board computer 114 or the mobile device 110 for use in autonomous vehicle operation.

In further embodiments, the front-end components may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. The infrastructure communication device 124 may include or be communicatively connected to one or more sensors (not shown) for detecting information relating to the condition of the infrastructure component 126. The sensors (not shown) may generate data relating to weather conditions, traffic conditions, or operating status of the infrastructure component 126.

The infrastructure communication device 124 may be configured to receive the sensor data generated and determine a condition of the infrastructure component 126, such as weather conditions, road integrity, construction, traffic, available parking spaces, etc. The infrastructure communication device 124 may further be configured to communicate information to vehicles 108 via the communication component 122. In some embodiments, the infrastructure communication device 124 may receive information from one or more vehicles 108, while, in other embodiments, the infrastructure communication device 124 may only transmit information to the vehicles 108. The infrastructure communication device 124 may be configured to monitor vehicles 108 and/or communicate information to other vehicles 108 and/or to mobile devices 110.

In some embodiments, the communication component 122 may receive information from external sources, such as other vehicles or infrastructure. The communication component 122 may also send information regarding the vehicle 108 to external sources. To send and receive information, the communication component 122 may include a transmitter and a receiver designed to operate according to predetermined specifications, such as the dedicated short-range communication (DSRC) channel, wireless telephony, Wi-Fi, or other existing or later-developed communications protocols. The received information may supplement the data received from the sensors 120 to implement the autonomous operation features. For example, the communication component 122 may receive information that an autonomous vehicle ahead of the vehicle 108 is reducing speed, allowing the adjustments in the autonomous operation of the vehicle 108.

In addition to receiving information from the sensors 120, the on-board computer 114 may directly or indirectly control the operation of the vehicle 108 according to various autonomous operation features. The autonomous operation features may include software applications or modules implemented by the on-board computer 114 to generate and implement control commands to control the steering, braking, or throttle of the vehicle 108. To facilitate such control, the on-board computer 114 may be communicatively connected to control components of the vehicle 108 by various electrical or electromechanical control components (not shown). When a control command is generated by the on-board computer 114, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator or brake pedals, or ignition switches.

In some embodiments, the front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these. The network 130 may include one or more radio frequency communication links, such as wireless communication links 112 and 118 with mobile devices 110 and on-board computers 114, respectively. Where the network 130 comprises the Internet, data communications may take place over the network 130 via an Internet communication protocol.

The back-end components 104 include one or more servers 140. Each server 140 may include one or more computer processors adapted and configured to execute various software applications and components of the autonomous vehicle data system 100, in addition to other software applications. The server 140 may further include a database 146, which may be adapted to store data related to the operation of the vehicle 108 and/or a smart home (not depicted) and its autonomous operation features. Such data might include, for example, dates and times of vehicle use, duration of vehicle use, use and settings of autonomous operation features, information regarding control decisions or control commands generated by the autonomous operation features, speed of the vehicle 108, RPM or other tachometer readings of the vehicle 108, lateral and longitudinal acceleration of the vehicle 108, vehicle accidents, incidents or near collisions of the vehicle 108, hazardous or anomalous conditions within the vehicle operating environment (e.g., construction, accidents, etc.), communication between the autonomous operation features and external sources, environmental conditions of vehicle operation (e.g., weather, traffic, road condition, etc.), errors or failures of autonomous operation features, or other data relating to use of the vehicle 108 and the autonomous operation features, which may be uploaded to the server 140 via the network 130. The server 140 may access data stored in the database 146 when executing various functions and tasks associated with the evaluating feature effectiveness or assessing risk relating to an autonomous vehicle.

Although the autonomous vehicle data system 100 is shown to include one vehicle 108, one mobile device 110, one on-board computer 114, and one server 140, it should be understood that different numbers of vehicles 108, mobile devices 110, on-board computers 114, and/or servers 140 may be utilized. For example, the system 100 may include a plurality of servers 140 and hundreds or thousands of mobile devices 110 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information. This may in turn support a thin-client embodiment of the mobile device 110 or on-board computer 114 discussed herein.

The server 140 may have a controller 155 that is operatively connected to the database 146 via a link 156. It should be noted that, while not shown, additional databases may be linked to the controller 155 in a known manner. For example, separate databases may be used for various types of information, such as autonomous operation feature information, vehicle accidents, road conditions, vehicle insurance policy information, or vehicle use information. Additional databases (not shown) may be communicatively connected to the server 140 via the network 130, such as databases maintained by third parties (e.g., weather, construction, or road network databases). The controller 155 may include a program memory 160, a processor 162 (which may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM 164 and program memories 160 may be implemented as semiconductor memories, magnetically readable memories, or optically readable memories, for example. The controller 155 may also be operatively connected to the network 130 via a link 135.

The server 140 may further include a number of software applications stored in a program memory 160. The various software applications on the server 140 may include an autonomous operation information monitoring application 141 for receiving information regarding the vehicle 108 and its autonomous operation features (which may include control commands or decisions of the autonomous operation features), a feature evaluation application 142 for determining the effectiveness of autonomous operation features under various conditions and/or determining operating condition of autonomous operation features or components, a real-time communication application 143 for communicating information regarding vehicle or environmental conditions between a plurality of vehicles, a navigation application 144 for assisting autonomous or semi-autonomous vehicle operation, and an accident detection application 145 for identifying accidents and providing assistance. The various software applications may be executed on the same computer processor or on different computer processors.

Figure 1B:
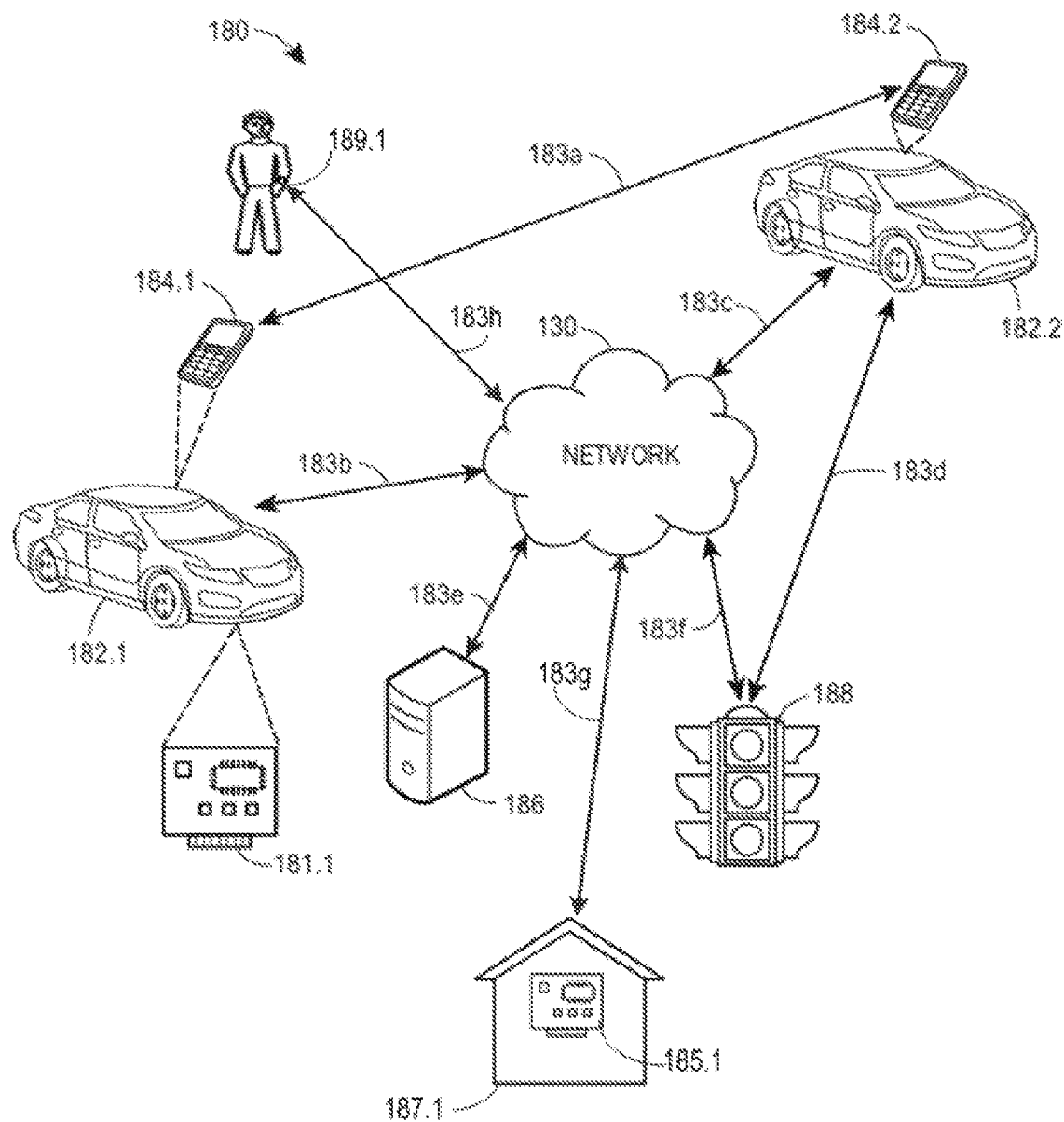
FIG. 1B illustrates a block diagram of an exemplary autonomous vehicle monitoring system, showing a plurality of vehicles and smart infrastructure components.

FIG. 1B illustrates a block diagram of an exemplary autonomous vehicle monitoring system 180 on which the exemplary methods described herein may be implemented. In one aspect, system 180 may include a network 130, N number of vehicles 182.1-182.N and respective mobile computing devices 184.1-184.N, an external computing device 186, N number of smart homes 187.1-187.N, N number of personal electronic devices 189.1-189.N, and/or a smart infrastructure component 188. In one aspect, mobile computing devices 184 may be an implementation of mobile computing device 110, while vehicles 182 may be an implementation of vehicle 108. The vehicles 182 may include a plurality of vehicles 108 having autonomous operation features, as well as a plurality of other vehicles not having autonomous operation features. As illustrated, the vehicle 182.1 may include a vehicle controller 181.1, which may be an on-board computer 114 as discussed elsewhere herein, while vehicle 182.2 may lack such a component. Each of vehicles 182.1 and 182.2 may be configured for wireless inter-vehicle communication, such as vehicle-to-vehicle (V2V) wireless communication and/or data transmission via the communication component 122, directly via the mobile computing devices 184, or otherwise.

As illustrated, the autonomous vehicle monitoring system 180 may monitor devices other than the vehicles 182. For instance, the autonomous vehicle monitoring system 180 may monitor the smart home 187.1. The smart home 187.1 may be associated with a smart home controller 185.1. Similar to how the vehicle controller 181.1 monitors a plurality of sensors associated with the vehicle 182.1, the smart home controller 185.1 may monitor a plurality of sensors associated with the smart home 187.1. To this end, the smart home 187.1 may include a plurality of sensors (not depicted) disposed on or proximate to the smart home 187.1. For example, the smart home 187.1 may include a smoke sensor, a temperature sensor, a flood level sensor, a motion sensor, an image sensor, a thermal image sensor, and so on.

In embodiments, the smart home 187.1 may include a plurality of smart equipment (not depicted). The smart equipment may include appliances, electronics, electrical systems, gas systems, water systems, windows, doors, shutters, and so on configured to communicate with the smart home controller 185.1. The smart equipment may include one or more sensors that monitor the operation of the smart equipment. Additional details describing a smart home environment may be found in co-owned U.S. patent application Ser. No. 14/693,032 entitled "SYSTEMS AND METHODS FOR AUTOMATICALLY MITIGATING RISK OF PROPERTY DAMAGE," the entire disclosure of which is hereby incorporated by reference in its entirety. In an aspect, the smart home controller may communicate over the network 130 via a communication link 183g.

In an aspect, another example of a device other than the vehicles 182 the autonomous vehicle monitoring system 180 may monitor include personal electronic device 189. The personal electronic devices 189 may include any type of electronic device that monitors conditions associated with an individual. For example, the personal electronic device 189.1 may be a smart watch, a fitness tracker, a personal medical device (e.g., a pace maker, an insulin pump, etc.) and/or monitoring devices thereof, smart implants, and so on. The personal electronic device 189 may monitor the conditions of the individual while the individual is present in the vehicle 182.1 and/or operating the vehicle 182.1 in a semi-autonomous mode. In some embodiments, when the personal electronic device 189.1 is within and/or proximate to the vehicle 182.1, the personal electronic device may be in communication with the vehicle controller 181.1 and/or the mobile computing device 184.1. Additionally or alternatively, the personal electronic device 189.1 may communicate over the network 130 via a communication link 183*h*.

Although system 180 is shown in FIG. 1B as including one network 130, two mobile computing devices 184.1 and 184.2, two vehicles 182.1 and 182.2, one external computing device 186, one smart home 187.1, one personal electronic device 189.1, and/or one smart infrastructure component 188, various embodiments of system 180 may include any suitable number of networks 130, mobile computing devices 184, vehicles 182, external computing devices 186, smart homes 187, personal electronic devices 189 and/or infrastructure components 188. The vehicles 182 included in such embodiments may include any number of vehicles 182.*i* having vehicle controllers 181.*i* (such as vehicle 182.1 with vehicle controller 181.1) and vehicles 182*j* not having vehicles controllers (such as vehicle 182.2). Moreover, system 180 may include a plurality of external computing devices 186 and more than two mobile computing devices 184, any suitable number of which being interconnected directly to one another and/or via network 130.

In one aspect, each of mobile computing devices 184.1 and 184.2 may be configured to communicate with one another directly via peer-to-peer (P2P) wireless communication and/or data transfer over a radio link or wireless communication channel. In other aspects, each of mobile computing devices 184.1 and 184.2 may be configured to communicate indirectly with one another and/or any suitable device via communications over network 130, such as external computing device 186, smart home controller 185.1, personal electronic device 189.1, and/or smart infrastructure component 188, for example. In still other aspects, each of mobile computing devices 184.1 and 184.2 may be configured to communicate directly and/or indirectly with other suitable devices, which may include synchronous or asynchronous communication.

In one aspect, each of mobile computing devices 184.1 and 184.2 may be configured to communicate with one another, and/or with the personal electronic device 189.1 and/or the smart home controller 185.1, directly via peer-to-peer (P2P) wireless communication and/or data transfer over a radio link or wireless communication channel. In other aspects, each of mobile computing devices 184.1 and 184.2, and/or with the personal electronic device 189.1 and/or the smart home controller 185.1, may be configured to communicate indirectly with one another and/or any suitable device via communications over network 130, such as external computing device 186 and/or smart infrastructure component 188, for example. In still other aspects, each of mobile computing devices 184.1 and 184.2, and/or with the personal electronic device 189.1 and/or the smart home controller 185.1, may be configured to communicate directly and/or indirectly with other suitable devices, which may include synchronous or asynchronous communication.

Each of mobile computing devices 184.1 and 184.2, and/or with the personal electronic device 189.1 and/or the smart home controller 185.1, may be configured to send data to and/or receive data from one another and/or via network 130 using one or more suitable communication protocols, which may be the same communication protocols or different communication protocols. For example, mobile computing devices 184.1 and 184.2 may be configured to communicate with one another via a direct radio link 183*a*, which may utilize, for example, a Wi-Fi direct protocol, an ad-hoc cellular communication protocol, etc. Mobile computing devices 184.1 and 184.2 may also be configured to communicate with vehicles 182.1 and 182.2, respectively, utilizing a Bluetooth communication protocol (radio link not shown). In some embodiments, this may include communication between a mobile computing device 184.1 and a vehicle controller 181.1. In other embodiments, it may involve communication between a mobile computing device 184.2 and a vehicle telephony, entertainment, navigation, or information system (not shown) of the vehicle 182.2 that provides functionality other than autonomous (or semi-autonomous) vehicle control. Thus, vehicles 182.2 without autonomous operation features may nonetheless be connected to mobile computing devices 184.2 in order to facilitate communication, information presentation, or similar non-control operations (e.g., navigation display, hands-free telephony, or music selection and presentation).

To provide additional examples, mobile computing devices 184.1 and 184.2 may be configured to communicate with one another via radio links 183*b* and 183*c* by each communicating with network 130 utilizing a cellular communication protocol. As an additional example, mobile computing devices 184.1 and/or 184.2 may be configured to communicate with external computing device 186 via radio links 183*b*, 183*c*, and/or 183*e*. Still further, one or more of mobile computing devices 184.1 and/or 184.2 may also be configured to communicate with one or more smart infrastructure components 188 directly (e.g., via radio link 183*d*) and/or indirectly (e.g., via radio links 183*c* and 183*f* via network 130) using any suitable communication protocols. As yet another example, the one or more of mobile computing devices 184.1 and/or 184.2 may also be configured to communicate with one or more personal electronic devices 189 directly (not depicted) and/or indirectly (e.g., via radio links 183*c* and 183*h* via network 130) using any suitable communication protocols. As still another example, the one or more of mobile computing devices 184.1 and/or 184.2 may also be configured to communicate with one or more smart home controllers 185 directly (not depicted) and/or indirectly (e.g., via radio links 183*c* and 183*g* via network 130) using any suitable communication protocols. Similarly, one or more vehicle controllers 181.1 may be configured to communicate directly to the network 130 (via radio link 183*b*) or indirectly through mobile computing device 184.1 (via radio link 183*b*). Vehicle controllers 181.1 may also communicate with other vehicle controllers and/or mobile computing devices 184.2 directly or indirectly through mobile computing device 184.1 via local radio links 183*a*. As discussed elsewhere herein, network 130 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 183*a*-183*h* may represent wired links, wireless links, or any suitable combination thereof. For example, the links 183*e* and/or 183*f* may include wired links to the network 130, in addition to, or instead of, wireless radio connections.

In some embodiments, the external computing device 186 may mediate communication between the mobile computing devices 184.1 and 184.2, and/or the smart home controllers 185 and/or the personal electronic devices 189, based upon location or other factors. In embodiments in which mobile computing devices 184.1 and 184.2 communicate directly with one another in a peer-to-peer fashion, network 130 may be bypassed and thus communications between mobile computing devices 184.1 and 184.2 and external computing device 186 may be unnecessary. For example, in some aspects, mobile computing device 184.1 may broadcast geographic location data and/or telematics data directly to mobile computing device 184.2. In this case, mobile computing device 184.2 may operate independently of network 130 to determine operating data, risks associated with operation, control actions to be taken, and/or alerts to be generated at mobile computing device 184.2 based upon the geographic location data, sensor data, and/or the autonomous operation feature data. In accordance with such aspects, network 130 and external computing device 186 may be omitted.

However, in other aspects, one or more of mobile computing devices 184.1 and/or 184.2, and/or the smart home controllers 185 and/or the personal electronic devices 189, may work in conjunction with external computing device 186 to determine operating data, risks associated with operation, control actions to be taken, and/or alerts to be generated. For example, in some aspects, mobile computing device 184.1 may broadcast geographic location data and/or autonomous operation feature data, which is received by external computing device 186. In this case, external computing device 186 may be configured to determine whether the same or other information should be sent to mobile computing device 184.2 based upon the geographic location data, autonomous operation feature data, or data derived therefrom.

Mobile computing devices 184.1 and 184.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications. Such functionality may, in some embodiments be controlled in whole or part by a Data Application operating on the mobile computing devices 184, as discussed elsewhere herein. Such Data Application may communicate between the mobile computing devices 184, the smart home controllers 185, the personal electronic devices 189, and one or more external computing devices 186 (such as servers 140) to facilitate centralized data collection and/or processing.

In some embodiments, the Data Application may facilitate control of a vehicle 182 by a user, such as by selecting vehicle destinations and/or routes along which the vehicle 182 will travel. The Data Application may further be used to establish restrictions on vehicle use or store user preferences for vehicle use, such as in a user profile. In further embodiments, the Data Application may monitor vehicle operation or sensor data in real-time to make recommendations or for other purposes as described herein. The Data Application may further facilitate monitoring and/or assessment of the vehicle 182, such as by evaluating operating data to determine the condition of the vehicle or components thereof (e.g., sensors, autonomous operation features, etc.).

External computing device 186 may be configured to execute various software applications, algorithms, and/or other suitable programs. External computing device 186 may be implemented as any suitable type of device to facilitate the functionality as described herein. For example, external computing device 186 may be a server 140 as discusses elsewhere herein. As another example, the external computing device 186 may be another computing device associated with an operator or owner of a vehicle 182, such as a desktop or notebook computer. Although illustrated as a single device in FIG. 1B, one or more portions of external computing device 186 may be implemented as one or more storage devices that are physically co-located with external computing device 186, or as one or more storage devices utilizing different storage locations as a shared database structure (e.g. cloud storage).

In some embodiments, external computing device 186 may be configured to perform any suitable portion of the processing functions remotely that have been outsourced by one or more of mobile computing devices 184.1 and/or 184.2 (and/or vehicle controllers 181.1), and/or the smart home controllers 185 and/or the personal electronic devices 189. For example, mobile computing device 184.1 and/or 184.2 may collect data (e.g., geographic location data and/or telematics data) as described herein, but may send the data to external computing device 186 for remote processing instead of processing the data locally. In such embodiments, external computing device 186 may receive and process the data to determine whether an anomalous condition exists and, if so, whether to send an alert notification to one or more mobile computing devices 184.1 and 184.2 or take other actions.

In one aspect, external computing device 186 may additionally or alternatively be part of an insurer computing system (or facilitate communications with an insurer computer system), and as such may access insurer databases, execute algorithms, execute applications, access remote servers, communicate with remote processors, etc., as needed to perform insurance-related functions. Such insurance-related functions may include assisting insurance customers in evaluating autonomous operation features, limiting manual vehicle operation based upon risk levels, providing information regarding risk levels associated with autonomous and/or manual vehicle operation along routes, and/or determining repair/salvage information for damaged vehicles. For example, external computing device 186 may facilitate the receipt of autonomous operation or other data from one or more mobile computing devices 184.1-184.N, which may each be running a Data Application to obtain such data from autonomous operation features or sensors 120 associated therewith.

In aspects in which external computing device 186 facilitates communications with an insurer computing system (or is part of such a system), data received from one or more mobile computing devices 184.1-184.N, and/or the smart home controllers 185 and/or personal electronic devices 189, may include user credentials, which may be verified by external computing device 186 or one or more other external computing devices, servers, etc. These user credentials may be associated with an insurance profile, which may include, for example, insurance policy numbers, a description and/or listing of insured assets, vehicle identification numbers of insured vehicles, addresses of insured structures, contact information, premium rates, discounts, etc.

In this way, data received from one or more mobile computing devices 184.1-184.N, and/or the smart home controllers 185 and/or personal electronic devices 189, may allow external computing device 186 to uniquely identify each insured customer and/or whether each identified insurance customer has installed the Data Application. In addition, external computing device 186 may facilitate the communication of the updated insurance policies, premiums, rates, discounts, etc., to insurance customers for their review, modification, and/or approval—such as via wireless communication or data transmission to one or more mobile computing devices 184.1-184.N over one or more radio frequency links or wireless communication channels.

In some aspects, external computing device 186 may facilitate indirect communications between one or more of mobile computing devices 184, vehicles 182, smart home controllers 185, personal electronic devices 189, and/or smart infrastructure component 188 via network 130 or another suitable communication network, wireless communication channel, and/or wireless link. Smart infrastructure components 188 may be implemented as any suitable type of traffic infrastructure components configured to receive communications from and/or to send communications to other devices, such as mobile computing devices 184 and/or external computing device 186. Thus, smart infrastructure components 188 may include infrastructure components 126 having infrastructure communication devices 124. For example, smart infrastructure component 188 may be implemented as a traffic light, a railroad crossing signal, a construction notification sign, a roadside display configured to display messages, a billboard display, a parking garage monitoring device, etc.

In some embodiments, the smart infrastructure component 188 may include or be communicatively connected to one or more sensors (not shown) for detecting information relating to the condition of the smart infrastructure component 188, which sensors may be connected to or part of the infrastructure communication device 124 of the smart infrastructure component 188. The sensors (not shown) may generate data relating to weather conditions, traffic conditions, or operating status of the smart infrastructure component 188. The smart infrastructure component 188 may be configured to receive the sensor data generated and determine a condition of the smart infrastructure component 188, such as weather conditions, road integrity, construction, traffic, available parking spaces, etc.

In some aspects, smart infrastructure component 188 may be configured to communicate with one or more other devices directly and/or indirectly. For example, smart infrastructure component 188 may be configured to communicate directly with mobile computing device 184.2 via radio link 183d and/or with mobile computing device 184.1 via links 183b and 183f utilizing network 130. As another example, smart infrastructure component 188 may communicate with external computing device 186 via links 183e and 183f utilizing network 130. To provide some illustrative examples of the operation of the smart infrastructure component 188, if smart infrastructure component 188 is implemented as a smart traffic light, smart infrastructure component 188 may change a traffic light from green to red (or vice-versa) or adjust a timing cycle to favor traffic in one direction over another based upon data received from the vehicles 182. If smart infrastructure component 188 is implemented as a traffic sign display, smart infrastructure component 188 may display a warning message that an anomalous condition (e.g., an accident) has been detected ahead and/or on a specific road corresponding to the geographic location data.

Figure 2:
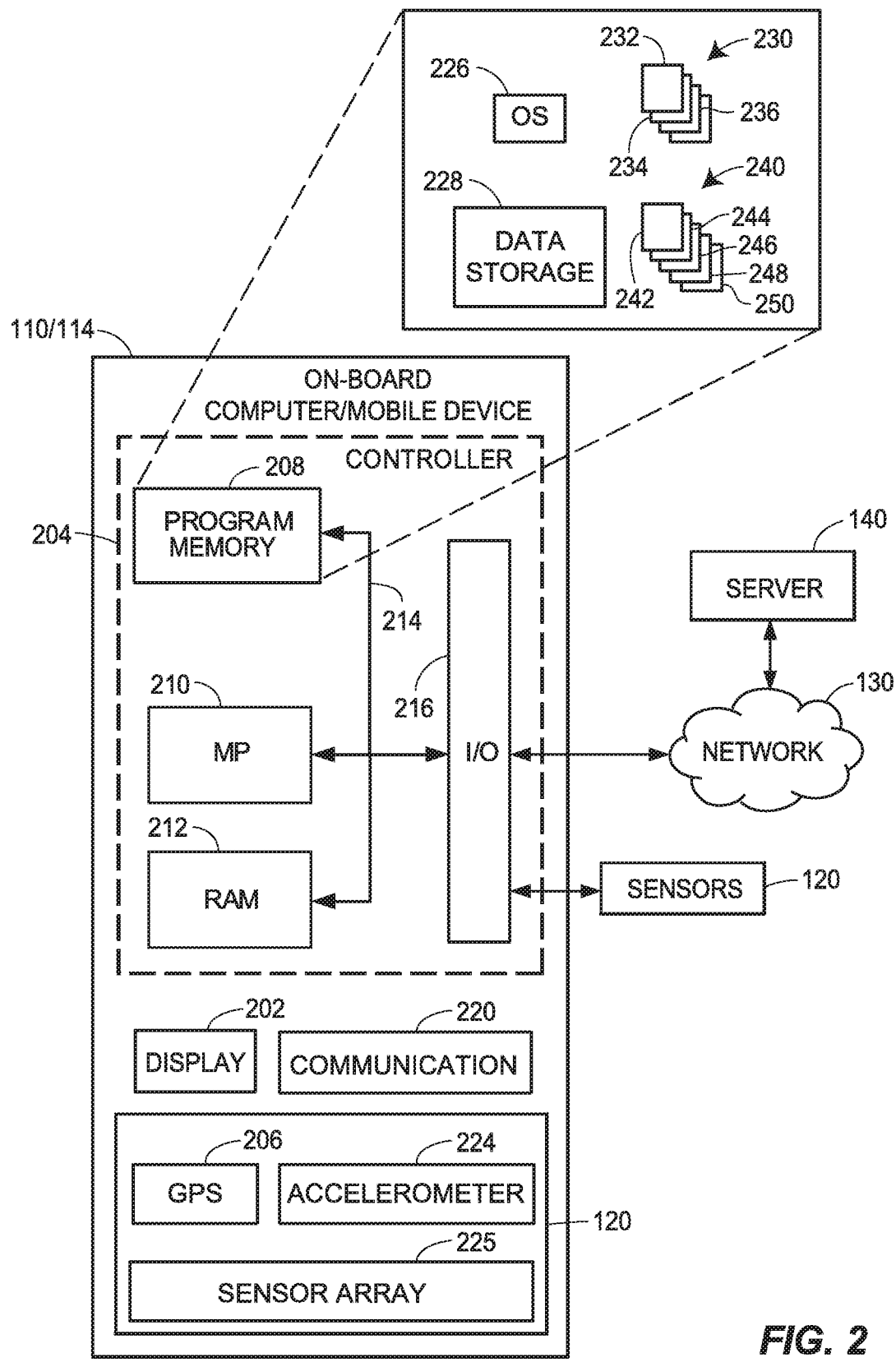
FIG. 2 illustrates a block diagram of an exemplary on-board computer or mobile device.

FIG. 2 illustrates a block diagram of an exemplary mobile device 110, smart home controller 185, or an exemplary on-board computer 114 consistent with the system 100 and the system 180. The mobile device 110, smart home controller 185, or the on-board computer 114 may include a display 202, a GPS unit 206, a communication unit 220, an accelerometer 224, one or more additional sensors (not shown), a user-input device (not shown), and/or, like the server 140, a controller 204. In some embodiments, the mobile device 110 and on-board computer 114 may be integrated into a single device, or either may perform the functions of both. The on-board computer 114 (or mobile device 110) interfaces with the sensors 120 to receive information regarding the vehicle 108 and its environment, which information is used by the autonomous operation features to operate the vehicle 108. Similarly, the smart home controller 185 interfaces with a plurality of sensors dispose on and/or proximate to a smart home 187, which information is used by the autonomous operation features to operate the smart home 187.

Similar to the controller 155, the controller 204 may include a program memory 208, one or more microcontrollers or microprocessors (MP) 210, a RAM 212, and an I/O circuit 216, all of which are interconnected via an address/data bus 214. The program memory 208 includes an operating system 226, a data storage 228, a plurality of software applications 230, and/or a plurality of software routines 240. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for autonomous vehicle operation using the on-board computer 114. The data storage 228 may include data such as user profiles and preferences, application data for the plurality of applications 230, routine data for the plurality of routines 240, and other data related to the autonomous operation features. In some embodiments, the controller 204 may also include, or otherwise be communicatively connected to, other data storage mechanisms (e.g., one or more hard disk drives, optical storage drives, solid state storage devices, etc.) that reside within the vehicle 108 and/or the smart home 187.

As discussed with reference to the controller 155, it should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, or optically readable memories, for example.

The one or more processors 210 may be adapted and configured to execute any of one or more of the plurality of software applications 230 or any one or more of the plurality of software routines 240 residing in the program memory 204, in addition to other software applications. One of the plurality of applications 230 may be an autonomous vehicle operation application 232 that may be implemented as a series of machine-readable instructions for performing the various tasks associated with implementing one or more of the autonomous operation features according to the autonomous operation method 300, described further below. Similarly, one of the plurality of applications 230 may be a smart home operation application (not depicted) for performing various tasks associated with implementing one or more of the autonomous operation features of the smart home 187. Another of the plurality of applications 230 may be an autonomous communication application 234 that may be implemented as a series of machine-readable instructions for transmitting and receiving autonomous operation information to or from external sources via the communication module 220. Still another application of the plurality of applications 230 may include an autonomous operation monitoring application 236 that may be implemented as a series of machine-readable instructions for sending information regarding autonomous operation of the vehicle to the server 140 via the network 130. The Data Application for collecting, generating, processing, analyzing, transmitting, receiving, and/or acting upon autonomous operation feature data may also be stored as one of the plurality of applications 230 in the program memory 208 of the mobile computing device 110, the on-board computer 114, and/or the smart home controller 185, which may be executed by the one or more processors 210 thereof.

The plurality of software applications 230 may call various of the plurality of software routines 240 to perform functions relating to autonomous vehicle and/or smart home operation, monitoring, or communication. One of the plurality of software routines 240 may be a configuration routine 242 to receive settings from the vehicle operator and/or smart home occupant to configure the operating parameters of an autonomous operation feature. Another of the plurality of software routines 240 may be a sensor control routine 244 to transmit instructions to a sensor 120 and receive data from the sensor 120. Still another of the plurality of software routines 240 may be an autonomous control routine 246 that performs a type of autonomous control, such as collision avoidance, lane centering, speed control, fire prevention, or temperature control. In some embodiments, the autonomous vehicle operation application 232 may cause a plurality of autonomous control routines 246 to determine control actions required for autonomous vehicle operation.

Similarly, one of the plurality of software routines 240 may be a monitoring and reporting routine 248 that transmits information regarding autonomous vehicle and/or smart home operation to the server 140 via the network 130. Yet another of the plurality of software routines 240 may be an autonomous communication routine 250 for receiving and transmitting information between the vehicle 108, the smart home 187, and external sources to improve the effectiveness of the autonomous operation features. Any of the plurality of software applications 230 may be designed to operate independently of the software applications 230 or in conjunction with the software applications 230.

When implementing the exemplary autonomous operation method 300, the controller 204 of the on-board computer 114 may implement the autonomous vehicle operation application 232 to communicate with the sensors 120 to receive information regarding the vehicle 108 and its environment and process that information for autonomous operation of the vehicle 108. In some embodiments including external source communication via the communication component 122 or the communication unit 220, the controller 204 may further implement the autonomous communication application 234 to receive information for external sources, such as other autonomous vehicles, smart infrastructure (e.g., electronically communicating roadways, traffic signals, or parking structures), personal electronic devices, or other sources of relevant information (e.g., weather, traffic, local amenities). Some external sources of information may be connected to the controller 204 via the network 130, such as the server 140 or internet-connected third-party databases (not shown). Although the autonomous vehicle operation application 232 and the autonomous communication application 234 are shown as two separate applications, it should be understood that the functions of the autonomous operation features may be combined or separated into any number of the software applications 230 or the software routines 240.

When implementing the autonomous operation feature monitoring method 400, the controller 204 may further implement the autonomous operation monitoring application 236 to communicate with the server 140 to provide information regarding autonomous operation. This may include information regarding settings or configurations of autonomous operation features, data from the sensors 120 and/or sensors associated with the smart home 187 regarding the environment, data from the sensors 120 and/or sensors associated with the smart home 187 regarding the response of the vehicle 108 and/or the smart home 187 to its environment, respectively, communications sent or received using the communication component 122 or the communication unit 220, operating status of the autonomous vehicle operation application 232 and the autonomous communication application 234, and/or control commands sent from the on-board computer 114 and/or the smart home controller 185 to the control components (not shown) to operate the vehicle 108 and/or the smart home 187.

In some embodiments, control commands generated by the on-board computer 114 and/or the smart home controller 185 but not implemented may also be recorded and/or transmitted for analysis of how the autonomous operation features would have responded to conditions if the features had been controlling the relevant aspect or aspects of vehicle operation. The information may be received and stored by the server 140 implementing the autonomous operation information monitoring application 141, and the server 140 may then determine the effectiveness of autonomous operation under various conditions by implementing the feature evaluation application 142, which may include an assessment of autonomous operation features compatibility. The effectiveness of autonomous operation features and the extent of their use may be further used to determine one or more risk levels associated with operation of the autonomous vehicle by the server 140.

In addition to connections to the sensors 120 that are external to the mobile device 110 or the on-board computer 114, the mobile device 110 or the on-board computer 114 may include additional sensors 120, such as the GPS unit 206 or the accelerometer 224, which may provide information regarding the vehicle 108 for autonomous operation and other purposes. Such sensors 120 may further include one or more sensors of a sensor array 225, which may include, for example, one or more cameras, accelerometers, gyroscopes, magnetometers, barometers, thermometers, proximity sensors, light sensors, Hall Effect sensors, etc. The one or more sensors of the sensor array 225 may be positioned to determine telematics data regarding the speed, force, heading, and/or direction associated with movements of the vehicle 108. Furthermore, the communication unit 220 may communicate with other autonomous vehicles, infrastructure, or other external sources of information to transmit and receive information relating to autonomous vehicle operation. The communication unit 220 may communicate with the external sources via the network 130 or via any suitable wireless communication protocol network, such as wireless telephony (e.g., GSM, CDMA, LTE, etc.), Wi-Fi (802.11 standards), WiMAX, Bluetooth, infrared or radio frequency communication, etc. Furthermore, the communication unit 220 may provide input signals to the controller 204 via the I/O circuit 216. The communication unit 220 may also transmit sensor data, device status information, control signals, or other output from the controller 204 to one or more external sensors within the vehicle 108, mobile devices 110, on-board computers 114, or servers 140.

The mobile device 110, the smart home controller 185, and/or the on-board computer 114 may include a user-input device (not shown) for receiving instructions or information from the vehicle operator and/or smart home occupant, such as settings relating to an autonomous operation feature. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Data Application

The mobile device 110, the smart home controller 185 and/or on-board computer 114 may run a Data Application to collect, transmit, receive, and/or process autonomous operation feature data. Such autonomous operation feature data may include data directly generated by autonomous operation features, such as control commands used in operating the vehicle 108 and/or the smart home 187. Similarly, such autonomous operation feature data may include shadow control commands generated by the autonomous operation features but not actually used in operating the vehicle and/or the smart home, such as may be generated when the autonomous operation features are disabled. The autonomous operation feature data may further include non-control data generated by the autonomous operation features, such as determinations regarding environmental conditions in the vehicle operating environment in which the vehicle 108 and/or the smart home 187 operates (e.g., traffic conditions, construction locations, pothole locations, worn lane markings, corners with obstructed views, weather conditions, crime conditions, etc.). The autonomous operation feature data may yet further include sensor data generated by (or derived from sensor data generated by) sensors 120 and/or sensor associated with the smart home 185 utilized by the autonomous operation features. For example, data from LIDAR and ultrasonic sensors may be used by vehicles for autonomous operation. As another example, an accelerometer may be used by smart homes to detect an earthquake and autonomously initiate an appropriate response. Such data captures a much more detailed and complete representation of the conditions in which the vehicle 108 and/or smart home 187 operates than traditional operation metrics (e.g., miles driven) or non-autonomous telematics data (e.g., acceleration, position, and time).

Autonomous operation feature data may be processed and used by the Data Application to determine information regarding the vehicle 108 and/or the smart home 187, its operation, or its operating environment. The autonomous operation feature data may further be communicated by the Data Application to a server 140 via network 130 for processing and/or storage. In some embodiments, the autonomous operation feature data (or information derived therefrom) may be transmitted directly via radio links 183 or indirectly via network 130 from the vehicle 108 and/or the smart home 187 to other vehicles and/or smart homes (or to mobile devices 110). By communicating information associated with the autonomous operation feature data to other nearby vehicles and/or smart homes, the other vehicles and/or smart homes or their operators may make use of such data for routing, control, or other purposes. This may be particularly valuable in providing detailed information regarding an operating environment (e.g., traffic, accidents, flooding, ice, etc.) collected by a Data Application of an autonomous vehicle 108 and/or the smart home 187 to a driver of a non-autonomous vehicle and/or an occupant of a non-smart home via a Data Application of a mobile device 110 associated with the driver and/or occupant. For example, ice patches may be identified by an autonomous operation feature of a vehicle controller 181.1 of vehicle 182.1 and transmitted via the Data Application operating in the mobile computing device 184.1 over the network 130 to the mobile computing device 184.2, where a warning regarding the ice patches may be presented to the driver of vehicle 182.2. As another example, locations of emergency vehicles or accidents may be determined and communicated between vehicles 182, such as between an autonomous vehicle 182.1 and a traditional (non-autonomous) vehicle 182.2.

In further embodiments, a Data Application may serve as an interface between the user and an autonomous vehicle 108 and/or the smart home 187, via the user's mobile device 110, the vehicle's on-board computer 114, and/or the smart home controller 185. The user may interact with the Data Application to locate, retrieve, or park the vehicle 108 and/or control or monitor the vehicle 108 and/or the smart home 187. For example, the Data Application may be used to select a destination and route the vehicle 108 to the destination, which may include controlling the vehicle to travel to the destination in a fully autonomous mode. In some embodiments, the Data Application may further determine and/or provide information regarding the vehicle 108, such as the operating status or condition of autonomous operation features, sensors, or other vehicle components (e.g., tire pressure). In yet further embodiments, the Data Application may be configured to assess risk levels associated with operation based upon location, autonomous operation feature use (including settings), operating conditions, or other factors. Such risk assessment may be further used in recommending autonomous feature use levels, generating warnings to a vehicle operator and/or smart home occupant, or adjusting an insurance policy associated with the vehicle 108 and/or the smart home 187.

Data Applications may be installed and running on a plurality of mobile devices 110, on-board computers 114, and/or smart home controllers 185 in order to facilitate data sharing and other functions as described herein. Additionally, such Data Applications may provide data to, and receive data from, one or more servers 140. For example, a Data Application running on a user's mobile device 110 may communicate location data to a server 140 via the network 130. The server 140 may then process the data to determine a route, risk level, recommendation, or other action. The server 140 may then communicate the determined information to the mobile device 110, the on-board computer 114, and/or the smart home controller 185, which may cause the vehicle 108 and/or the smart home 187 to operate in accordance with the determined information (e.g., travel along a determined optimal route, initiate measures to prevent weather/environmental damage, etc.). Thus, the Data Application may facilitate data communication between the front-end components 102 and the back-end components 104, allowing more efficient processing and data storage.

Exemplary Autonomous Operation Method

Figure 3:
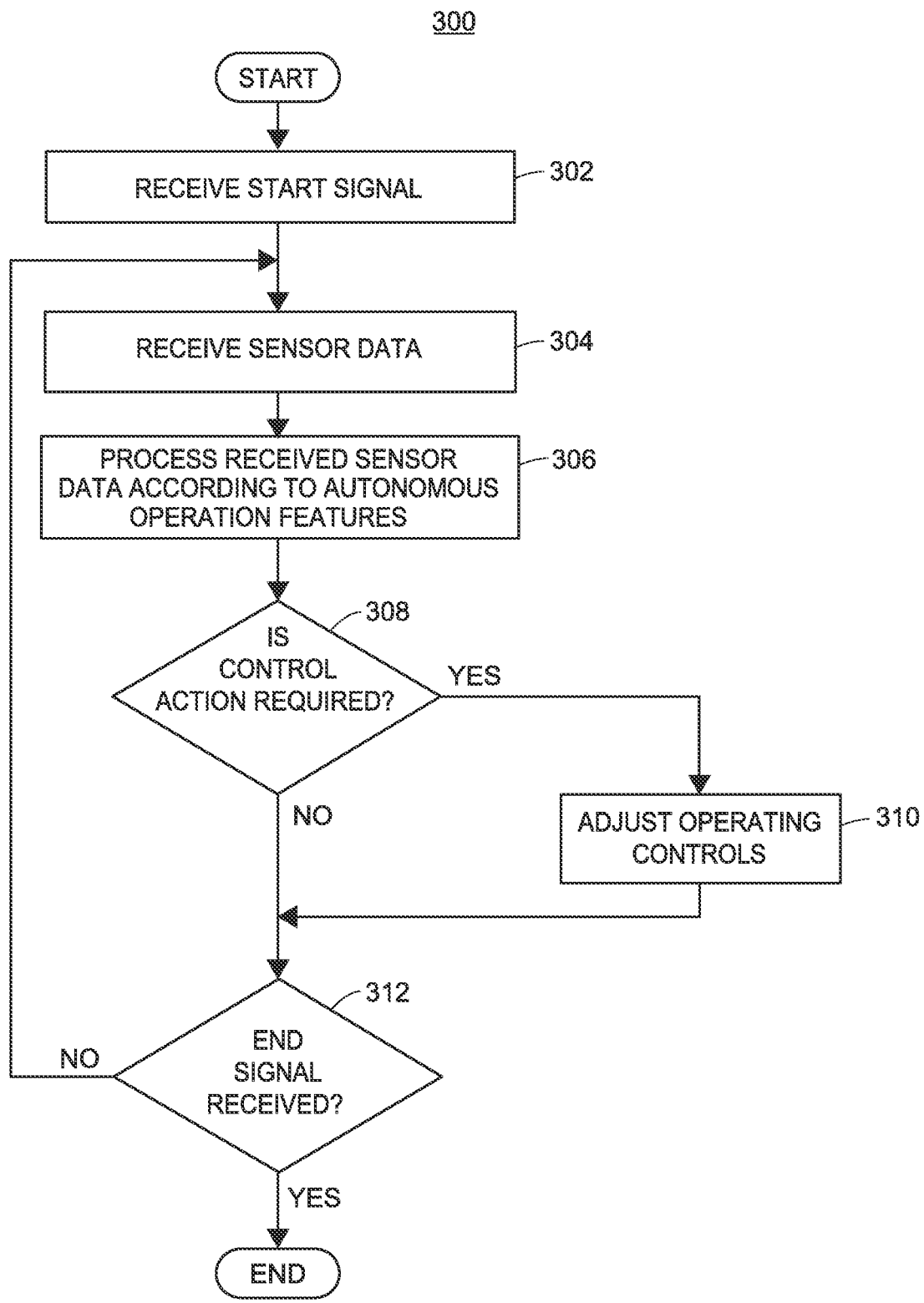
FIG. 3 illustrates a flow diagram of an exemplary autonomous vehicle operation computer-implemented method.

FIG. 3 illustrates a flow diagram of an exemplary autonomous operation method 300, which may be implemented by the autonomous vehicle data system 100. The method 300 may begin when the controller 204 receives a start signal (block 302). The start signal may be a command from the vehicle operator through the user-input device to enable or engage one or more autonomous operation features of the vehicle 108 and/or a command from a smart home occupant through the user-input device to enable or engage one or more autonomous operation features of the smart home 187. In some embodiments, the vehicle operator and/or smart home occupant may further specify settings or configuration details for the autonomous operation features. For fully autonomous vehicles, the settings may relate to one or more destinations, route preferences, fuel efficiency preferences, speed preferences, or other configurable settings relating to the operation of the vehicle 108. In some embodiments, fully autonomous vehicles may include additional features or settings permitting them to operate without passengers or vehicle operators within the vehicle. For example, a fully autonomous vehicle may receive an instruction to find a parking space within the general vicinity, which the vehicle may do without the vehicle operator. The vehicle may then be returned to a selected location by a request from the vehicle operator via a mobile device 110 or otherwise. This feature may further be adapted to return a fully autonomous vehicle if lost or stolen.

For some autonomous vehicles and/or smart homes, the settings may include enabling or disabling particular autonomous operation features, specifying thresholds for autonomous operation, specifying warnings or other information to be presented to the vehicle operator and/or occupant, specifying autonomous communication types to send or receive, specifying conditions under which to enable or disable autonomous operation features, or specifying other constraints on feature operation. For example, a vehicle operator may set the maximum speed for an adaptive cruise control feature with automatic lane centering. In some embodiments, the settings may further include a specification of whether the vehicle 108 should be operating as a fully or partially autonomous vehicle.

In embodiments where only one autonomous operation feature is enabled, the start signal may consist of a request to perform a particular task (e.g., autonomous parking or engage weather-proofing) or to enable a particular feature (e.g., autonomous braking for collision avoidance or engage autonomous lighting that follows an occupant). In other embodiments, the start signal may be generated automatically by the controller 204 based upon predetermined settings (e.g., when the vehicle 108 exceeds a certain speed or is operating in low-light conditions). In some embodiments, the controller 204 may generate a start signal when communication from an external source is received (e.g., when the vehicle 108 is on a smart highway, near another autonomous vehicle, or a national weather service issues an alert). In some embodiments, the start signal may be generated by or received by the Data Application running on a mobile device 110, on-board computer 114 within the vehicle 108, and/or smart home controller within the smart home 187. The Data Application may further set or record settings for one or more autonomous operation features of the vehicle 108 and/or the smart home 187.

After receiving the start signal at block 302, the controller 204 receives sensor data from the sensors 120, and/or sensors associated with the smart home 187, during operation (block 304). In some embodiments, the controller 204 may also receive information from external sources through the communication component 122 or the communication unit 220. The sensor data may be stored in the RAM 212 for use by the autonomous vehicle operation application 232. In some embodiments, the sensor data may be recorded in the data storage 228 or transmitted to the server 140 via the network 130. The Data Application may receive the sensor data, or a portion thereof, and store or transmit the received sensor data. In some embodiments, the Data Application may process or determine summary information from the sensor data before storing or transmitting the summary information. The sensor data may alternately either be received by the controller 204 as raw data measurements from one of the sensors 120 and/or sensors associated with the smart home 187 or may be preprocessed by the sensor 120 and/or sensors associated with the smart home 187 prior to being received by the controller 204. For example, a tachometer reading may be received as raw data or may be preprocessed to indicate vehicle movement or position. As another example, a sensor 120 comprising a radar or LIDAR unit may include a processor to preprocess the measured signals and send data representing detected objects in 3-dimensional space to the controller 204.

The autonomous vehicle operation application 232 or other applications 230 or routines 240 may cause the controller 204 to process the received sensor data in accordance with the autonomous operation features (block 306). The controller 204 may process the sensor data to determine whether an autonomous control action is required or to determine adjustments to the controls of the vehicle 108 and/or the smart home 187 (i.e., control commands). For example, the controller 204 may receive sensor data indicating a decreasing distance to a nearby object in the vehicle's path and process the received sensor data to determine whether to begin braking (and, if so, how abruptly to slow the vehicle 108).

As another example, the controller 204 may process the sensor data to determine whether the vehicle 108 is remaining with its intended path (e.g., within lanes on a roadway). If the vehicle 108 is beginning to drift or slide (e.g., as on ice or water), the controller 204 may determine appropriate adjustments to the controls of the vehicle to maintain the desired bearing. If the vehicle 108 is moving within the desired path, the controller 204 may nonetheless determine whether adjustments are required to continue following the desired route (e.g., following a winding road). Under some conditions, the controller 204 may determine to maintain the controls based upon the sensor data (e.g., when holding a steady speed on a straight road).

As still another example, the controller 204 may process the sensor data to determine whether fire containment and/or extinguishing response is actually containing and/or extinguishing a fire located at the smart home 187. If the fire continues to spread, the controller 204 may determine appropriate adjustments to the containment and/or extinguishing response. If the fire is properly contained, the controller 204 may continue to monitor the fire containment and/or extinguishing response to prevent collateral damage.

In some embodiments, the Data Application may record information related to the processed sensor data, including whether the autonomous operation features have determined one or more control actions to control the vehicle and/or details regarding such control actions. The Data Application may record such information even when no control actions are determined to be necessary or where such control actions are not implemented. Such information may include information regarding the vehicle operating environment determined from the processed sensor data (e.g., construction, other vehicles, pedestrians, anomalous environmental conditions, etc.). The information collected by the Data Application may further include an indication of whether and/or how the control actions are implemented using control components of the vehicle 108 and/or the smart home 187.

When the controller 204 determines an autonomous control action is required (block 308), the controller 204 may cause the control components of the vehicle 108 to adjust the operating controls of the vehicle 108 and/or the smart home 187 achieve desired operation (block 310). For example, the controller 204 may send a signal to open or close the throttle of the vehicle 108 to achieve a desired speed. Alternatively, the controller 204 may control the steering of the vehicle 108 to adjust the direction of movement. In some embodiments, the vehicle 108 may transmit a message or indication of a change in velocity or position using the communication component 122 or the communication module 220, which signal may be used by other autonomous vehicles to adjust their controls. As discussed elsewhere herein, the controller 204 may also log or transmit the autonomous control actions to the server 140 via the network 130 for analysis. In some embodiments, an application (which may be a Data Application) executed by the controller 204 may communicate data to the server 140 via the network 130 or may communicate such data to the mobile device 110 for further processing, storage, transmission to nearby vehicles, smart homes, infrastructure, and/or communication to the server 140 via network 130.

The controller 204 may continue to receive and process sensor data at blocks 304 and 306 until an end signal is received by the controller 204 (block 312). The end signal may be automatically generated by the controller 204 upon the occurrence of certain criteria (e.g., the destination is reached, environmental conditions require manual operation of the vehicle 108 by the vehicle operator, or an occupant-defined end condition is satisfied). Alternatively, the vehicle operator and/or smart home occupant may pause, terminate, or disable the autonomous operation feature or features using the user-input device or by manually operating the vehicle's controls, such as by depressing a pedal or turning a steering instrument, and/or by manually interacting with smart equipment disposed in the smart home 187. When the autonomous operation features are disabled or terminated, the controller 204 may either continue operation without the autonomous features or may shut off the vehicle 108 and/or various smart equipment, depending upon the circumstances.

Where control of the vehicle 108 must be returned to the vehicle operator and/or control of the smart home 187 must be returned to the smart home occupant, the controller 204 may alert the vehicle operator and/or smart home occupant in advance of returning to manual operation. The alert may include a visual, audio, or other indication to obtain the attention of the vehicle operator and/or smart home occupant. In some embodiments, the controller 204 may further determine whether the vehicle operator is capable of resuming manual operation before terminating autonomous operation. If the vehicle operator is determined not to be capable of resuming operation, the controller 204 may cause the vehicle to stop or take other appropriate action.

The autonomous operation features may generate and implement control decisions relating to the control of the motive, steering, and stopping components of the vehicle 108 and/or the various components of the smart home 187. The control decisions may include or be related to control commands issued by the autonomous operation features to control such control components of the vehicle 108 and/or the smart home 187 during operation. In some embodiments, control decisions may include decisions determined by the autonomous operation features regarding control commands such feature would have issued under the conditions then occurring, but which control commands were not issued or implemented. For example, an autonomous operation feature may generate and record shadow control decisions it would have implemented if engaged to operate the vehicle 108 and/or the smart home 187 even when the feature is disengaged (or engaged using other settings from those that would produce the shadow control decisions).

Data regarding the control decisions actually implemented and/or the shadow control decisions not implemented to control the vehicle 108 and/or the smart home 187 may be recorded for use in assessing autonomous operation feature effectiveness, accident and/or event reconstruction and fault determination, feature use or settings recommendations, risk determination and insurance policy adjustments, or other purposes as described elsewhere herein. For example, actual control decisions may be compared against control decisions that would have been made by other systems, software versions, or with additional sensor data or communication data.

As used herein, the terms "preferred" or "preferably made" control decisions mean control decisions that optimize some metric associated with risk under relevant conditions. Such metric may include, among other things, a statistical correlation with one or more risks (e.g., risks related to a vehicle collision) or an expected value associated with risks (e.g., a risk-weighted expected loss associated with potential vehicle accidents). The preferably made, or preferred or recommended, control decisions discussed herein may include control decisions or control decision outcomes that are less risky, have lower risk or the lowest risk of all the possible or potential control decisions given various operating conditions, and/or are otherwise ideal, recommended, or preferred based upon various operating conditions, including autonomous system or feature capability; current road, environmental or weather, traffic, or construction conditions through which the vehicle is traveling; and/or current versions of autonomous system software or components that the autonomous vehicle is equipped with and using.

The preferred or recommended control decisions may result in the lowest level of potential or actual risk of all the potential or possible control decisions given a set of various operating conditions and/or system features or capabilities. Alternatively, the preferred or recommended control decisions may result in a lower level of potential or actual risk (for a given set of operating conditions) to the autonomous vehicle and passengers, and other people or vehicles, than some of the other potential or possible control decisions that could have been made by the autonomous system or feature.

Exemplary Monitoring Method

Figure 4A:
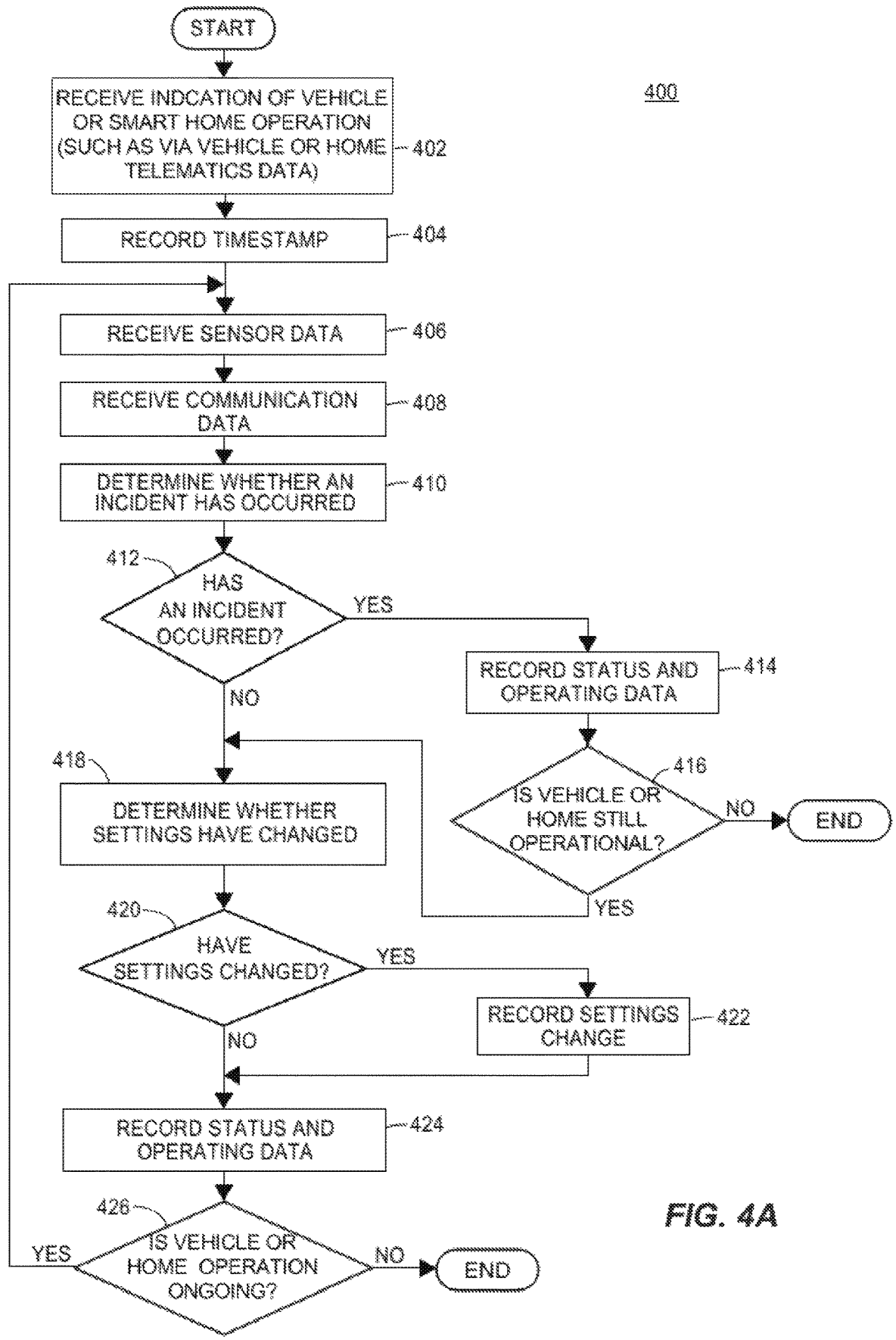
FIGS. 4A-B illustrate flow diagrams of exemplary autonomous operation monitoring computer-implemented methods for obtaining and recording information during autonomous operation.

FIG. 4A is a flow diagram depicting an exemplary autonomous operation monitoring method 400, which may be implemented by the autonomous vehicle data system 100. The method 400 monitors the operation of the vehicle 108, the smart home 187, and/or the personal electronic device 189 and transmits information regarding the vehicle 108, the smart home 187, and/or the personal electronic device 189 to the server 140, which information may then be used to determine autonomous operation feature usage or effectiveness. The method 400 may be used for monitoring the state of the vehicle 108, the smart home 187, and/or the personal electronic device 189, for providing data to other vehicles 182 and/or smart homes, for responding to emergencies or unusual situations during operation, for testing autonomous operation features in a controlled environment, for determining actual feature use during operation outside a test environment, for assessment of feature operation, and/or for other purposes described herein. In alternative embodiments, the method 400 may be implemented whenever the vehicle 108, the smart home 187, and/or the personal electronic device 189 is in operation (manual or autonomous) or only when the autonomous operation features are enabled.

The method 400 may likewise be implemented as either a real-time process, in which information regarding the vehicle 108, the smart home 187, and/or the personal electronic device 189 is communicated to the server 140 while monitoring is ongoing, or as a periodic process, in which the information is stored within the vehicle 108, the smart home 187, and/or the personal electronic device 189 and communicated to the server 140 at intervals (e.g., upon completion of a trip or when an incident occurs, when a loss-event occurs, etc.). In some embodiments, the method 400 may communicate with the server 140 in real-time when certain conditions exist (e.g., when a sufficient data connection through the network 130 exists or when no roaming charges would be incurred). In further embodiments, a Data Application executed by the mobile device 110, the on-board computer 114, the smart home controller 185, and/or the personal electronic device 189 may perform such monitoring, recording, and/or communication functions, including any of the functions described below with respect to blocks 402-434.

The method 400 may begin when the controller 204 receives an indication of vehicle, smart home, and/or personal electronic device operation (block 402). The indication may be generated when the vehicle 108 is started, when the smart home 187 becomes occupied, or when an autonomous operation feature is enabled by the controller 204 or by input from the vehicle operator and/or smart home occupant, as discussed above. In response to receiving the indication, the controller 204 may create a timestamp (block 404). The timestamp may include information regarding the date, time, location, operating environment, condition, and autonomous operation feature settings or configuration information. The date and time may be used to identify one vehicle trip or one period of autonomous operation feature use, in addition to indicating risk levels due to various factors, such as traffic, weather, and so on.

The additional location and environmental data may include information regarding the position of the vehicle 108 from the GPS unit 206 and its surrounding environment (e.g., road conditions, weather conditions, nearby traffic conditions, type of road, construction conditions, presence of pedestrians, presence of other obstacles, availability of autonomous communications from external sources, etc.). Condition information may include information regarding the type, make, and model of the vehicle 108, the age or mileage of the vehicle 108, the status of vehicle equipment (e.g., tire pressure, non-functioning lights, fluid levels, etc.), the type, make, and model of smart devices within the smart home 187, or other information relating to the vehicle 108, the smart home 187, and/or the personal electronic device 189. In some embodiments, condition information may further include information regarding the sensors 120, such as type, configuration, or operational status (which may be determined, for example, from analysis of actual or test data from the sensors). In some embodiments, the timestamp may be recorded on the client device 114, the mobile device 110, or the server 140.

The autonomous operation feature settings may correspond to information regarding the autonomous operation features, such as those described above with reference to the autonomous operation method 300. The autonomous operation feature configuration information may correspond to information regarding the number and type of the sensors 120 (which may include indications of manufacturers and models of the sensors 120), the disposition of the sensors 120 within the vehicle 108, the smart home 187, and/or the personal electronic device 189 (which may include disposition of sensors 120 within one or more mobile devices 110), the one or more autonomous operation features (e.g., the autonomous vehicle operation application 232 or the software routines 240), autonomous operation feature control software, versions of the software applications 230 or routines 240 implementing the autonomous operation features, or other related information regarding the autonomous operation features.

For example, the configuration information may include the make and model of the vehicle 108 (indicating installed sensors 120 and the type of on-board computer 114), an indication of smart devices and the type of smart home controller 185 within the smart home 187, an indication of a malfunctioning or obscured sensor 120 in part of the vehicle 108, the smart home 187, and/or the personal electronic device 189, information regarding additional after-market sensors 120 installed within the vehicle 108, the smart home 187, and/or the personal electronic device 189, a software program type and version for a control program installed as an application 230 on the on-board computer 114, the smart home controller 185, and/or the personal electronic device 189, and software program types and versions for each of a plurality of autonomous operation features installed as applications 230 or routines 240 in the program memory 208 of the on-board computer 114, the smart home controller 185, and/or the personal electronic device 189.

During operation, the sensors 120 may generate sensor data regarding the vehicle 108, the smart home 187, and/or the personal electronic device 189 and its environment, which may include other vehicles 182 or smart homes within the operating environment of the vehicle 108, the smart home 187, and/or the personal electronic device 189. In some embodiments, one or more of the sensors 120 may preprocess the measurements and communicate the resulting processed data to the on-board computer 114, the smart home controller 185, and/or the personal electronic device 189 and/or the mobile device 110. The controller 204 may receive sensor data from the sensors 120 (block 406). The sensor data may include information regarding the vehicle's position, speed, acceleration, direction, and responsiveness to controls.

The sensor data may further include information regarding the location and movement of obstacles or obstructions (e.g., other vehicles, buildings, barriers, pedestrians, animals, trees, or gates), weather conditions (e.g., precipitation, wind, visibility, or temperature), road conditions (e.g., lane markings, potholes, road material, traction, or slope), signs or signals (e.g., traffic signals, construction signs, building signs or numbers, or control gates), or other information relating to the operating environment. In some embodiments, sensors 120 may indicate the number of passengers within the vehicle 108 and/or occupants within the smart home 187, including an indication of whether the vehicle and/or smart home is entirely empty.

In addition to receiving sensor data from the sensors 120, in some embodiments the controller 204 may receive autonomous communication data from the communication component 122 or the communication module 220 (block 408). The communication data may include information from other autonomous vehicles (e.g., sudden changes to vehicle speed or direction, intended vehicle paths, hard braking, vehicle failures, collisions, or maneuvering or stopping capabilities), infrastructure (road or lane boundaries, bridges, traffic signals, control gates, or emergency stopping areas), other smart homes (e.g., the presence of potentially hazardous conditions), or other external sources (e.g., map databases, weather databases, or traffic and accident databases). In some embodiments, the communication data may include data from non-autonomous vehicles and/or homes, which may include data regarding operation or anomalies within the operating environment determined by a Data Application operating on a mobile device 110, on-board computer 114, the smart home controller 185, and/or the personal electronic device 189. The communication data may be combined with the received sensor data received to obtain a more robust understanding of the operating environment.

For example, the server 140 or the controller 204 may combine sensor data indicating frequent changes in speed relative to tachometric data with map data relating to a road upon which the vehicle 108 is traveling to determine that the vehicle 108 is in an area of hilly terrain. As another example, weather data indicating recent snowfall in the vicinity of the vehicle 108 may be combined with sensor data indicating frequent slipping or low traction to determine that the vehicle 108 is traveling on a snow-covered or icy road.

The controller 204 may process the sensor data, the communication data, and the settings or configuration information to determine whether an incident has occurred (block 410). As used herein, an "incident" is an occurrence during operation of an autonomous vehicle, smart home, and/or personal electronic device outside of normal safe operating conditions, such that one or more of the following occurs: (i) there is an interruption of ordinary operation, (ii) there is damage to the vehicle, smart home, personal electronic device or other property, (iii) there is injury to a person, (iv) the conditions require action to be taken by an operator, occupant, autonomous operation feature, pedestrian, or other party to avoid damage or injury, and/or (v) an anomalous condition is detected that requires an adjustment outside of ordinary vehicle operation. Incidents from categories (ii) and (iii) above may be considered "loss-events." Incidents may include collisions, hard braking, hard acceleration, evasive maneuvering, loss of traction, detection of objects within a threshold distance from the vehicle 108, alerts presented to the vehicle operator, component failure, inconsistent readings from sensors 120, or attempted unauthorized access to the on-board computer by external sources. Incidents may also include accidents, vehicle breakdowns, flat tires, empty fuel tanks, or medical emergencies. Incidents may further include identification of construction requiring the vehicle to detour or stop, hazardous conditions (e.g., fog or road ice), or other anomalous environmental conditions.

In some embodiments, the controller 204 may anticipate or project an expected incident based upon sensor or external data, allowing the controller 204 to send control signals to minimize the negative effects of the incident. For example, the controller 204 may cause the vehicle 108 to slow and move to the shoulder of a road immediately before running out of fuel. As another example, adjustable seats within the vehicle 108 may be adjusted to better position vehicle occupants in anticipation of a collision, windows may be opened or closed, or airbags may be deployed. As yet another example, storm shutters for windows of the smart home 187 may be activated in anticipation of a weather event.

When an incident is determined to have occurred (block 412), information regarding the incident and the vehicle, smart home, and/or personal electronic device status may be recorded (block 414), either in the data storage 228 or the database 146. The information recorded may include sensor data, communication data, and settings or configuration information prior to, during, and immediately following the incident. In some embodiments, a preliminary determination of fault may also be produced and stored. The information may further include a determination of whether the vehicle 108, the smart home 187, and/or the personal electronic device 189 has continued operating (either autonomously or manually) or whether the vehicle 108, the smart home 187, and/or the personal electronic device 189 is capable of continuing to operate in compliance with applicable safety and legal requirements. If the controller 204 determines that the vehicle 108, the smart home 187, and/or the personal electronic device 189 has discontinued operation or is unable to continue operation (block 416), the method 400 may terminate. If the vehicle 108, the smart home 187, and/or the personal electronic device 189 continues operation, then the method 400 may continue as described below with reference to block 418.

Figure 4B:
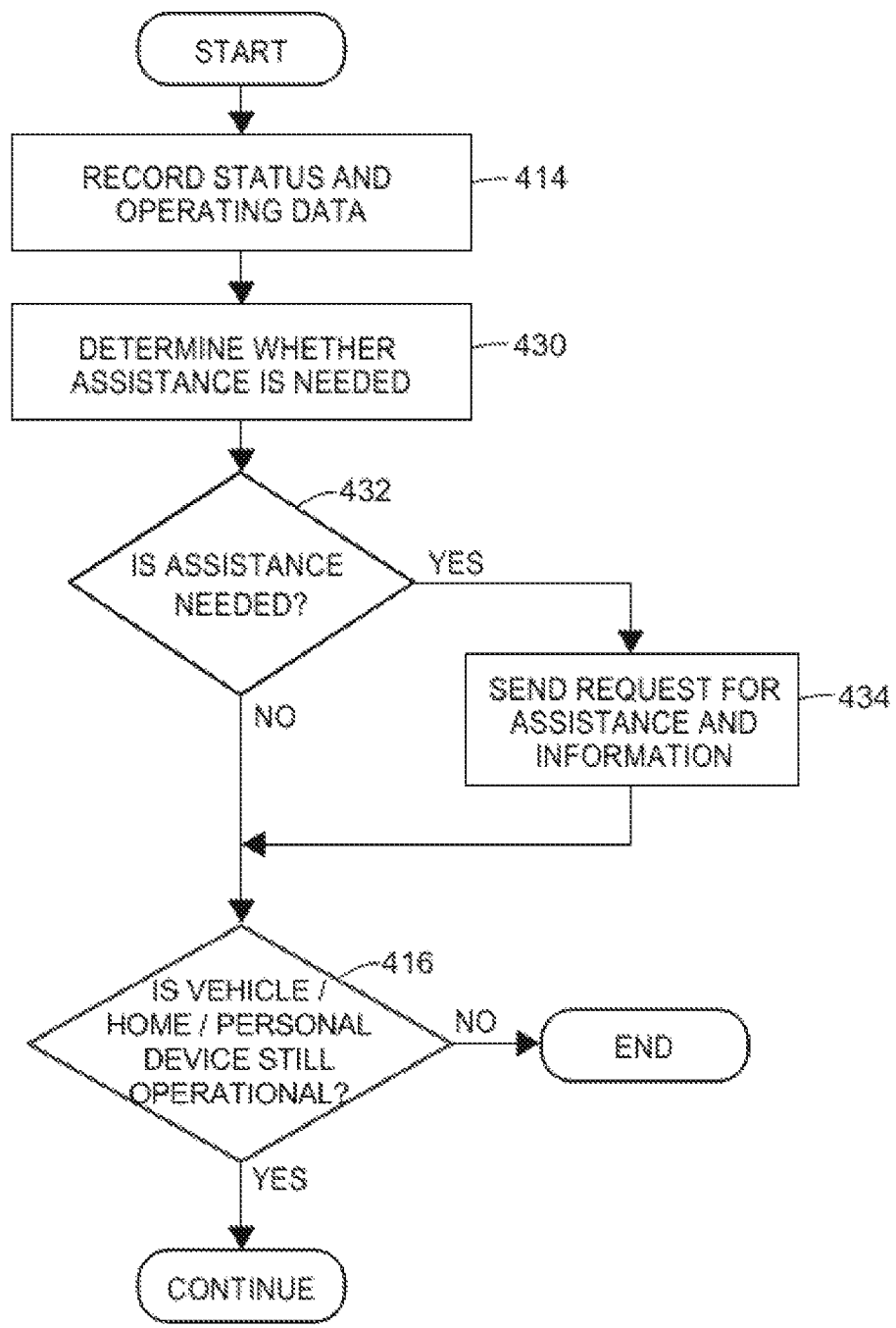

FIG. 4B illustrates an alternative portion of the method 400 following an incident. When an incident is determined to have occurred (block 412), the controller 204 or the server 140 may record status and operating information (block 414), as above. In some instances, the incident may interrupt communication between the vehicle 108, the smart home 187, and/or the personal electronic device 189 and the server 140 via network 130, such that not all information typically recorded will be available for recordation and analysis by the server 140. Based upon the recorded data, the server 140 or the controller 204 may determine whether assistance may be needed at the location of the vehicle 108, the smart home 187, and/or the personal electronic device 189 (block 430). For example, the controller 204 may determine that a head-on collision has occurred based upon sensor data (e.g., airbag deployment, automatic motor shut-off, LIDAR data indicating a collision, etc.) and may further determine based upon information regarding the speed of the vehicle 108 and other information that medical, police, and/or towing services will be necessary. The determination that assistance is needed may further include a determination of types of assistance needed (e.g., police, ambulance, fire, towing, vehicle maintenance, fuel delivery, etc.). This determination may include analysis of the type of incident, the sensor data regarding the incident (e.g., images from outward facing or inward facing cameras installed within the vehicle, the smart home, and/or the personal electronic device, identification of whether any passengers and/or occupants were present within the vehicle and/or smart home, determination of whether any pedestrians or passengers in other vehicles were involved in the incident, etc.). The determination of whether assistance is needed may further include information regarding the determined status of the vehicle 108, the smart home 187, and/or the personal electronic device 189.

In some embodiments, the determination regarding whether assistance is needed may be supplemented by a verification attempt, such as a phone call or communication through the on-board computer 114, the smart home controller 189, and/or the personal electronic device 189. Where the verification attempt indicates assistance is required or communication attempts fail, the server 140 or controller 204 would then determine that assistance is needed, as described above. For example, when assistance is determined to be needed following an accident involving the vehicle 108 and/or a loss-event at the smart home 187, the server 140 may direct an automatic telephone call to a mobile telephone number associated with the vehicle 108, the smart home 187, and/or the personal electronic device 189 and/or operator and/or occupant thereof. If no response is received, or if the respondent indicates assistance is required, the server 140 may proceed to cause a request for assistance to be generated.

When assistance is determined to be needed (block 432), the controller 204 or the server 140 may send a request for assistance (block 434). The request may include information regarding the vehicle 108, the smart home 187, and/or the personal electronic device 189, such as the location, the type of assistance required, other vehicles or homes involved in the incident, pedestrians involved in the incident, vehicle operators or passengers involved in the incident, and/or other relevant information. The request for assistance may include telephonic, data, or other requests to one or more emergency or vehicular service providers (e.g., local police, fire departments, state highway patrols, emergency medical services, public or private ambulance services, hospitals, towing companies, roadside assistance services, vehicle rental services, local claims representative offices, etc.). After sending a request for assistance (block 434) or when assistance is determined not to be needed (block 432), the controller 204 or the server 140 may next determine whether the vehicle 108, the smart home 187, and/or the personal electronic device 189 is operational (block 416), as described above. The method 400 may then end or continue as indicated in FIG. 4A.

In some embodiments, the controller 204 may further determine information regarding the likely cause of a collision or other incident. Alternatively, or additionally, the server 140 may receive information regarding an incident from the on-board computer 114, the smart home controller 185, and/or the personal electronic device 189 and determine relevant additional information regarding the incident from the sensor data. For example, the sensor data may be used to determine the points of impact on the vehicle 108 and another vehicle involved in a collision, the relative velocities of each vehicle, the road conditions at the time of the incident, and the likely cause or the party likely at fault. This information may be used to determine risk levels associated with autonomous vehicle operation, as described below, even where the incident is not reported to the insurer.

The controller 204 may determine whether a change or adjustment to one or more of the settings or configuration of the autonomous operation features has occurred (block 418). Changes to the settings may include enabling or disabling an autonomous operation feature or adjusting the feature's parameters (e.g., resetting the speed on an adaptive cruise control feature). For example, an operator may selectively enable or disable autonomous operation features such as automatic braking, lane centering, temperature control, or even fully autonomous operation at different times. If the settings or configuration are determined to have changed, the new settings or configuration may be recorded (block 422), either in the data storage 228 or the database 146. For example, the Data Application may log autonomous operation feature use and changes in a log file, including timestamps associated with the features in use.

Next, the controller 204 may record the operating data relating to the vehicle 108, the smart home 187, and/or the personal electronic device 189 in the data storage 228 or communicate the operating data to the server 140 via the network 130 for recordation in the database 146 (block 424). The operating data may include the settings or configuration information, the sensor data, and/or the communication data discussed above. In some embodiments, operating data related to normal autonomous operation of the vehicle 108, the smart home 187, and/or the personal electronic device 189 may be recorded. In other embodiments, only operating data related to incidents of interest may be recorded, and operating data related to normal operation may not be recorded. In still other embodiments, operating data may be stored in the data storage 228 until a sufficient connection to the network 130 is established, but some or all types of incident information may be transmitted to the server 140 using any available connection via the network 130.

The controller 204 may then determine whether operation of the vehicle 108, the smart home 187, and/or the personal electronic device 189 remains ongoing (block 426). In some embodiments, the method 400 may terminate when all autonomous operation features are disabled, in which case the controller 204 may determine whether any autonomous operation features remain enabled. When the vehicle 108 is determined to be operating (or operating with at least one autonomous operation feature enabled), the method 400 may continue through blocks 406-426 until operation has ended. When the vehicle 108, the smart home 187, and/or the personal electronic device 189 is determined to have ceased operating (or is operating without autonomous operation features enabled), the controller 204 may record the completion of operation (block 428), either in the data storage 228 or the database 146. In some embodiments, a second timestamp corresponding to the completion of operation may likewise be recorded, as above.

Exemplary Incident Response Methods

Figure 5:
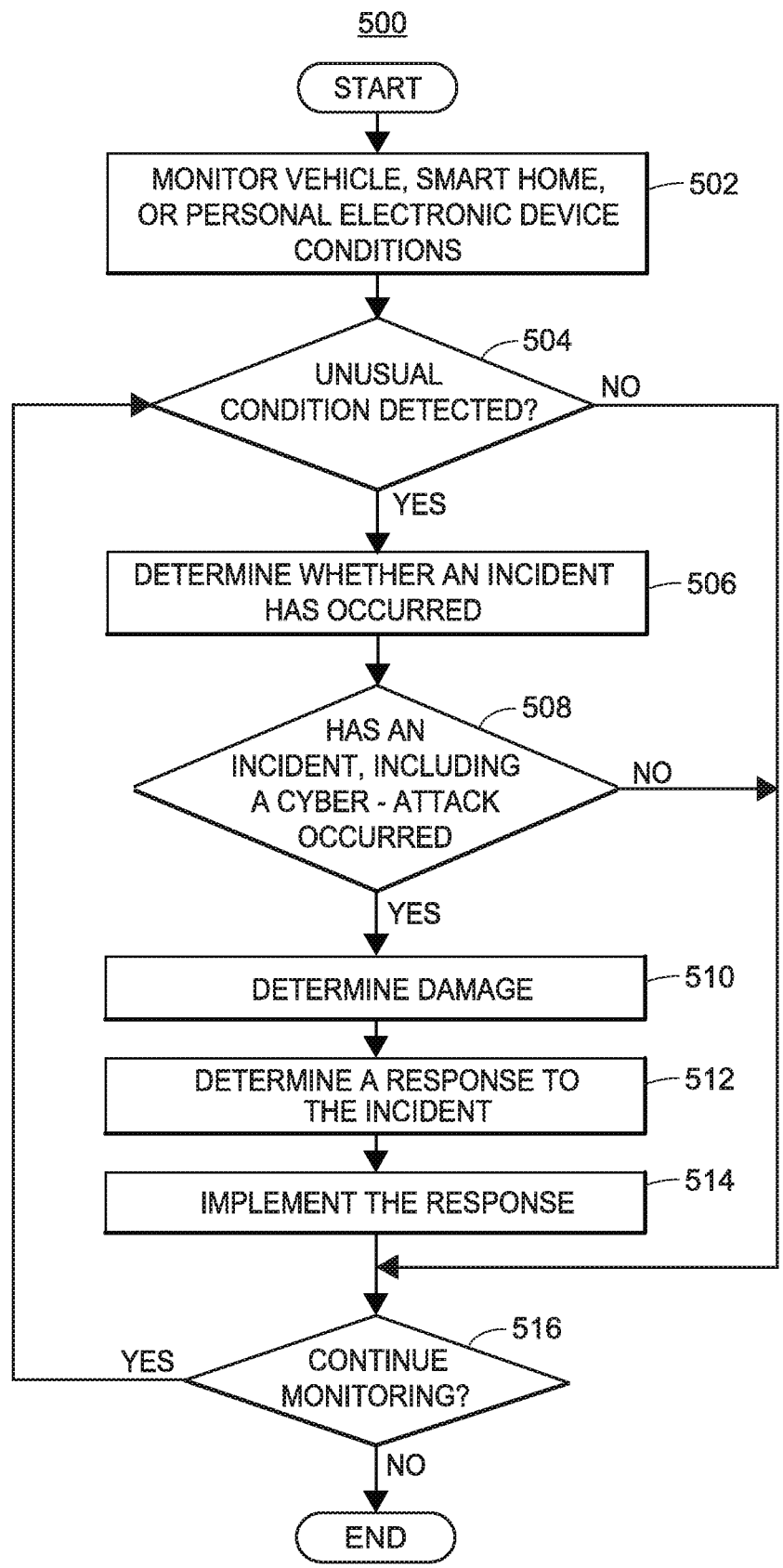
FIG. 5 illustrates a flow diagram of an exemplary incident response computer-implemented method for detecting and responding to incidents involving a vehicle and/or smart home while engaged in fully autonomous operation or in the absence of a vehicle operator and/or smart home occupant.

FIG. 5 illustrates a flow diagram of an exemplary incident response method 500 for detecting and responding to incidents involving a vehicle 108, a smart home 187, and/or a personal electronic device 189 while engaged in fully autonomous operation or in the absence of an operator and/or an occupant. The vehicle 108, the smart home 187, and/or the personal electronic device 189 may be operating in a fully autonomous mode of operation without any control decisions being made by a vehicle operator and/or smart home occupant, excluding navigation decisions, such as selection of a destination or route, and/or preference decisions, such as selection of a desired temperature for a room. In some embodiments, the vehicle 108 and/or the smart home 187 may be operating without any passengers and/or occupants or with only passengers and/or occupants who are physically or legally unable to operate the vehicle 108 and/or the smart home 187 in a manual or semi-autonomous mode of operation (e.g., children, persons suffering acute illness, physically handicapped persons, intoxicated or otherwise impaired persons, etc.). Alternatively, the vehicle 108 may be parked in a non-operating state. Particularly when the vehicle 108 and/or the smart home 187 is unoccupied, detection and response to collisions or other incidents interrupting ordinary autonomous operation pose particular challenges that do not arise during manual operation or semi-autonomous operation. Such incidents are typically unintentional and unexpected, and such incidents frequently coincide with damage to sensor components (including sensors 120) or structural components that are essential for safe operation of the vehicle and/or smart home. Additionally, autonomous vehicles and/or smart homes may be incapable of performing actions typically performed by operators and/or occupants in response to manual incidents (e.g., moving a vehicle out of a traffic lane, replacing a tire, moving debris, assessing damage, providing information to authorities, etc.). The incident response method 500 addresses at least these issues.

The incident response method 500 may begin by monitoring the condition of the vehicle 108, the smart home 187, and/or the personal electronic device 189 (block 502), which may include monitoring operating data from the vehicle 108, the smart home 187, and/or the personal electronic device 189 during autonomous operation. If an indication of an unusual condition is detected (block 504), further analysis may be performed to determine whether an incident has occurred (block 506). If an incident (or an incident having sufficient impact upon operation of the vehicle 108, the smart home 187, and/or the personal electronic device 189) is determined to have occurred (block 508), damage to the vehicle 108, the smart home 187, the personal electronic device 189, and/or to other objects may be assessed (block 510). Such assessment may include determining the operating capabilities of the vehicle 108, the smart home 187, and/or the personal electronic device 189, which may be diminished by damage to sensors 120 or other components.

Based upon the determination of damage, one or more responses to the incident may then be determined (block 512). The vehicle 108, the smart home 187, and/or the personal electronic device 189 then implements the one or more responses to address the incident (block 514). In some embodiments, additional responses may be implemented by a server 140 or other device. The method 500 then determines whether monitoring should continue (block 516). If the vehicle 108, the smart home 187, and/or the personal electronic device 189 is continuing to operate or it is otherwise determined that monitoring should continue, the method 500 continues to monitor the autonomous operation (block 502). If operation of the vehicle 108, the smart home 187, and/or the personal electronic device 189 has concluded, the method 500 terminates.

If no indication of an unusual condition is detected (block 504) or no incident having a sufficient impact upon autonomous operation is determined to have occurred (block 508), the method 500 may continue to monitor operation of the vehicle 108, the smart home 187, and/or the personal electronic device 189 as long as vehicle operation continues or it is otherwise determined that monitoring should continue (block 516). Although the method 500 is described with reference to the on-board computer 114, the smart home controller 185, and/or the personal electronic device 189 for simplicity, the described method may be readily modified for implementation by other systems or devices, including one or more of mobile devices 110 and/or servers 140.

At block 502, the on-board computer 114, the smart home controller 185, and/or the personal electronic device 189 of the vehicle 108 and/or the smart home 187 may monitor the condition of the vehicle 108, the smart home 187, and/or the personal electronic device 189. This may include receiving and processing operating data from one or more sensors 120 and/or other components within the vehicle 108, the smart home 187, and/or the personal electronic device 189. The on-board computer 114, the smart home controller 185, and/or the personal electronic device 189 may begin monitoring autonomous operation automatically whenever the vehicle 108, the smart home 187, and/or the personal electronic device 189 is started and/or becomes occupied, or whenever the vehicle 108, the smart home 187, and/or the personal electronic device 189 begins fully autonomous operation. Alternatively, the on-board computer 114, the smart home controller 185, and/or the personal electronic device 189 may begin monitoring when it detects that the vehicle 108, the smart home 187, and/or the personal electronic device 189 is being operated in a fully autonomous mode without passengers and/or occupants. In some embodiments, the on-board computer 114, the smart home 187, and/or the personal electronic device 189 may monitor the condition of the vehicle 108, the smart home 187, and/or the personal electronic device 189 when not in use, such as while the vehicle 108 is parked and/or while the smart home 187 is unoccupied. In such embodiments, the on-board computer 114, the smart home 187, and/or the personal electronic device 189, may begin and/or continue monitoring the vehicle, smart home, and/or personal electronic device condition when the vehicle 108 is parked or shut down, or monitoring may begin and/or continue when the operator exits the vehicle 108 and/or egresses the smart home 187.

To conserve energy and/or processor usage (particularly in electric vehicles or when parked, and/or smart homes operating on power derived from a local generator), the on-board computer 114, the smart home controller 185, and/or the personal electronic device 189 may monitor the vehicle 108, the smart home 187, and/or the personal electronic device 189 with a limited set of operating data or data from a limited set of sensors 120. In further embodiments, the on-board computer 114, the smart home controller 185, and/or the personal electronic device 189 may monitor the vehicle, smart home, and/or personal electronic device condition by comparing received operating data at time intervals longer than the time intervals between ordinary sensor data readings used for autonomous operation. For example, the on-board computer 114, the smart home controller 185, and/or the personal electronic device 189 may process received operating data every thirty seconds or every minute to detect indications of incidents that may affect autonomous operation. In some embodiments, the on-board computer 114, the smart home 187, and/or the personal electronic device 189 may control one or more of the sensors 120 to generate sensor data at such intervals, particularly where the vehicle 108 is not presently operating (e.g., when parked) and/or when the smart home 187 is unoccupied.

The on-board computer 114, the smart home controller 185, and/or the personal electronic device 189 may monitor the operating data for indications of unusual conditions that are indicative of a likelihood of an incident, which may require further assessment and response. Such indications of unusual conditions may include discontinuities in the operating data, divergence between sensor data from one or more sensors and control data from one or more autonomous operation features, a plurality of sensor malfunctions, sudden sensor failure (particularly when multiple sensors fail at substantially the same time), and/or sensed conditions associated with incidents (e.g., distance to a sensed object reaching zero, unexpected lane departures, etc.). In some embodiments, indications of unusual conditions may be directly received from sensors 120, autonomous operation features (i.e., hardware or software components performing particular aspects of autonomous operation), and/or other components of the vehicle 108, the smart home 187, and/or the personal electronic device 189 as error signals or alerts.

For example, a sensor 120 may perform a self-diagnostic routine at start-up or periodically and may further send an alert to the on-board computer 114, the smart home controller 185, and/or the personal electronic device 189 when the sensor 120 is self-determined to be damaged or otherwise malfunctioning.

Indications of unusual conditions may include data points that are associated with a likelihood of a collision or other incident requiring a response, even though such indications may be insufficient to determine such response without further analysis. For example, unexpected or inaccurate sensor data from a nonessential sensor 120 may be caused by damage or by temporary obstruction (e.g., by ice or dirt accumulation).

In yet further embodiments, an indication of an unusual condition may be determined or received with respect to another vehicle, smart home, pedestrian, or object within the current environment of the vehicle 108, the smart home 187, and/or the personal electronic device 189. Such indication may include information regarding an occurrence or likelihood of an incident not directly involving the vehicle 108, the smart home 187, and/or the personal electronic device 189. For example, the incident may involve another autonomous, semi-autonomous, or traditional vehicle within a predetermined or variable distance of the vehicle 108. In a particular embodiment, the vehicle 108, the smart home 187, and/or the personal electronic device 189 may receive an autonomous communication message including the indication of the unusual condition from another vehicle and/or smart home via short-range wireless communication transmission and via the communication component 122. For example, the other vehicle and/or smart home may automatically send a distress signal upon determining it has been involved in a collision or otherwise detects an emergency condition, which distress signal may be received and processed by the vehicle 108, the smart home 187, and/or the personal electronic device 189 to determine and implement an appropriate response.

At block 504, the on-board computer 114, the smart home controller 185, and/or the personal electronic device 189 may determine whether any indications of unusual conditions have been detected. If no such indication of unusual conditions have been identified by the on-board computer 114, the smart home controller 185, and/or the personal electronic device 189, the method 500 may continue by determining whether to continue monitoring (block 516), as discussed below. If one or more unusual conditions are identified by the on-board computer 114, the smart home controller 185, and/or the personal electronic device 189, the method 500 may instead continue to determine whether an incident requiring a response has occurred (block 506).

At block 506, the on-board computer 114, the smart home controller 185, and/or the personal electronic device 189 determines whether an incident has occurred. This determination may include determining the type of incident, as well as determining whether the incident requires a response. The on-board computer 114, the smart home controller 185, and/or the personal electronic device 189 may receive or collect additional data regarding the vehicle 108, the smart home 187, and/or the personal electronic device 189 or the autonomous environment for the determination. In some embodiments, this may include obtaining or accessing additional operating data that had been previously generated. In further embodiments, the on-board computer 114, the smart home controller 185, and/or the personal electronic device 189 may cause one or more sensors 120 or other components to generate additional operating data for the determination.

In yet further embodiments, the on-board computer 114, the smart home controller 185, and/or the personal electronic device 189 may obtain communication data from other vehicles, smart homes, infrastructure components, or other data sources. The operating data to be used in determining whether an incident has occurred may be selected in part based upon the one or more identified indications of unusual conditions. For example, the on-board computer 114, the smart home controller 185, and/or the personal electronic device 189 may activate additional sensors 120 positioned in the same area of a vehicle and/or smart home as an identified potentially malfunctioning sensor 120 in order to obtain additional relevant data regarding the identified sensor 120.

The on-board computer 114, the smart home controller 185, and/or the personal electronic device 189 may determine whether an incident has occurred by analyzing the operating data and/or other data to identify incidents, such as collisions with other vehicles, infrastructure, pedestrians, animals, or other objects. Other incidents that may be determined may include component failure events (e.g., tire blowouts, sensor failure, etc.), software malfunctions (e.g., hacking attempts, cyber-attacks, corrupted software, unresponsive routines, etc.), impassible roadways (e.g., due to accidents, police action, flooding, debris, etc.), severe weather (e.g., dense fog, high winds, or other conditions preventing autonomous operation), and/or other incidents that may require a response outside of the ordinary operation of the vehicle 108, the smart home 187, and/or the personal electronic device 189. Although incidents are described as directly affecting the operation of the vehicle 108, the smart home 187, and/or the personal electronic device 189, some embodiments may include determining whether incidents are occurring that impact the operation of another vehicle, smart home, personal electronic device, or person in the operating environment of the vehicle 108, the smart home 187, and/or the personal electronic device 189.

Determining the occurrence of an incident may include determining a type of incident (e.g., collision, component failure, software malfunction, impassible roadway, severe weather, etc.). In some embodiments, determining the occurrence of an incident may further include determining whether the incident has a sufficient impact on autonomous operation to require a response (i.e., is the incident of sufficient severity or urgency as to require an immediate response). In yet further embodiments, determining an incident requires a response may include determining that the incident increases one or more risks associated with autonomous operation above a maximum threshold level for safe operation of the vehicle 108, the smart home 187, and/or the personal electronic device 189 in a fully autonomous mode. Determining an incident requires a response may further include determining whether a legal or other obligation requires a response, such as reporting a collision or remaining at the location of a collision. In some instances, determining an incident requires a response may include determining whether a response is required to assist an injured pedestrian, passenger of another vehicle, an occupant, and/or that similar assistance is needed.

The on-board computer 114, the smart home controller 185, and/or the personal electronic device 189 may determine an occurrence (which may include the severity or impact) of the incident based upon an analysis of the obtained data. This determination may include comparing the obtained operating data and/or other data with expected or baseline data to determine whether the obtained data is outside an ordinary or expected range. This determination may further include comparing data from a plurality of sources to determine inconsistencies and identify sources of such inconsistencies (e.g., identifying which of a plurality of sensors 120 is malfunctioning when inconsistent data is received). In some embodiments, this determination may further include analyzing or reconstructing a portion of a time period associated with the unusual condition to determine whether the incident has occurred. For example, the on-board computer 114 and/or smart home controller 185 may process operating data for a time period during which an incident has occurred to reconstruct the incident and obtain relevant information, such as location, force of impact, indications that autonomous safety features were triggered, etc.

In further embodiments, the on-board computer 114, the smart home controller 185, and/or the personal electronic device 189 may test components of the vehicle 108, the smart home 187, and/or the personal electronic device 189 that may be affected to determine operating status. For example, the on-board computer 114, the smart home controller 185, and/or the personal electronic device 189 may determine a tire of the vehicle 108 has gone flat based upon vehicle heading relative to control data from one or more autonomous operation features in response to an indication from a tire pressure sensor that the tire pressure has dropped. In embodiments associated with the vehicle 108, the degree of divergence between the control commands and the observed vehicle trajectory may be further used to determine the urgency of repairing or replacing the tire. As another example, the on-board computer 114, the smart home controller 185, and/or the personal electronic device 189 may determine whether an incident has occurred based upon operating data (such as sensor data from accelerometers) and, if so, whether the incident requires a response.

At block 508, the on-board computer 114, the smart home controller 185, and/or the personal electronic device 189 may determine whether an incident, including a cyberattack, has been determined to have occurred. As discussed above, the on-board computer 114, the smart home controller 185, and/or the personal electronic device 189 may ignore incidents not requiring a response. If no incident is determined to have occurred (or if no response is required), the method 500 may continue by determining whether to continue monitoring (block 516), as discussed below. If at least one incident requiring a response is determined to have occurred, the method 500 may continue by determining damage associated with the incident (block 510).

At block 510, the on-board computer 114, the smart home controller 185, and/or the personal electronic device 189 may determine damage associated with the determined incident. Such damage determination may include assessing or estimating damage to the vehicle 108, the smart home 187, and/or the personal electronic device 189 or another vehicle, another smart home, an injury to a pedestrian or passenger, or damage to another object in the autonomous operating environment. The damage may include physical damage to the sensors 120 or other components of the vehicle 108, the smart home controller 185, and/or the personal electronic device 189, such as the sort of damage that typically occurs during collisions and/or other loss-events. The damage may likewise include electronic damage to software involved in autonomous operation, such as the sort of damage that typically results from unauthorized access to a computer system or infection of a computer system by malicious code, such as when the component is the target of a cyber-attack. The on-board computer 114, the smart home controller 185, and/or the personal electronic device 189 may determine the damage based upon the obtained operating data and/or other data described elsewhere herein, which may include data from one or more sensors 120. In some embodiments, determining damage may include determining whether the vehicle 108, the smart home controller 185, and/or the personal electronic device 189 can continue to operate in a fully or partially autonomous operation mode within predetermined safety parameters and/or whether a passenger and/or occupant is capable of operating the vehicle 108, the smart home 187, and/or the personal electronic device 189 in a manually and/or semi-autonomously within predetermined safety parameters (i.e., having risk levels for such operation below predetermined safe operation threshold levels of risk).

Determining damage to components of the vehicle 108, the smart home 187, and/or the personal electronic device 189 may include determining that sensors 120 are not functioning properly based upon conflicting sensor readings, error signals, and/or sensor unresponsiveness. In some embodiments, multiple sensor failures in a region of the vehicle 108, the smart home 187, and/or the personal electronic device 189 may be used to determine damage to other components (e.g., body or structural damage in the area of the sensors). For example, the on-board computer 114 may determine that damage to multiple sensors 120 in the front-right portion of the vehicle 108 following a collision further indicates that headlights, signal lights, and the front bumper in that area are likely also damaged. As another example, the smart home controller 185 may determine damage to the basement of the smart home 187 further indicates that electronic devices in the basement are likely also damaged. In further embodiments, operating data regarding the vehicle 108, the smart home 187, and/or the personal electronic device 189 (such as data indicating the vehicle's movement or the location of other objects in the autonomous operating environment) may be used by the on-board computer 114, the smart home controller 185, and/or the personal electronic device 189 to determine damage to the vehicle 108, the smart home 187, and/or the personal electronic device 189, damage to other vehicles and/or smart homes, damage to other objects, or injuries to persons in the operating environment. Such operating data may include telematics data regarding vehicle movement, position, direction, and/or speed, as well as data regarding impact location and/or force.

At block 512, the on-board computer 114, the smart home controller 185, and/or the personal electronic device 189 may determine a response to the incident. Such response may be determined based upon the type of incident and/or the damage involved. Additional factors may also be used to determine the appropriate response to the incident, such as location, urgency of an injury, importance of an interrupted vehicle trip, availability of a vehicle operator to reach the vehicle location, safety considerations, legal obligations regarding the incident, or other factors. The on-board computer 114, the smart home controller 185, and/or the personal electronic device 189 may select from a plurality of potential responses, ranging from completely shutting down to continuing to operate in a fully autonomous mode along the remainder of an unmodified route to a destination without any changes. In some embodiments, the determined response may include one or more notifications to an interested party remote from the vehicle 108 and/or the smart home 185, such as an owner, occupant, operator, or insurer of the vehicle 108, the smart home 187, and/or the personal electronic device 189. Such notifications may be generated by the on-board computer 114, the smart home controller 185, and/or the personal electronic device 189 or by the server 140 based upon information received from the on-board computer 114, the smart home controller 185, and/or the personal electronic device 189 and may be transmitted via the network 130.

In some embodiments, the response may further include notifications to one or more parties associated with another object involved in the incident, such as an owner, occupant, or insurer of another vehicle and/or smart home. Such notices may be communicated directly using communication components of the vehicle 108, the smart home controller 185, and/or the personal electronic device 189 or may be communicated via the network 130 when a relevant party is remote from the site of the incident. For example, a notification to a utility company may be sent in response to determining that the vehicle 108 has collided with a utility pole or other infrastructure (or utility infrastructure has collided with the vehicle 108) and/or in response to determining that the utility has been cut off at the smart home 187, which may require inspection and/or repair.

In situations in which the determined damage has significantly impaired the ability of the vehicle 108, the smart home 187, and/or the personal electronic device 189 to operate safely in a fully autonomous operation mode, the determined response may include a determination not to continue operation or to cease autonomous operation of the vehicle 108, the smart home 187, and/or the personal electronic device 189. In some embodiments, the vehicle 108, the smart home 187, and/or the personal electronic device 189 may be completely inoperable, and the response may include automatically contacting a third party to have the vehicle towed to a service or disposal facility and/or have the smart home site cleared for rebuilding. In these embodiments, the response may additionally include contacting an autonomous vehicle dispatch center to dispatch a replacement autonomous vehicle to the location of the vehicle 108. If the vehicle 108 is capable of being operated at least short distances, the on-board computer 114 may identify a position out of the flow of traffic to which to move the vehicle 108. In such instances, the on-board computer 114 may determine a response including moving the vehicle 108 out of a traffic lane to a nearby location, such as a roadway shoulder, a parking lane, or a parking lot. In some embodiments, the response may include such movement regardless of whether the vehicle 108 is able to safely complete the original vehicle trip, such as in situations in which the on-board computer 114 has determined the vehicle 108 should remain at the incident location.

The response may include causing the vehicle 108 to remain at the site of the incident for a number of reasons, including legal obligations, further assessment of the incident, further analysis of the functional state of the vehicle 108, or communicating with or aiding another party involved in the incident. Thus, some embodiments may include determining a response that includes establishing communication between persons in the vicinity of the vehicle 108, the smart home 187, and/or the personal electronic device 189 and a remote owner, operator, or other party associated with the vehicle 108, the smart home 187, and/or the personal electronic device 189 via the network 130. Such communication may be established using one or more speakers, microphones, cameras or image capture devices, displays 202, or other components of the vehicle 108, the smart home 187, and/or the personal electronic device 189 to facilitate two-way communication. In this manner, a remote owner or agent may communicate with persons at the location of the incident, such as police, paramedics, operators of other vehicles, pedestrians, etc. This communication may be necessary to provide or exchange information regarding the vehicle 108, the smart home 187, and/or the personal electronic device 189 or the incident, or for emergency response coordination.

In some embodiments, the response may include an emergency action and/or response. Such emergency action and/or response may include automatically communicating with an emergency response service to obtain emergency medical, fire, or police assistance, which may include communication via the server 140 or via a remote agent contacting an appropriate emergency responder. In response to determining that an incident has resulted in a serious injury to a pedestrian, an occupant, or a passenger of another vehicle, for example, the on-board computer 114, the smart home controller 185, and/or the personal electronic device 189 may determine an emergency action and/or response that includes communication to request emergency assistance from an emergency response service. The emergency action and/or response may further include establishing communication with the injured person or other persons in the vicinity of the vehicle 108, the smart home 187, and/or the personal electronic device 189, as discussed above.

Such emergency communication may be established between an emergency assistance representative (e.g., a representative of the owner, occupant, operator, insurer, or other interested party or a representative of an emergency response service) and the injured person or other persons in the vicinity of the vehicle 108, the smart home 187, and/or the personal electronic device 189 using communication components of the vehicle 108, the smart home 187, and/or the personal electronic device 189. Emergency actions and/or responses may additionally, or alternatively, include use of the vehicle 108 to transport one or more persons from the location of the incident to an emergency or other appropriate facility. If the vehicle 108 is determined to be operable with risk levels below a safe operation threshold, the emergency action and/or response may include facilitating access to the vehicle 108 and using the vehicle 108 to transport the one or more persons to the emergency facility (such as a hospital) in a fully autonomous mode.

In some embodiments, the response may include granting limited access to operate the vehicle 108, the smart home 187, and/or the personal electronic device 189 to other persons. Such access may likewise be granted to allow manual or autonomous operation of the vehicle 108, the smart home 187, and/or the personal electronic device 189, such as for emergency transportation, to move the vehicle 108 out of the path of traffic, and/or to enable fire equipment at the smart homer 187. For example, access may be granted to allow the vehicle 108 to be moved to a shoulder of a road, an emergency stopping area, or a nearby parking lot. The response may thus include unlocking doors and allowing control for vehicle and/or smart home operation up to a threshold (e.g., a distance threshold such as one mile, a time threshold such as ten minutes, etc.). The access granted may include manual access to allow a vehicle operator to drive the vehicle 108 or autonomous access to allow a local or remote vehicle operator to direct the vehicle 108 to a user-selected location. In some embodiments, such access may only be granted to authorized emergency personnel, such as police, fire, or medical personnel. This limited access may be achieved by wireless communication of an official verification signal to the vehicle 108, the smart home 187, and/or the personal electronic device 189 via the communication component 122. Similarly, a remote vehicle operator at an emergency response facility may be granted control over the vehicle 108 to control the vehicle's movements in an autonomous mode from a remote location, such as by selecting a parking location out of the flow of traffic (e.g., along a shoulder of a road).

In further embodiments, the on-board computer 114, the smart home controller 185, and/or the personal electronic device 189 may determine that the vehicle 108, the smart home 187, and/or the personal electronic device 189 should be repaired. For example, one or more sensors 120 of the vehicle 108, the smart home 187, and/or the personal electronic device 189 may be malfunctioning, necessitating repair or replacement. In instances in which the vehicle 108 is capable of continued safe operation in a fully autonomous mode, the response may include selecting a repair facility and routing the vehicle 108 to the repair facility by fully autonomous operation to be repaired. The selection of the repair facility may include a determination that the repair facility is capable of providing the necessary repairs, has a sufficient stock of components determined to be required, and/or is able to perform the repairs within timing and budgetary constraints. Selection may further include communicating with the repair facility (either automatically by the on-board computer 114, the smart home controller 185, and/or the personal electronic device 189, or server 140 or manually by a person associated with the vehicle 108, the smart home 187, and/or the personal electronic device 189) to schedule or confirm an appointment for the repairs.

In some embodiments, a determination regarding liability or insurance coverage for the costs associated with the repairs may be made, and the relevant payor may be required to authorize the repairs. In further embodiments, alternative transportation and/or lodging may be automatically arranged for a vehicle and/or smart home owner or operator while the vehicle 108 and/or smart home 187 is undergoing repair. Said alternative transportation may include taxi service, temporary vehicle-sharing membership, vehicle rental, or similar temporary replacement transportation. Similarly, alternative lodging may include a hotel, a time-share, a peer-to-peer lodging, a rental, or other temporary lodging services.

In yet further embodiments, the response may include automatically and permanently replacing the vehicle 108 with an equivalent vehicle. An equivalent replacement vehicle may be one of equivalent make, model, year, style, color, mileage, age, equipment, components, or similar characteristics. Information regarding the exchange of the vehicles may be automatically provided to vehicle owners, insurers, lienholders, government or private registries, or other relevant individuals or organizations. Additionally, personal items within the vehicle 108 may be transferred to the replacement vehicle, and settings and configurations may be transferred by electronic communication to the replacement vehicle. In this manner, the exchange of the vehicle 108 for the replacement vehicle may not require any action by an owner or operator of the vehicle 108. In some embodiments, however, the owner may confirm or verify authorization to exchange the vehicle 108 for the replacement vehicle.

At block 514, the one or more responses may be implemented. The on-board computer 114, the smart home controller 185, and/or the personal electronic device 189 may control the vehicle 108, the smart home 187, and/or the personal electronic device 189 to take actions necessary to implement the determined responses, including controlling movement of the vehicle 108, controlling components of the vehicle 108, the smart home 187, and/or the personal electronic device 189 to facilitate communication, controlling components of the vehicle 108, the smart home 187, and/or the personal electronic device 189 to obtain additional information or take actions, enabling or disabling motive functionality of the vehicle 108, the smart home 187, and/or the personal electronic device 189, and/or shutting down the vehicle 108, the smart home 187, and/or the personal electronic device 189. In some embodiments, this may include causing the vehicle 108 to operate in a fully autonomous manner along a route to a destination, which may be the original destination or a new destination (e.g., an emergency facility, a repair facility, etc.). If the vehicle 108 is routed to a new destination, it may thereafter further be routed from the new destination to the original destination (such as after completion of repairs at a repair facility). In some embodiments, part of the implementation of the determined one or more responses may be implemented by the server 140 or another device remote from the vehicle 108.

At block 516, the on-board computer 114, the smart home controller 185, and/or the personal electronic device 189 may determine whether to continue monitoring the vehicle 108, the smart home 187, and/or the personal electronic device 189 following the commencement or completion of implementation of the response. This determination may include determining whether the vehicle 108, the smart home 187, and/or the personal electronic device 189 is continuing to operate in a fully autonomous mode. This determination may further include determining whether other factors indicate that monitoring should continue, such as a continued risk of further damage or additional incidents. For example, monitoring may continue when the vehicle 108 is stopped within a traffic lane or on a shoulder of a roadway because such position involves an increased risk of further incidents, such as collisions with other vehicles. If operation or monitoring is determined to continue, the method 500 may continue with the on-board computer 114, the smart home controller 185, and/or the personal electronic device 189 monitoring operating data and/or other data for further indications of unusual conditions (block 502). Such monitoring may, of course, exclude known indications of unusual conditions (e.g., known damaged or malfunctioning sensors). If monitoring is determined not to continue, the method 500 may terminate.

In some embodiments, determination of incident occurrence (blocks 506 and 508), damage assessment (block 510), and/or response determination (block 512) may involve a remotely located human reviewer. The reviewer may be an owner, occupant, operator, insurer, or agent associated with the vehicle 108, the smart home 187, and/or the personal electronic device 189 or otherwise authorized to take action regarding the vehicle 108, the smart home 187, and/or the personal electronic device 189. Such review may be used to verify or confirm assessments made by the on-board computer 114, the smart home controller 185, and/or the personal electronic device 189 or to make additional determinations where the on-board computer 114, the smart home controller 185, and/or the personal electronic device 189 cannot adequately assess the situation.

In some such embodiments, the on-board computer 114, the smart home controller 185, and/or the personal electronic device 189 may send information via the network 130 to the remote reviewer, who may access the information via the network 130 or through the server 140. Such information may include operating data (or a subset of relevant operating data), images, or video recordings of the incident. In some embodiments, the remote reviewer may, with permission, operate one or more cameras of the vehicle 108, the smart home 187, and/or the personal electronic device 189 to obtain streaming video or periodic images from the vehicle 108, the smart home 187, and/or the personal electronic device 189 during review. When operating data is received from the vehicle 108, the smart home 187, and/or the personal electronic device 189, the server 140 may further process the operating data to present it in a human-readable format (e.g., a table, chart, or graphical depiction) based upon calculations made from non-human-readable operating data.

The remote reviewer may then verify, modify, or determine an occurrence, type of occurrence, and/or damage or severity of the occurrence based upon the information received from the vehicle 108, the smart home 187, and/or the personal electronic device 189. This may include communicating with persons in the vicinity of the vehicle 108, the smart home 187, and/or the personal electronic device 189 using the communication components of the vehicle 108, the smart home 187, and/or the personal electronic device 189, as described above. The remote reviewer may further verify, modify, or determine one or more responses to the incident and may cause one or more responses to be implemented by the vehicle 108, the smart home controller 187, and/or the personal electronic device 189.

Exemplary Salvage Assessment Methods

Figure 6:
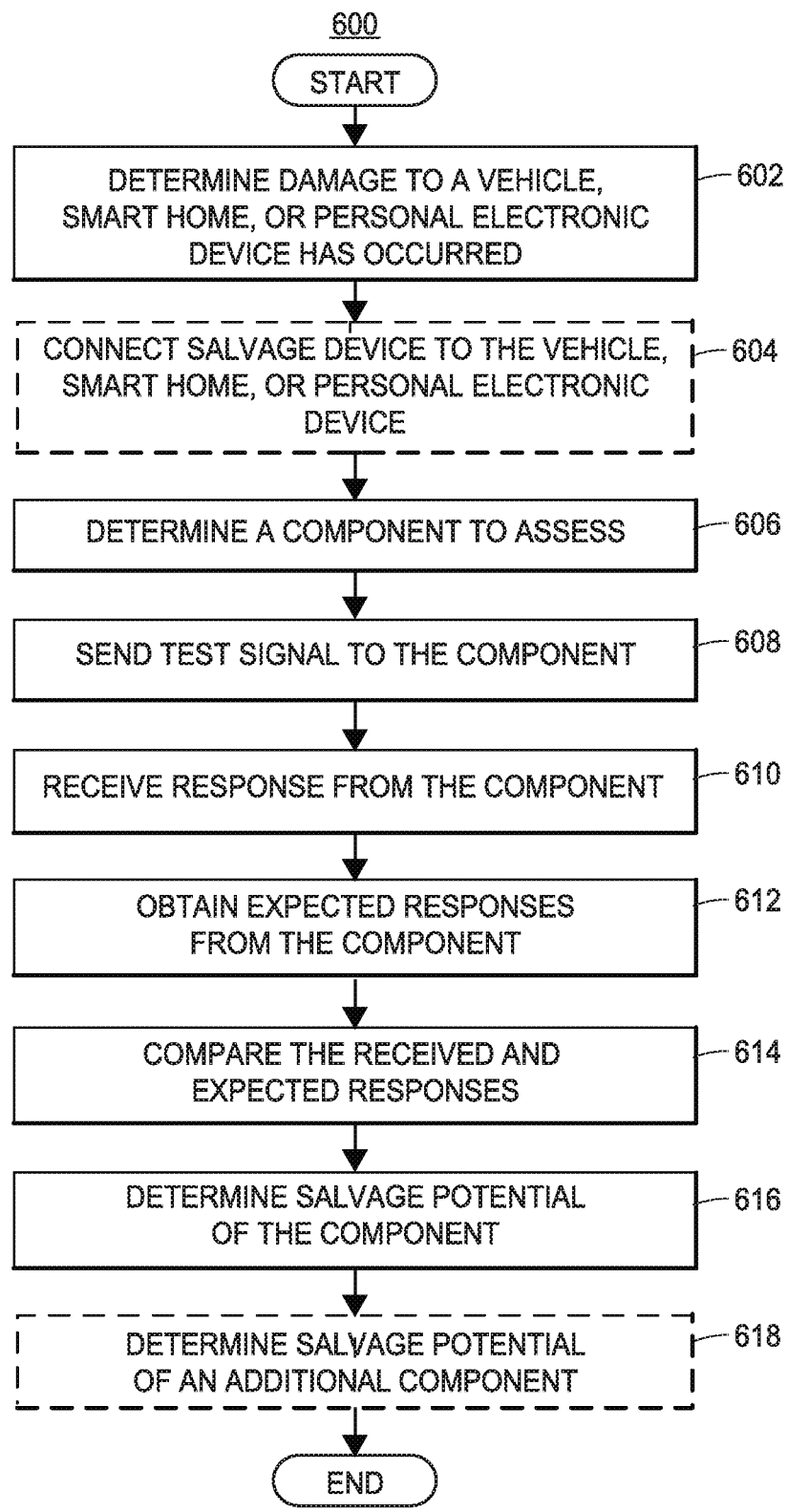
FIG. 6 illustrates a flow diagram of an exemplary salvage assessment computer-implemented method for automatically determining damage and/or salvage potential for components of an autonomous vehicle and/or a smart home.

FIG. 6 illustrates a flow diagram of an exemplary salvage assessment method 600 for automatically determining damage and/or salvage potential for components of an autonomous vehicle, smart home, and/or personal electronic device. Such method 600 may be implemented following a collision or other loss-event associated with a vehicle 108, a smart home 187, and/or a personal electronic device 189 to determine which components are damaged and which components may be salvaged for use as replacement parts in other autonomous vehicles, smart homes, and/or personal electronic devices. For traditional environments without autonomous operation features, similar salvage assessment typically involves physical inspection of the damaged component. Unlike damage to components of non-autonomous environments, damage to some components of autonomous environments may not be evident to visible inspection. Even when components of an autonomous environment appear to be functioning, signals or output from such components may be inaccurate due to unobserved damage. Therefore, the method 600 may be used to evaluate vehicle components of an autonomous vehicle, a smart home, and/or a personal electronic device to determine salvage potential.

The exemplary salvage assessment method 600 may begin by determining that damage to a vehicle 108, a smart home 187, and/or a personal electronic device 189 has occurred (block 602). Following such determination, a salvage assessment device may be connected to the vehicle 108, the smart home 187, and/or the personal electronic device 189 to evaluate component salvage potential (block 604), and one or more components of the vehicle 108, the smart home 187, and/or the personal electronic device 189 may be selected for salvageability assessment (block 606). For each selected component, the salvage assessment device may cause a test signal to be sent to the component (block 608), which may include sending the test signal through the on-board computer 114 of the vehicle 108, the smart home controller 185 of the smart home 187, and/or the personal electronic device 189.

The salvage assessment device may then detect or receive a response from the component (block 610), which may include detecting that the component is unresponsive. An expected response may also be obtained by the salvage assessment device (block 612), which may be compared against the received response (block 614). Based upon such comparison, the salvage assessment device may then determine the salvage potential of the component (block 616). In some embodiments, the salvage assessment device may further determine salvage potential for an additional component of the vehicle 108, the smart home 187, and/or the personal electronic device 189 based upon the determined salvage potential of the one or more selected components (block 618).

At block 602, the method 600 may begin by determining that damage to the vehicle 108, the smart home 187, and/or the personal electronic device 189 has occurred. Such determination may be made automatically by an on-board computer 114, the smart home controller 185, the personal electronic device 189, and/or a server 140 based upon operating data or other information from the vehicle 108, the smart home 187, and/or the personal electronic device 189. For example, such determination may be made following an indication of an unusual condition or loss-event involving the vehicle 108, the smart home 187, and/or the personal electronic device 189, as discussed elsewhere herein. Such determination may, alternatively, be received from an owner, occupant, operator, or other interested party. In some embodiments, the determination may include determining that the vehicle 108, the smart home 187, and/or the personal electronic device 189 is sufficiently damaged that it requires extensive repair or is irreparably damaged. In further embodiments, an additional determination may be made that the vehicle 108, the smart home 187, and/or the personal electronic device 189 is sufficiently damaged that the cost of repair would exceed the value of the vehicle 108, the smart home 187, and/or the personal electronic device 189 repaired after being repaired, or that the vehicle, smart home, or personal electronic device is a total loss.

At block 604, the method 600 may continue with the connection of a salvage assessment device to the vehicle 108, the smart home 187, and/or the personal electronic device 189. This may include connecting the salvage assessment device to an on-board computer 114 of the vehicle 108, the smart home controller 185 of the smart home 187, and/or the personal electronic device 189, or it may include bypassing the on-board computer 114 and/or the smart home controller 185, to directly assess the other components of the vehicle 108 and/or the smart home 187. Bypassing the on-board computer 114 and/or the smart home controller 185 may be beneficial when the on-board computer 114 and/or the smart home controller 185 is or may be malfunctioning. In further embodiments, the salvage assessment device may preliminarily evaluate the operation of the on-board computer 114 and/or the smart home controller 185, then determine whether to connect to the components through the on-board computer 114 or to bypass the on-board computer 114 and/or the smart home controller 185 based upon the results of preliminary evaluation. In such embodiments, the salvage assessment device may be configured to present test commands to the on-board computer 114 and/or the smart home controller 185 or may cause the on-board computer 114 and/or the smart home controller 185 to run one or more self-diagnostic routines. In some embodiments, the salvage assessment device may connect to the on-board computer 114 and/or the smart home controller 185 to control the on-board computer 114 and/or the smart home controller 185 to generate, transmit, and/or receive signals related to assessing components of the vehicle 108, the smart home 187, and/or the personal electronic device 189. In further embodiments, the on-board computer 114 and/or the smart home controller 185 may be used as the salvage assessment device, in which case no additional connection may be required.

The salvage assessment device may be a mobile device 110, as described elsewhere herein, which may be a special-purpose computing device or a general purpose computing device (e.g., a smartphone or tablet computer). The salvage assessment device may include or be connected to a special-purpose connector configured to connect to a communication port of the vehicle 108, the smart home controller 185, and/or the personal electronic device 189. Such communication port may be an on-board diagnostic (OBD) port, such as an OBD-II or EOBD port, a universal serial bus (USB) port, an Ethernet port, or other ports that support the interconnection between two electronic devices. In further embodiments, the salvage assessment device may be configured to connect to the on-board computer 114, the smart home controller 185, and/or the personal electronic device 189 wirelessly via a WiFi, Bluetooth, or other wireless electronic communications. Establishing the wired or wireless communication connection between the salvage assessment device and the vehicle 108, the smart home 187, and/or the personal electronic device 189 may include causing the on-board computer 114, the smart home controller 185, and/or the personal electronic device 189 and/or other components of the vehicle 108, the smart home 187, and/or the personal electronic device 189 to enter into a diagnostic mode for evaluation.

At block 606, the salvage assessment device may determine one or more components of the vehicle 108, the smart home 187, and/or the personal electronic device 189 to assess. Such components may include sensors 120, part or all of the on-board computer 114, the smart home controller 185, and/or the personal electronic device 189, and/or separate autonomous operation feature components. Determining the one or more components of the vehicle 108, the smart home 187, and/or the personal electronic device 189 to assess may include selecting the components from a plurality of components of the vehicle 108. To this end, the salvage assessment device may receive information regarding the plurality of components of the vehicle 108, the smart home 187, and/or the personal electronic device 189, which may include accessing such information from a program memory 208 or a database 146. The salvage assessment device may then identify one or more components of the vehicle 108, the smart home 187, and/or the personal electronic device 189 for evaluation. Such identification may include selecting the one or more components based upon operating data received from the vehicle 108, the smart home 187, and/or the personal electronic device 189, which operating data may be associated with a collision or other loss-event resulting in damage to the vehicle 108, the smart home 187, and/or the personal electronic device 189. The salvage assessment device may determine that some components of the vehicle 108, the smart home 187, and/or the personal electronic device 189 should or should not be evaluated because of high probabilities that such components either are or are not damaged based upon the operating data. For example, in a high-speed head-on collision, the salvage assessment device may determine that sensors located in the front bumper of the vehicle 108 are highly likely to be damaged, therefore determining not to select such sensors for evaluation. As another example, in a tree-fall event, the salvage assessment device may determine that sensors located on the roof of the smart home 187 are highly likely to be damaged, and similarly are determined not to be selected for evaluation. In further embodiments, the salvage assessment device may iteratively evaluate and assess all components capable of electronic communication with the salvage assessment device that can be identified as being disposed within the vehicle 108, the smart home 187, and/or the personal electronic device 189.

At block 608, the salvage assessment device may cause one or more test signals to be sent to each of the determined components. The salvage assessment device may generate and communicate such test signals to the components, or the salvage assessment device may control the on-board computer 114, the smart home controller 185, and/or the personal electronic device 189 to generate and/or communicate the test signals to the components. The test signals may cause the components to return one or more response signals to the on-board computer 114, the smart home controller 185, and/or the personal electronic device 189 or the salvage assessment device. Such response signals may indicate a self-assessment of the component, an acknowledgement of receipt of the test signal by the component, a value measured or determined by the component, or another response by the component upon receipt of the test signal.

At block 610, the salvage assessment device may receive the one or more responses from the one or more components. The responses may be received via the on-board computer 114, the smart home controller 185, and/or the personal electronic device 189 in some embodiments. The responses may include response signals from the components or information based thereon from the on-board computer 114, the smart home controller 185, and/or the personal electronic device 189. In some embodiments, the responses may include an implied response indicating component disconnection or malfunctioning (e.g., as a result of damage), which may be inferred by the salvage assessment device or on-board computer 114, the smart home controller 185, and/or the personal electronic device 189 from an absence of a response signal within a usual time period for response from the component. Such received or implied responses may then be used to determine damage or salvageability of components of the vehicle 108, the smart home 187, and/or the personal electronic device 189.

At block 612, the salvage assessment device may obtain one or more expected responses for the one or more components. Such expected responses may be indicative of ordinary or usual responses of the one or more components to the one or more test signals, and the expected responses may be obtained from a program memory 208 or a database 146. The expected responses may include ranges of response signals associated with proper operation of components, such as ranges of sensor data generated by a sensor 120 when functioning properly.

In some embodiments, the expected responses may be based at least in part upon operating data received from additional components of the vehicle 108, the smart home 187, and/or the personal electronic device 189. For example, sensor data from other sensors 120 may be used to determine an expected response from a component to be evaluated. In further embodiments, such operating data may be received from other components determined to be operating properly or may be received from a plurality of other components of unknown status, in which latter case the expected responses may include a plurality of ranges based upon whether the other components are functioning properly or are malfunctioning. In yet further embodiments, known characteristics of the autonomous environment at the time of assessment (e.g., distance from objects near the vehicle 108, the smart home 187, and/or the personal electronic device 189) may be used to determine expected responses of the one or more components.

At block 614, the salvage assessment device may compare the received responses and the expected responses for the one or more components to evaluate the operating status or condition of the one or more components. This may include determining whether a received response is within a range of acceptable responses based upon one or more associated expected responses indicative of proper functioning of the component. In some embodiments, this may include comparing received responses and expected responses for a plurality of components to determine whether the received responses are consistent with other received responses, particularly with those received responses that are consistent with the expected responses.

At block 616, the salvage assessment device may then determine a salvage potential indicative of whether each of the one or more components is salvageable based upon such comparisons between received and expected responses. The salvage potential of a component may be associated with an estimate of damage, which may include an estimate of a level, type, or extent of damage. For example, a component may be determined to have suffered minor damage based upon a shift in an average value of the one or more response signals associated with the component, even though the responses are generally within an acceptable range based upon the expected responses associated with the component. A component determined to be damaged may be further determined not to be salvageable or may be determined to be partially salvageable. In instances in which multiple response signals are associated with a component (e.g., where a component includes multiple sensors 120), the component may be determined to be partially malfunctioning and partially operational due to subcomponent damage. In some embodiments, such situations may further be evaluated by the salvage assessment device to determine whether the subcomponents of the component may be repaired or replaced, which may be further used to determine whether the component is salvageable.

At block 618, in some embodiments, the salvage assessment device may further determine a salvage potential of one or more additional components of the vehicle 108, the smart home 187, and/or the personal electronic device 189 based upon the determined salvage potential or damage associated with one or more components. The additional components may be disposed within the vehicle 108, the smart home 187, and/or the personal electronic device 189 in physical proximity to a set of the one or more components, such that the additional components may be expected to have suffered similar damage levels as the set of evaluated components. In some embodiments, the additional components may include components that are not sensors or autonomous operation features.

Such additional components may not be configured for electronic communication with the on-board computer 114, the smart home controller 185, and/or the personal electronic device 189, even if the additional components are controlled by the on-board computer 114, the smart home controller 185, and/or the personal electronic device 189. For example, the additional components may include headlights, signal lights, body panels, roofing, siding, support beams, and/or other structural or non-communicating parts of the vehicle 108, the smart home 187, and/or the personal electronic device 189. Determining the salvage potential of such additional components may include determining an estimated level of damage for an area of the vehicle 108, the smart home 187, and/or the personal electronic device 189 associated with an additional component based upon estimated levels and/or types of damages associated with the set of components.

In some embodiments, the salvage assessment device may further communicate the determined salvage potential of the components and/or additional components to a server 140 for storage in a database 146 or to a mobile device 110 for storage in a program memory 208. The salvage assessment device may additionally, or alternatively, present information indicating the salvage potential of the components to a user of the salvage assessment device. This may include a report summarizing the salvage potential of the vehicle 108, the smart home 187, and/or the personal electronic device 189 and/or the components thereof. In some embodiments, information regarding costs or values associated with the components may be used to estimate salvage values of one or more components or of the vehicle 108, the smart home 187, and/or the personal electronic device 189.

Exemplary Malfunction Detection Methods

Figure 7:
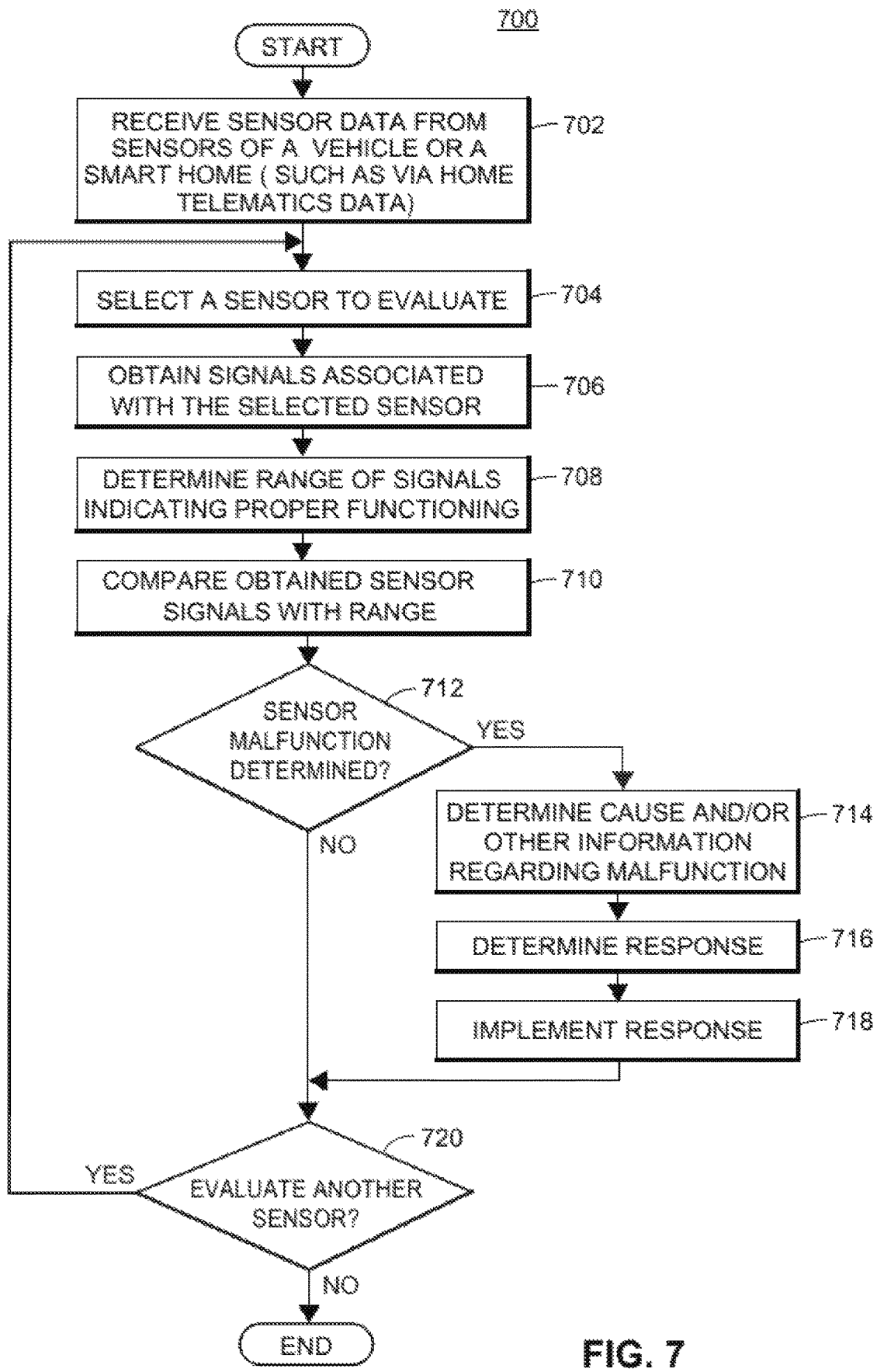
FIG. 7 illustrates a flow diagram of an exemplary malfunction detection computer-implemented method for identifying malfunctioning sensors of an autonomous vehicle and/or a smart home.

FIG. 7 illustrates a flow diagram of an exemplary malfunction detection method 700 for identifying malfunctioning sensors of an autonomous vehicle 108 and/or a smart home 187. Such method 700 may be used to detect sensors of an autonomous vehicle and/or smart home that are malfunctioning and, in some instances, to correct the malfunction. The method 700 may be implemented during operation to ensure the vehicle 108 and/or the smart home 187 is functioning properly and to detect malfunctions caused by damage, environmental conditions, or other causes. Because autonomous vehicles rely heavily on accurate sensor data to make control decisions to operate the vehicle, damaged or otherwise malfunctioning sensors may pose a hazard to the vehicle, other vehicles, passengers, or pedestrian in the vehicle's operating environment. Similarly, smart homes rely heavily on accurate sensor data (e.g., home telematics data) to ensure proper operation of smart equipment and/or to detect emergencies that threaten damage to the smart home, damaged or otherwise malfunctioning sensors may lead to improper reporting of conditions pose hazards to occupants, passersby, and/or other property. Such sensors may malfunction for various reasons, including manufacturing defects, ordinary wear, collision damage, cyber-attacks, or weather damage. In many cases, such damaged or otherwise malfunctioning sensors may appear to be operating properly to both a vehicle operator and to an on-board computer 114 of the vehicle 108 and/or a smart home controller 185 of the smart home 187. The method 700 evaluates the sensors to detect malfunctions and take actions to address the hazard posed by such malfunctions. Although the method 700 is described below as being performed by the on-board computer 114 and/or the smart home controller 187, for simplicity, it should be understood that one or more mobile devices 110 or servers 140 may alternatively, or additionally, be used to perform part or all of the process.

The exemplary malfunction detection method 700 may begin by receiving sensor data from one or more sensors 120 of the vehicle 108, sensors interconnected with the smart home controller 187, and/or a personal electronic device 189 (block 702). The method 700 may then iteratively evaluate the sensors 120 to identify and respond to sensor malfunctions. A sensor is selected for evaluation (block 704), and one or more signals associated with the selected sensor are obtained (block 706). A range of signal values associated with proper functioning of the sensor may be determined (block 708) and compared against the one or more signals associated with the selected sensor to determine whether the sensor is malfunctioning (block 710). If the sensor is determined to be malfunctioning (block 712), a cause of the malfunction and/or other information associated with the malfunction may be determined (block 714). Based upon the determined information, one or more responses to the malfunction may then be determined (block 716) and implemented (block 718). If another sensor is to be evaluated (block 720), the method 700 selects and evaluates another sensor. If no sensors remain to be evaluated (block 720), the method 700 may terminate.

At block 702, the on-board computer 114 may receive sensor data from one or more sensors 120 of the vehicle 108, sensors interconnected with the smart home controller 187, and/or a personal electronic device 189. The sensor data may include a plurality of signals associated with the one or more sensors 120, which signals may be generated during operation of the vehicle 108, operation of the smart home 187, and/or the personal electronic device 189. The sensor data may be received when the vehicle 108 is first started, when the vehicle 108 is shut down, when an individual enters the smart home 187, when an individual egresses the smart home 187, or upon the occurrence of an event. Such events may include a user-initiated request to evaluate the sensors 120 or detection of an indication of an unusual condition, such as a collision involving the vehicle 108, damage to the smart home 187, and/or an individual experiencing a medical emergency. In other embodiments, however, the sensor data may be received and evaluated to determine whether a sensor 120 is malfunctioning without any indication of a collision and/or other event. In particular embodiments, the sensor data may be received continuously or periodically during operation of the vehicle 108 by the on-board computer 114 and/or during operation of the smart home 187 by the smart home controller 185. The on-board computer 114 and/or smart home controller may then process or store the sensor data for future processing.

In some embodiments, the sensor data may additionally or alternatively include sensor data received from a sensor not included in the one or more sensors 120 of the vehicle 108 and/or or one or more sensors located on or proximate to the smart home 187. As an example, a sensor of the one or more smart infrastructure components 188 may transmit sensor data to the on-board computer 114 via the network 130. As another example, the sensor data may include sensor data received from the personal electronic device 189.

At block 704, the on-board computer 114 and/or smart home controller 185 may select a sensor from the one or more sensors 120, the one or more sensors located on or proximate to the smart home 187, the sensors of the one or more smart infrastructure components 188, and/or the personal electronic device 189 to evaluate. The sensor may be selected based upon an indication of potential malfunction, such as inconsistent or unusual sensor data from the selected sensor. In some scenarios, the inconsistent or unusual sensor data may be indicative of a cyber-attack directed at the vehicle 108, smart home 185, personal electronic device 189, and/or the one or more smart infrastructure components 188. When the method 700 is implemented in response to a collision and/or other event, the sensor may be selected based at least in part upon a likelihood of damage to the sensor from the collision and/or other event. In further embodiments, the sensor may be selected based upon a hierarchy of sensors 120, such that higher-level sensors may be evaluated first. If a higher-level sensor is determined to be operating properly, there may be no need to test lower-level sensors associated with the higher-level sensor. This may reduce the processing time requirements for evaluating the sensors 120, thus enabling more frequent sensor evaluation (particularly during operation of the vehicle 108 and/or occupancy of the smart home 187).

At block 706, the on-board computer 114 and/or smart home controller 185 may obtain sensor data associated with the selected sensor. Such sensor data may include a set of signals from the sensor, such as signals generated by the sensor during operation of the vehicle 108 and/or smart home 187. The set of signals may include raw signal data from the sensor or signal data preprocessed by the sensor or by the on-board computer 114 and/or smart home controller 185. The signal data may include discrete data points generated by the sensor or samples of continuous data generated by the sensor. The set of signals may be obtained over a period of time from the sensor, or the set of signals may be accessed from sensor data previously stored in a program memory 208. In some embodiments, the set of signals associated with the sensor may include indications of sensor unresponsiveness, viz. indications that sensor data was not received from the sensor at times when sensor data was requested of the sensor or expected from the sensor.

At block 708, the on-board computer 114 and/or smart home controller 185 may determine a range of signals associated with proper functioning of the sensor. The range of signals may include a range of values for the signals that correspond to proper functioning of the sensor. Alternatively, a range of signal values associated with a malfunctioning status of the sensor may be determined. The range of signal values associated with proper functioning of the sensor may be determined based upon specifications for the sensor, historical data from the sensor, or estimates of what the signal values should be based upon contemporaneous sensor data from other sensors of the vehicle 108 and/or smart home 187. The range of signal values may thus be determined based upon a second set of signals from the sensors 120 of the vehicle 108, the one or more sensors located on or proximate to the smart home 187, the sensors of the one or more smart infrastructure components 188, and/or the personal electronic device 189.

The second set of signals may include a plurality of signals previously received from the sensor during a plurality of separate previous vehicle trips of the vehicle 108 and/or prior operation of the smart home 187. The second set of signals may, additionally or alternatively, include a plurality of additional signals from one or more additional sensors 120 of the vehicle 108, the one or more sensors located on or proximate to the smart home 187, the sensors of the one or more smart infrastructure components 188, and/or the personal electronic device 189 other than the selected sensor. The second set of signals may be used to estimate one or more ranges of expected responses of the sensor to various conditions in the vehicle and/or home operating environment. This information may be further used to estimate a range of values for an expected response signal of the sensor based upon concurrent sensor data from the one or more additional sensors. For example, the additional sensors may indicate an obstruction approximate ten feet ahead of the vehicle 108, in which case the determined range of signal values for the sensor may be associated with detection of an object between nine and eleven feet ahead of the vehicle 108. As another example, the additional sensors may indicate a temperature in a room proximate to the room of the smart home 187 in which the selected sensor is disposed, in which case, the determined range of signal values may be a threshold variance from the value detected by the additional sensors.

At block 710, the on-board computer 114 and/or smart home controller 185 may compare the set of signals obtained from the selected sensor against the determined range of signals associated with proper functioning of the sensor. The sensor may thus be determined to be properly functioning when the signal values of the set of signals are within the range of signal values associated with proper functioning, or the sensor may be determined to be malfunctioning when the signal values of the set of signals are outside the range of signal values associated with proper functioning. In some embodiments, the range of signal values associated with proper functioning may exclude values associated with indications that the sensor is unresponsive or that sensor data from the sensor is unavailable, in which case signals from the sensor indicating that the sensor is unresponsive may be outside the range of determined signal values associated with proper functioning. In embodiments in which the range of signals associated with proper functioning is determined using a second set of signals from additional sensors, the comparison may include determining whether the contemporary signals in the set of signals and the second set of signals are consistent or inconsistent. When inconsistencies are determined to exist, the sensor may be determined to be malfunctioning.

At block 712, the on-board computer 114 and/or smart home controller 185 may then determine whether the sensor is malfunctioning based upon the comparison between the set of signals obtained from the sensor and the determined range of signal values associated with proper functioning of the sensor. In some embodiments, determining that the sensor is malfunctioning based upon the comparison may include determining a probability that the sensor is currently or will be malfunctioning within a predetermined future time period based upon the comparison of signal values.

The probability may indicate a likelihood that the sensor is currently malfunctioning based upon the number, frequency, or magnitude of deviations of the signals from the range of values associated with proper functioning. For example, an outlier signal value in the set of signals from the sensor may be associated with a lower probability of malfunction if it is 5% higher than an upper bound of the range of signal values than if the outlier is 25% higher than the upper bound. Similarly, a set of signals with one outlier may be associated with a lower probability of malfunction than a set having the same number of signals with ten outliers. In some embodiments, the probability may be indicative of a prediction of future failure of the sensor, which prediction may be informed by information regarding failure rates of similar sensors from a plurality of other autonomous vehicles and/or smart homes retrieved from the database 146.

When the sensor is determined to be malfunctioning, the method 700 may continue to determine and implement a response at blocks 714-718. When the sensor is determined not to be malfunctioning, the method 700 may continue to determine whether any other sensors remain to be evaluated at block 720.

At block 714, the on-board computer 114 may further determine a cause of the malfunction, an extent of the malfunction, or other information associated with the malfunction. This may include accessing information regarding malfunction of similar sensors from a plurality of other autonomous vehicles and/or smart homes retrieved from the database 146. For example, a malfunction in the one or more smart infrastructure components 188 may be determined by comparing signals received by a plurality of vehicles from the one or more smart infrastructure components 188. In further embodiments, this may include evaluating operating data (including sensor data) from the vehicle 108, the smart home 187, and/or the personal electronic device 189. Such operating data may be associated with the malfunctioning sensor and/or other sensors 120 within the vehicle 108, smart home 187, and/or associated with the personal electronic device 189. In some embodiments, this may include obtaining and processing time-stamped operating data from a plurality of times, which times may associated with multiple time frames (e.g., trips or occupancy periods) or may be associated with different points within a time period associated with part of one time frame. For example, each of the plurality of times may be periodic sample points at which the on-board computer 114 and/or the smart home controller 185 stores operating data (such as the signals in the set of signals) during operation.

The on-board computer 114 and/or the smart home controller 185 may analyze the time-stamped operating data to identify an indication of an unusual condition associated with the malfunction, such as a collision or other damage-causing event. In addition to collisions, weather-related events (e.g., frost, water intrusion, excessive heat, etc.), blockage (e.g., dirt, water, or salt build-up on the sensor), or other events may be determined as the cause of the sensor malfunction. Other causes may include age (e.g., years in service) of the sensor, manufacturer defect, improper installation, or inadequate maintenance, among other causes.

In addition to the cause of the sensor malfunction, or as an alternative thereto, the on-board computer 114 and/or the smart home controller 185 may determine other information associated with the sensor malfunction. Such information may include an extent of the damage to the sensor or the degree to which the malfunction results in inaccurate or unreliable sensor data. Such information may similarly include information associated with repair or replacement options or requirements, usual cost to repair or replace the sensor, other sensors that frequently malfunction at the same time, risk levels associated with operation of the vehicle 108 and/or the smart home 187 without the sensor (which may include a plurality of risk levels associated with different levels or settings used for autonomous or semi-autonomous vehicle operation), etc.

In some embodiments, determining the cause of the sensor malfunction may include determining fault or liability for the sensor malfunction. This may include an apportionment of liability for a cost of repair or replacement of the first sensor between one or more of: a manufacturer of the sensor, a manufacturer of the vehicle 108, a manufacturer of a smart equipment, a manufacturer of the personal electronic device 189, an installer of the sensor, an insurer of the vehicle 108, an insurer of the smart home 187, an owner of the vehicle 108, an owner of the smart home 187, or an owner, operator, or insurer of another vehicle and/or smart home. In further embodiments, determining the cause of the sensor malfunction may include determining insurance coverage for repair or replacement of the sensor based upon the determined cause and/or fault. For example, sensor damage determined to be caused by weather (e.g., freezing temperatures resulting in sensor failure) may be determined to be covered under an insurance policy.

In some additional or alternative embodiments, determining the cause of the sensor malfunction may include determining a software version associated with the malfunctioning sensor. To this end, in a cyber-attack scenario, the malfunction may be caused by the sensor having an outdated or corrupted software version that was exploited by the cyber-attack. In another scenario, a software update may enable additional functionality by the sensor and/or the vehicle 108. In this scenario, the determination of the software version may restrict one or more potential responses to the cyber-attack. In an embodiment, the software on the sensor may be updated remotely to an updated version, or anti-virus software may be initiated on the sensor.

At block 716, the on-board computer 114 and/or the smart home controller 185 may determine one or more responses to the sensor malfunction based upon the determined cause and/or other information. The one or more responses may be selected or otherwise determined in order to address the malfunction by correcting the malfunction, changing operation of the vehicle 108 and/or the smart home 187 to reduce the impact of the malfunction, warning a vehicle owner or operator of the malfunction, updating a software associated with the malfunctioning sensor and/or the vehicle 108, dispatching a backup autonomous vehicle, or taking other actions to improve operation of the vehicle 108 and/or smart home 187 after identification of the malfunction. In some embodiments, part or all of the determination of the one or more responses may be performed by the server 140 based upon information received from the on-board computer 114, the smart home controller 185, and/or the personal electronic device 189 via the network 130.

In some embodiments, vehicle-mounted sensors may be able to determine or identify a number and type of passengers, such as zero passengers, two passengers, a child passenger, an elderly passenger, a handicapped or blind passenger, etc. Based upon the number and type passengers, the response determined 716 may be impacted. For instance, changing operation of the vehicle with zero passengers may be easier than with several passengers.

In further embodiments, the one or more responses may be determined based upon additional information received by the on-board computer 114, the smart home controller 185 or server 140, which additional information may include information regarding similar sensor malfunctions from a plurality of other vehicles and/or smart homes. Such additional information may be used to determine risks associated with operation of the vehicle and/or smart home while the sensor is malfunctioning, repairs typically required to correct the malfunction, or adjustments to vehicle operation to minimize the effect of the malfunction under various conditions.

An alert or warning to an operator and/or owner of the vehicle 108, and/or an occupant and/or owner of the smart home 187, may be generated in order to notify relevant parties of the malfunction. Such notification may be applicable to situations in which other remedial actions may be taken, as well as to situation in which no immediate remedy is available. In some embodiments, additional information may be included as part of the notification, such as information regarding severity of the malfunction, risks associated with operation of the vehicle 108 and/or the smart home 187 with the malfunction occurring, recommendations for correcting the malfunction, recommendations for adjusting vehicle and/or smart home operation until the malfunction is corrected, or costs associated with correcting the malfunction or operating the vehicle 108 and/or the smart home 187 without correcting the malfunction.

The notification may include recommendations to be implemented or selected by an operator, occupant, and/or owner, such as recommendations to take one or more of the following actions: repair the sensor, replace the sensor, avoid using one or more autonomous operation features of the vehicle 108 and/or the smart home 187, or avoid using one or more settings associated with the one or more autonomous operation features. The notifications may likewise include information regarding risks or costs associated with operation of the vehicle 108 and/or the smart home 187 without correcting the malfunction. This information may include estimates of increased risks for each of various operation settings or levels of autonomous operation feature usage. This information may similarly include adjustments to costs or coverage levels associated with an insurance policy for the vehicle 108 and/or the smart home 187 based upon the sensor malfunction. Such adjustments may be immediate or may be prospective (i.e., depending upon the actual usage of the vehicle 108 and/or the smart home 187 following the notification).

The one or more responses may include recommending or enacting limitations on use of one or more autonomous operation features or settings. The limitations may be determined based upon risks associated with use of autonomous operation features or setting. Such risks may be determined by identifying one or more autonomous operation features or settings of the vehicle 108 and/or the smart home 187 that utilize sensor data from the malfunctioning sensor, then determining one or more risk levels associated with use of each such autonomous operation feature or setting while the sensor is malfunctioning. Limitations on use of the one or more autonomous operation features or settings may be determined for the operating environment of the vehicle 108 and/or the smart home 187, in order to reduce risks associated with autonomous or semi-autonomous operation (e.g., to reduce risk levels to below a maximum safe operation threshold level of risk). In some embodiments, determination of such limitations may include comparing risk levels associated with use of the autonomous operation features or settings with risk levels associated with operation by a specific operator and/or occupant without such autonomous operation features or settings.

Where the response includes recommending limited use of one or more autonomous operation features or settings to a specific operator and/or occupant, such recommendation may be conveyed together with an indication of a risk or cost associated with noncompliance with the recommendation. In other embodiments, the response may include enacting such limitations by limiting the operation of one or more autonomous operation features or settings of the vehicle 108 and/or smart home 187, such as by disabling or locking relevant autonomous operation features or settings. Thus, the on-board computer 114 and/or the smart home controller 185 may disable or lock certain autonomous operation features or settings. In further embodiments, the response may include an option allowing the operator and/or occupant to override such disabling or locking of the autonomous operation features or settings.

The one or more responses may include repairing or replacing the malfunctioning sensor. This response may include a determination of one or more repairs to be performed and/or one or more components to be replaced. Such determination may further be based upon similar repairs previously performed on other similar vehicles and/or smart homes to correct similar sensor malfunctions. In some embodiments, the response may include automatically scheduling repair or replacement of the sensor, which may include arranging for the sensor to be repaired or replaced by a repair service provider, as discussed elsewhere herein. In further embodiments, liability or insurance coverage for such repair service to correct the sensor malfunction may be determined, and the response may include automatically processing a payment for the service. In further embodiments, repairing the malfunctioning sensor may include resetting, restarting, rebooting, recalibrating, or otherwise attempting to clear the malfunction by returning the sensor to a predetermined or default state. This may be of particular use where a software error has caused the malfunction, such that resetting the sensor (such as by rebooting the sensor) may correct the malfunction.

At block 718, the on-board computer 114 and/or the smart home controller 185 may cause the one or more responses to be implemented. Implementation may include presentation of alerts or warnings to an operator, owner, occupant and/or other interested party. Implementation may likewise include disabling or locking autonomous operation features or settings thereof, which may be overridden by an operator and/or occupant in some embodiments.

In further embodiments, implementation may include monitoring usage of the vehicle 108 and/or the smart home 187, such as by storing operating data. Usage may be monitored to determine whether the vehicle and/or smart home is being operated in accordance with recommended usage levels and settings for autonomous operation features impacted by the sensor malfunction, as well as to obtain additional information regarding the sensor. In yet further embodiments, such usage information may be used to determine and/or implement an adjustment to a cost or coverage associated with an insurance policy associated with the vehicle 108 and/or the smart home 187, which adjustment may be based upon risk levels associated with the determined usage. Implementation may likewise include scheduling repair or replacement of the malfunctioning sensor by a repair service provider, which may include automatically controlling the vehicle 108 to travel to a repair location. In some embodiments, a payment for such repair or replacement service may be automatically made or facilitated by the server 140.

At block 720, the on-board computer 114 and/or the smart home controller 185 may determine whether to evaluate another sensor of the one or more sensors 120, the one or more sensors located on or proximate to the smart home 187, the sensors of the one or more smart infrastructure components 188, and/or the personal electronic device 189 (which may also determine a type and number of passengers in the vehicle 108 and/or the smart home 187). When an additional sensor is identified for evaluation, the method 700 may continue with selecting another sensor for evaluation (block 704). When no additional sensors are identified for evaluation, the method 700 may terminate. Prior to termination in some embodiments, the on-board computer 114 and/or the smart home controller 185 may generate or store a summary report regarding the status of the sensors 120, the one or more sensors located on or proximate to the smart home 187, the sensors of the one or more smart infrastructure components 188, and/or the personal electronic device 189.

Exemplary Malfunction Assessment Methods

Figure 8:
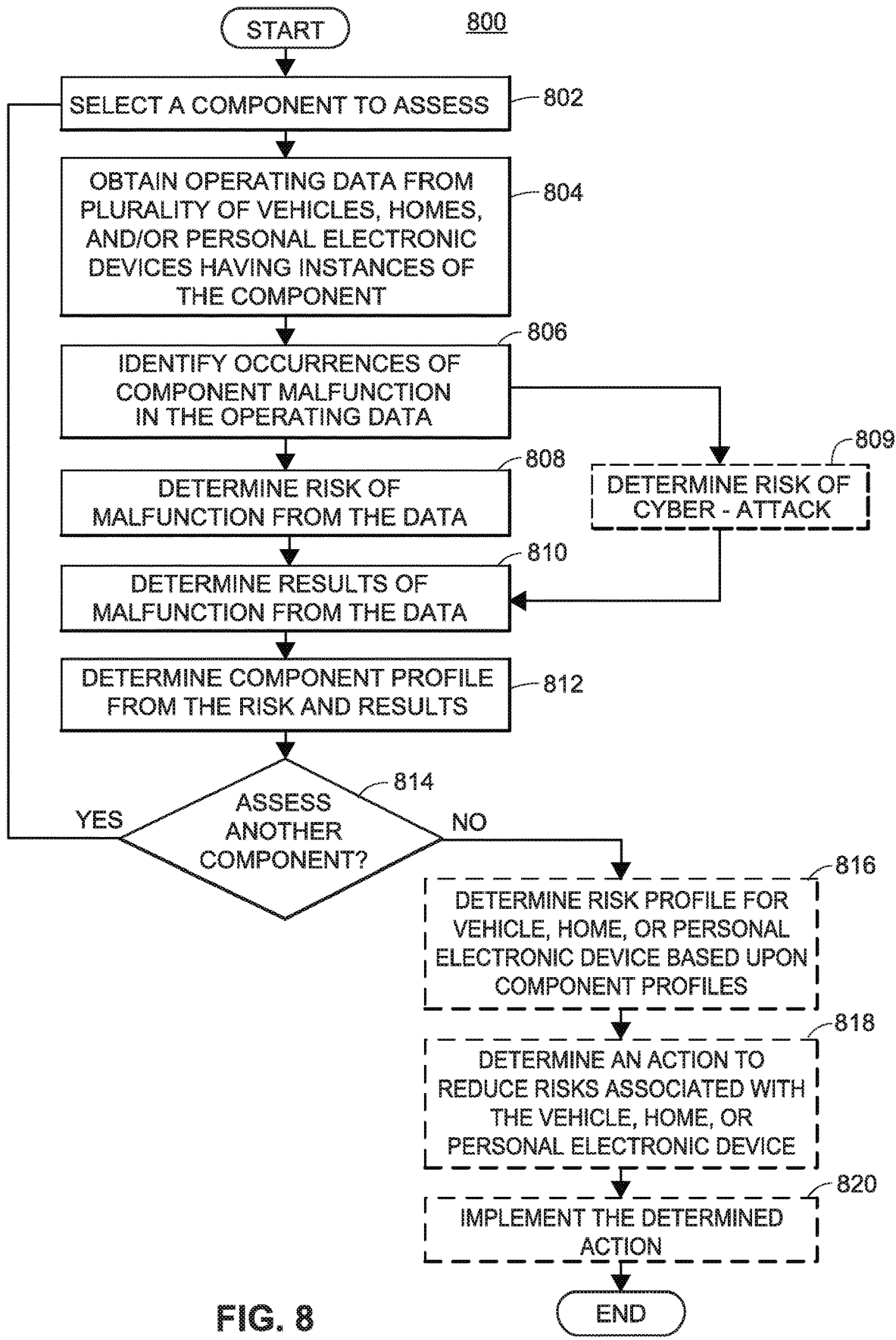
FIG. 8 illustrates a flow diagram of an exemplary malfunction assessment computer-implemented method for determining the impact of malfunctioning components on the operation of an autonomous vehicle and/or a smart home.

FIG. 8 illustrates a flow diagram of an exemplary malfunction assessment method 800 for determining the impact of malfunctioning components on the operation of an autonomous vehicle 108. Such method 800 may be useful in determining not only the risk of accidents or other problems caused by component failure within an autonomous vehicle, a smart home or a personal electronic device, but also the extent or severity of such problems. By assessing both risks and results associated with autonomous operation components, the reliability and robustness of the autonomous systems may be determined. Based upon such determinations, some components of the vehicle may be adjusted to reduce the likelihood of severe problems. This may be accomplished by automatically updating, upgrading, repairing, or replacing one or more components. Although the method 800 is described below as being performed by a server 140 for simplicity, it should be understood that one or more mobile devices 110, on-board computers 114, smart home controllers 185, and/or personal electronic devices 189 may alternatively, or additionally, be used to perform part or all of the process.

The exemplary malfunction assessment method 800 may iteratively assess one or more autonomous operation components of the vehicle 108, the smart home 187, and/or the personal electronic device 189 to determine a likelihood and impact of component malfunction. The method 800 may begin with the selection of a component to assess (block 802). Operating information may be obtained from a plurality of vehicles, smart homes, and/or personal electronic devices having instances of the component (block 804). Occurrences of component malfunctions may be identified in the operating information (block 806), from which may be determined risks of malfunction (block 808), including risks of cyber-attack (block 809), and results of such malfunctions (block 810).

The results of malfunctions may be associated with vehicle collisions or other hazardous events. A component profile may then be determined and/or generated for the component based upon the determined risks and results associated with component malfunction (block 812). A plurality of components may be so assessed, in which case the preceding blocks 802-812 may be repeated until no further components remain to be assessed (block 814). In some embodiments, the plurality of component profiles thus generated may be further used to determine and/or generate a risk profile for the vehicle 108, the smart home 187, and/or the personal electronic device 189 (block 816). In yet further embodiments, the method 800 may include determining one or more actions to reduce risk levels associated with the vehicle 108, the smart home 187, and/or the personal electronic device 189 (block 818) and implement such determined actions (block 820).

At block 802, the server 140 may select a component of a type used in autonomous operation of the vehicle 108. Such components may be limited to autonomous operation component types of which the vehicle 108 has at least one instance or copy installed. This selection may include selecting components of particular interest, such as components newly installed within the vehicle 108, the smart home 187, and/or the personal electronic device 189, or components recently updated or upgraded (e.g., by updating of software associated with a component to a new version). This selection may also include simply selecting each known component associated with autonomous operation of the vehicle 108, the smart home 187, and/or the personal electronic device 189, in turn. In some embodiments, this may include automatically identifying at the on-board computer 114, the smart home controller 185, and/or personal electronic device 189 all autonomous operation components of the vehicle 108, the smart home 187, and/or personal electronic device 189, respectively, such as by generating or processing a device registry of the components.

The components may include distinct autonomous operation features, hardware components associated therewith (e.g., sensors or controllers), versions of software programs for implementing part or all of an autonomous operation feature, version of operating systems for controlling autonomous operation of the vehicle 108, the smart home 187, and/or the personal electronic device 189, or types of sensors configured to provide sensor data for autonomous or semi-autonomous operation of the vehicle 108, the smart home 187, and/or the personal electronic device 189. The component may be a general type of component used in autonomous operation (e.g., a LIDAR unit) or may be a particular type of a component (e.g., a specific model of a LIDAR unit produced by a particular manufacturer).

At block 804, the server 140 may obtain operating information from a plurality of autonomous vehicles, smart homes, and/or personal electronic devices having the selected component or type of component. Such operating information may be limited to operating information associated with the selected component, or it may include additional operating information associated with the vehicles, smart homes, and/or personal electronic devices. The information may be obtained by accessing a database 146 storing information regarding operation of a plurality of vehicles, smart homes, and/or personal electronic devices in full or summary form. In some embodiments, the operating information may include operating data (including sensor data and/or control data), as described elsewhere herein. In other embodiments, the operating information may include information derived from operating data and/or loss data associated with vehicle accidents and/or loss events, component failure, or other incidents involving the selected component for the plurality of vehicles, smart homes, and/or personal electronic devices.

At block 806, the server 140 may identify occurrences of the selected component malfunctioning in the plurality of vehicles, smart homes, and/or personal electronic devices based upon the operating information. This may include identifying recorded occurrences of component malfunction events, occurrences of repairs associated with the component, or occurrences of collisions or other loss events (which may be further analyzed to determine whether the component was malfunctioning prior to the collision or other loss event). In some embodiments, this may include evaluating operating data associated with the plurality of vehicles, smart homes, and/or personal electronic devices to identify indications of component malfunctions based upon signals that are out of an expected range or are inconsistent with other contemporaneous signals associated with other components of the same vehicle, smart home, and/or personal electronic device.

At block 808, the server 140 may determine one or more risks of component malfunction based upon the identified occurrences of malfunctioning in the plurality of vehicles. The one or more risks may be associated with probabilities of component malfunction occurrences, which may further be associated with types of component malfunctions (e.g., inaccurate operation, unresponsiveness, etc.). The one or more risks may likewise be associated with locations of operation, times of operation, durations of the presence of the component in the autonomous vehicle, smart home, and/or personal electronic device, extent of use of the component in the autonomous vehicle, smart home, and/or personal electronic device, or other relevant factors.

The duration of the presence of the component in the autonomous vehicle, smart home, and/or personal electronic device may be measured in total time, total operating time, or total distance traveled by the vehicle with the component installed within the vehicle. The extent of use of the component in the autonomous vehicle, smart home, and/or personal electronic device may be measured in total operating time or total distance traveled by the vehicle while the component was engaged in operation of the vehicle.

At block 809, the server 140 may additionally or alternatively determine one or more risks of cyber-attack directed at the component of one or more autonomous vehicles, smart homes, and/or personal electronic devices. The server 140 may determine the software version and/or operating system of the component. The database 146 may additionally include an indication of a latest software version and/or operating system version distributed by the component manufacturer, a date the latest version was released, and/or a number of vulnerabilities corrected by the latest version. The corrected vulnerabilities may be organized by severity (e.g., low, mid, high, critical, etc.). In some scenarios, several versions may have been released between the version executing on the component and the latest version. In these scenarios, the controller may aggregate the vulnerabilities from each version subsequent to the currently executing version.

The risk of cyber-attack may be determined by generating a vulnerability score indicating a risk level associated the known vulnerabilities in the current software version and/or operating system version executing on the component. In an embodiment, one or more vulnerabilities may be associated with particular functions and/or features that may be maliciously controlled by exploiting the vulnerability. In this embodiment, the vulnerability score may be further based upon the operation and/or performance of the functions and/or features exposed in the component's currently executing software version and/or operating system version.

At block 810, the server 140 may further determine results associated with each identified occurrence of the component malfunctioning. Such results may include immediate and longer-term results, including both events (e.g., collisions) and non-events (e.g., no significant change in autonomous operation). Each result may be indicative of an impact of the component malfunction on the operation of the vehicle.

Such impact may include an impact on a risk or severity of a vehicle collision involving the vehicle and/or other loss event involving the vehicle, smart home, and/or personal electronic device. Such impact may similarly include an impact on a risk or severity of a loss of control event, on an inability to operate in a fully autonomous or semi-autonomous mode, on a collision or loss of control event involving another vehicle, smart home, and/or personal electronic device in the operating environment, or other aspects of autonomous control (e.g., recognition and/or appropriate response to environmental conditions, pedestrians, other vehicles, etc.). The result may further include information regarding the impact, such as occurrence and/or extent of damage to the vehicle, smart home, and/or personal electronic device, damage to other vehicles, smart homes, and/or personal electronic devices, damage to other property, costs associated with repair of damage, injuries to passengers of the vehicle or other vehicles, injuries to pedestrians and/or passersby, or costs associated with injuries.

In some embodiments, determining the results associated with the identified occurrences of component malfunctioning may include determining the influence of mitigation by one or more actions of the vehicle, smart home, and/or personal electronic device to offset the component malfunction. Such mitigating actions taken by the vehicle, smart home, and/or personal electronic device in response to the component malfunction may include making adjustments to the operation of one or more autonomous operation features associated with the malfunctioning component, placing restrictions or limitations on use of the one or more autonomous operation features, or engaging additional components to compensate for the malfunction. Where the malfunctioning component is or includes a sensor, the mitigating actions may include ignoring sensor data from such sensor and/or using sensor data from one or more redundant sensors (which may be of the same general type as the malfunctioning sensor) to operate the vehicle, smart home, and/or personal electronic device. In some embodiments, redundant sensors or other components may not be activated until the on-board computer 114, smart home controller 185, and/or personal electronic device 189 determines that the component is malfunctioning.

In some embodiments, the mitigating actions may be associated with a version of a software program associated with an autonomous operation feature or a version of an operating system for autonomous operation of the vehicle, smart home, and/or personal electronic device. For example, newer versions of software used by the vehicle, smart home, and/or personal electronic device may include additional functionality to take mitigating actions not included in older versions of such software. As another example, new version of software may reduce the vulnerability of the vehicle, smart home, and/or personal electronic device to cyber-attacks.

At block 812, the server 140 may determine and/or generate a component profile based upon the determined risks of component malfunction and results of component malfunction. The component profile may indicate one or more combinations of risk levels, including cyber-attack risk levels, and impacts associated with malfunctions of the component, which may depend upon one or more settings associated with the component. Such combinations may be further associated with a plurality of operating conditions, as well as other aspects of the vehicle, smart home, and/or personal electronic device. Such conditions and aspects may have significant influence on the probability and severity of incidents resulting from component malfunctions. Operating conditions of vehicle use, smart home use, and/or personal electronic device use may include operating environments through which a vehicle travels, an environment proximate to the smart home, and/or environments in which the person monitored by the personal electronic device travels, which may include location, weather, traffic, road type, time of day, etc.

Aspects of the vehicle, smart home, and/or personal electronic device may include fixed or adjustable characteristics of a vehicle, smart home, and/or personal electronic device that may interact with the component, including other components of the vehicle, smart home, and/or personal electronic device, extent of use of autonomous operation features, settings of the autonomous operation features used, etc. For example, each combination in the component profile may be associated with a configuration of additional components (which may include settings thereof) that interact with the component to operate the vehicle, smart home, and/or personal electronic device.

In some embodiments, the component profile may include one or more scores associated with risks and results associate with the component under one or more sets of conditions and/or aspects. Such scores may be indicative of an expected value of the impact of component malfunctions, including cyber-attacks. In further embodiments, the component profile may additionally, or alternatively, indicate an expected usable lifetime of the component. Such expected usable lifetime may be associated with a duration of time or extent of distance traveled by the vehicle with the component installed or functioning before the component reaches a predetermined failure rate (e.g., 50% probability of malfunction, 70% probability of malfunction, etc.).

At block 814, the server 140 may determine whether there is a further component of the vehicle 108, the smart home 187, and/or the personal electronic device 189 to assess. When a further component is identified, the method 800 may continue with selection of the next component to assess (block 802). When no further component is identified, the method 800 may terminate or may proceed to determination and/or generation of a risk profile for the autonomous vehicle, smart home, and/or personal electronic device (block 816).

At block 816, in some embodiments, the server 140 may determine and/or generate a risk profile for the vehicle 108, the smart home 187, and/or the personal electronic device 189 based upon a plurality of component profiles determined for a plurality of autonomous operation components of the vehicle 108, the smart home 187, and/or the personal electronic device 189. The risk profile may be determined based upon the entries in the plurality of component profiles. The risk profile may be generated by the server 140 by appending the component profiles, or the risk profile may be generated by the server 140 by processing combining the entries in the component profiles. Combining the entries in the component profiles may include generating conditional risk levels or impact estimates, as well as conditional expected value estimates associated with various conditions and/or components. In some embodiments, some or all of the entries in the risk profile may represent total risk levels or total expected values that incorporate risks and results for a plurality of components of the vehicle 108, the smart home 187, and/or the personal electronic device 189.

At block 818, in some embodiments, the server 140 may determine one or more actions to reduce one or more risks associated with autonomous operation based upon the determined risk profile for the vehicle 108, the smart home 187, and/or the personal electronic device 189. The one or more actions may be associated with reducing the risks (or results) associated with malfunctions of one or a plurality of the components of the vehicle 108, the smart home 187, and/or the personal electronic device 189. To determine actions to reduce risks the server 140 may determine one or more repairs, upgrades, replacements, or updates that may be made to the one or more components. For example, the server 140 may identify a software version associated with an autonomous operation feature that would reduce the expected damage caused by a component failure and/or reduce the risk of exposure of the component to a cyber-attack.

Based upon such determination of actions to reduce risks or impacts from component malfunctions and/or cyber-attacks, the server 140 may further determine additional information necessary to implement such actions. For example, information regarding repair or replacement options or costs may be determined, as may information regarding repair service providers. Where the one or more actions include updating or upgrading software, the server 140 may determine to automatically update or upgrade the software when the vehicle 108, the smart home 187, and/or the personal electronic device 189 is not in operation, and/or at a time generally associated with low risk of impacting other components (e.g., around 3 A.M.). The one or more actions may thus include causing the vehicle 108, the smart home 187, and/or the personal electronic device 189 to update or upgrade one or more components automatically. Similarly, the one or more actions may include scheduling an appointment to repair or replace one or more components of the vehicle 108, the smart home 187, and/or the personal electronic device 189. The one or more actions may further include causing the vehicle 108 to travel in a fully autonomous mode to a repair service provider for repair or replacement of the one or more components.

Alternatively, or additionally, the one or more responses may include generating one or more messages regarding the components for presentation to an owner or operator of the vehicle 108, an occupant or owner of the smart home 187, and/or the person monitored by the personal electronic device 189. Such messages may include notifications or recommendations regarding the determined repairs, upgrades, replacements, or updates that may be made to the one or more components. The messages may similarly include recommendations regarding usage of the one or more components, such as recommendations of conditions and/or settings for use of such components to reduce risk. Such messages may further include information regarding costs associated with the recommendations, which may include cost savings or reductions in costs associated with a vehicle insurance policy.

At block 820, in some embodiments, the server 140 may implement the determined one or more actions. This may include generating and communicating messages to owners and/or operators of the vehicle 108, the occupants and/or owners of the smart home 187, and/or the persons monitored by the personal electronic device 189 for presentation via a display 202. In some embodiments, such actions may be implemented by scheduling appointments to repair or replace components, as well as controlling vehicles to travel to service locations for such appointments. In further embodiments, the actions may be implemented by automatically updating or upgrading software associated with one or more autonomous operation features of the vehicle 108, the smart home 187, and/or the personal electronic device 189. The server 140 may communicate with the on-board computer 114, the smart home controller 185, and/or the personal electronic device 189 to implement such actions.

Exemplary Component Repair Methods

Figure 9:
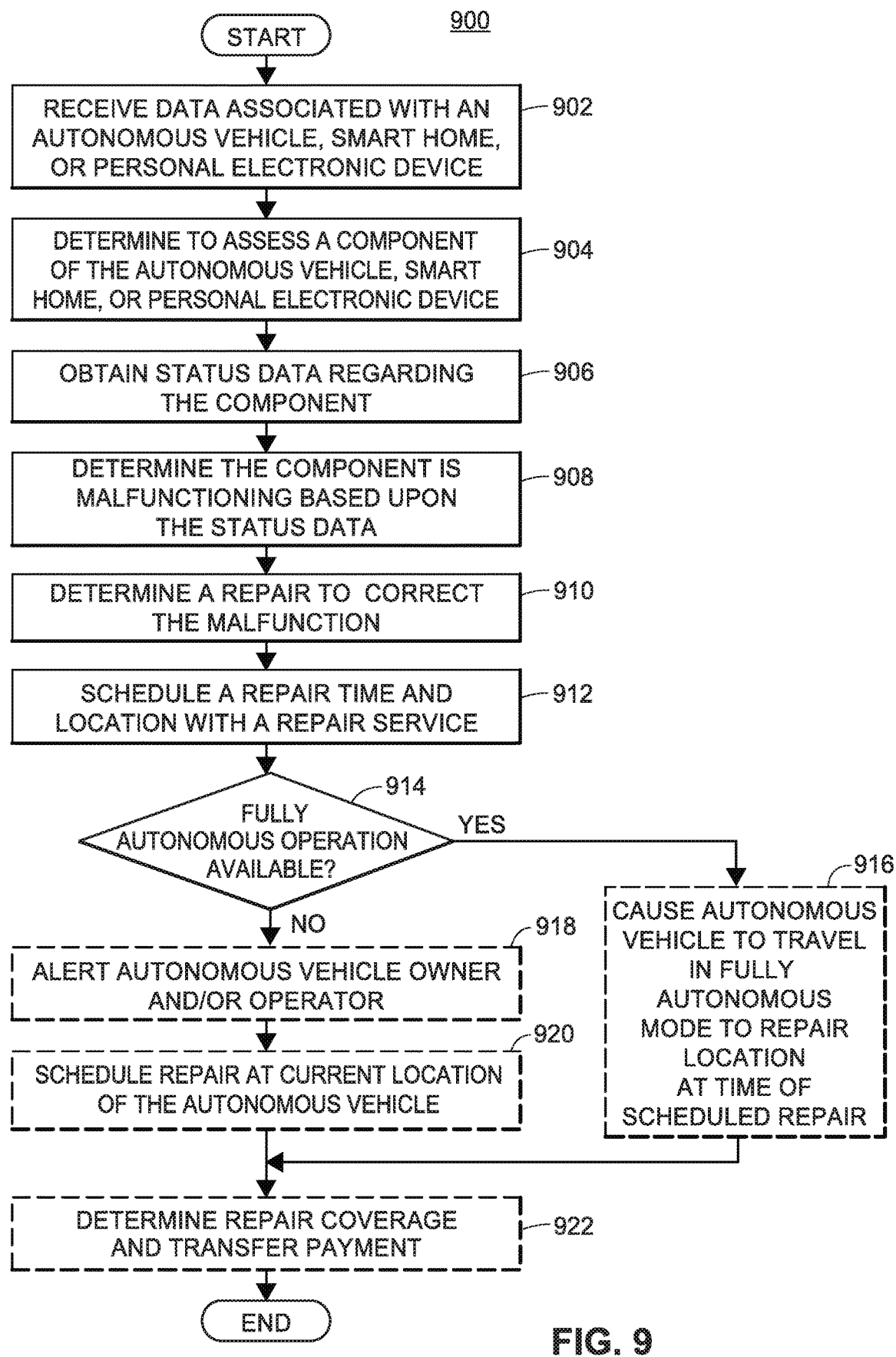
FIG. 9 illustrates a flow diagram of an exemplary autonomous repair computer-implemented method for identifying and repairing malfunctioning components of an autonomous vehicle and/or a smart home.

FIG. 9 illustrates a flow diagram of an exemplary autonomous component repair method 900 for identifying and repairing malfunctioning components of an autonomous vehicle 108, a smart home 187 and/or a personal electronic device 189. Such method 900 may be utilized to automatically detect and correct malfunctions affecting components of a vehicle 108, a smart home 187 and/or a personal electronic device 189 that are associated with autonomous operation. Unlike traditional devices, autonomous vehicles, smart homes and/or personal electronic devices may be capable of self-diagnosis using the on-board computer 114 and/or the smart home controller 185. In embodiments associated with autonomous vehicles, the autonomous vehicle 108 may be further capable of automatic travel to facilities capable of repairing or replacing malfunctioning components. In circumstances in which malfunctions are not so severe as to preclude autonomous operation, the on-board computer 114 may automatically schedule an appointment for such repairs and control the vehicle 108 to travel to such appointment, either with or without the involvement of a vehicle owner or operator. When the malfunctions preclude autonomous operation, or in embodiments associated with the smart home 187 and/or the personal electronic device 189, however, the on-board computer 114 may nonetheless alert an owner, occupant, or operator to the situation, which may also include scheduling an appointment for the vehicle 108, the smart home 187 and/or the personal electronic device 189 to be repaired. Although the method 900 is described below as being performed by the on-board computer 114, the smart home controller 185, the personal electronic device 189 for simplicity, it should be understood that one or more mobile devices 110 or servers 140 may alternatively, or additionally, be used to perform part or all of the process.

The exemplary autonomous component repair method 900 may begin by receiving data associated with operation of the vehicle 108, the smart home 187 and/or the personal electronic device 189 (block 902). When an indication of an unusual condition is identified in the received data, a determination to evaluate one or more autonomous operation components of the vehicle 108, the smart home 187 and/or the personal electronic device 189 may be made (block 904), and status data regarding the one or more components may be obtained (block 906). A malfunction of at least one of the components may be determined based upon the status data (block 908). One or more repairs may then be determined to correct the malfunction (block 910), and such repairs may be scheduled with a repair service provider (block 912). In embodiments associated with the autonomous vehicle 108, if the vehicle 108 is able to operate fully autonomously despite the malfunction (block 914), the vehicle 108 may travel autonomously to a repair location associated with the scheduled appointment (block 916). If the vehicle 108 is unable to operate fully autonomously with the malfunction (block 914), an alert regarding the malfunction may be generated and presented to a vehicle owner or operator (block 918). In some embodiments, the repair may be scheduled or rescheduled for a current location of the vehicle 108 when the vehicle 108 is unable to operate fully autonomously (block 920). In further embodiments, insurance or other coverage for the repair may be determined and payments made automatically (block 922).

At block 902, the on-board computer 114, the smart home controller 185 and/or the personal electronic device 189 may receive data associated with operation of the vehicle 108, the smart home 187 and/or the personal electronic device 189. This may include receiving operating data associated with the vehicle 108, the smart home 187 and/or the personal electronic device 189, or other information regarding operation. In some embodiments, the data may be received from a vehicle operator and/or smart home occupant. A vehicle operator and/or smart home occupant may manually enter input or select an option indicative of a general operating status of the vehicle 108, the smart home 187 and/or the personal electronic device 189. For example, a vehicle operator and/or smart home occupant may select an option to begin a diagnostic and repair routine via the on-board computer 114, the smart home controller 185, the personal electronic device 189, and/or a mobile device 110, such as when the vehicle operator and/or smart home occupant observes something to be amiss in autonomous operation. In further embodiments, the data may include a summary indicator of whether an unusual condition or an incident has occurred, which summary indicator may be generated by a monitoring or response method, as described elsewhere herein (particularly with reference to method 500).

At block 904, the on-board computer 114, the smart home controller 185, and/or the personal electronic device 189 may determine to assess one or more autonomous operation components of the vehicle 108, the smart home 187 and/or the personal electronic device 189 based upon the received data. In some embodiments, the determination may be based upon an indication in the data of an anomaly associated with part of the received data related to the one or more components. For example, a discrepancy between sensor data received from two or more sensors may be detected, indicating that at least one of the two or more sensors may be malfunctioning without directly indicating which sensor or sensors are malfunctioning. In further embodiments, determining to assess the one or more autonomous operation features may include determining the occurrence of a loss-event, such as a collision involving the vehicle 108, a loss of control of the vehicle 108, a near collision of the vehicle 108 with an object within a threshold distance, damage to the vehicle 108, the smart home 187 and/or the personal electronic device 189, and/or the presence of unsafe conditions associated with the smart home 187. The determination may further include determining which components to assess based upon the received data, such as by determining a collision involving a front portion of the vehicle 108 or loss occurred in the basement of the smart home 187.

At block 906, the on-board computer 114, the smart home controller 185 and/or the personal electronic device 189 may obtain status data regarding the one or more components of the vehicle 108, the smart home 187 and/or the personal electronic device 189. This may include requesting, accessing, or receiving such status data from a program memory 208 or from the component itself. The status data may include operating data associated with the one or more components, such as sensor data from a plurality of sensors 120 of the vehicle 108, the smart home 187 and/or the personal electronic device 189. In some embodiments, the status data may be indicative of a self-diagnosis of the component or may be received over a sample period of time.

In further embodiments, the status data may be received in summary form, such as a summary of operating data associated with the one or more components (e.g., summaries of control decisions made by an autonomous operation feature). Such status data may further include or be associated with information regarding conditions in the autonomous operation environment. In embodiments in which a loss-event is determined to have occurred, the on-board computer 114, the smart home controller 185 and/or the personal electronic device 189 may request the status data in response to such determination of the incident.

At block 908, the on-board computer 114, the smart home 187 and/or the personal electronic device 189 may evaluate the one or more components using the status data to determine at least one of the components is malfunctioning. This determination may include identifying at least one of the components that is malfunctioning by iteratively evaluating the one or more components against predetermined or dynamically determined expected ranges of operation, such as discussed elsewhere herein (particularly with reference to method 700). This determination may further include identifying a type of malfunction, cause of the malfunction, and/or extent of the malfunction. In some embodiments, the determination may include a prediction of future failure of the component based upon current or prior status data regarding the component. Such prediction may be further based upon a comparison with information regarding similar components of a plurality of other vehicles, smart homes, or personal electronic devices, which may be received from the server 140 or the database 146. In some embodiments, the server 140 may determine such prediction and communicate the prediction of future failure of the component.

At block 910, the on-board computer 114, the smart home controller 185 and/or the personal electronic device 189 may determine one or more repairs to correct the determined malfunction. Such repairs may include adjusting or replacing a component or portion thereof. The repairs may be determined based upon the status data or information derived therefrom, such as the cause of the malfunction. The repairs may further be based upon information regarding repairs made to a plurality of other vehicles, smart homes, and/or personal electronic devices having similar component malfunctions. In some embodiments, determining the one or more repairs may include further determining one or more requirements associated with the repairs that indicate parts required for the repairs or skill levels required for the repairs.

In some embodiments, the one or more repairs may be determined by the server 140 based upon information received from the on-board computer 114, the smart home 187 and/or the personal electronic device 189. In further embodiments, the determined repairs may be verified by a human reviewer, such as an agent of an insurer. Such verification may be performed remotely or at a repair facility or other site associated with the reviewer, in which case the vehicle 108 may be caused to travel to the site for review. In yet further embodiments, external photographic or video evidence of damage to the vehicle 108, the smart home 187 and/or the personal electronic device 189 may be captured and stored by a human reviewer, regardless of whether the human reviewer is required to verify the determined repairs. This may be particularly useful where a third party may be liable for the malfunction.

At block 912, the on-board computer 114, the smart home controller 185 and/or the personal electronic device 189 may automatically schedule an appointment with a repair service provider to perform the one or more repairs. Such scheduling may be performed in conjunction with the server 140, which may be instructed by the on-board computer 114, the smart home controller 185, and/or the personal electronic device 189 to schedule an appointment based upon the determined one or more component malfunctions and/or repairs. Scheduling the appointment may include first identifying one or more repair service providers capable of performing the determined one or more repairs to correct the component malfunction. Identifying the repair service providers may include determining that the repair service providers are capable of meeting one or more requirements associated with the repairs that indicate parts required for the repairs or skill levels required for the repairs. In some embodiments, the on-board computer 114, the smart home controller 185, the personal electronic device 189 and/or server 140 may provide information regarding the one or more determined component malfunction and repairs to the repair service provider in order to schedule the appointment.

If multiple repair service providers are determined to be capable of performing the repair, one of the repair service providers may be selected based upon scheduling availability, cost, location, quality metrics associated with previous repairs, or other criteria. The appointment may be scheduled for a service time and service location for the repairs to be performed immediately or at some future point following scheduling. In some embodiments, the appointment may be scheduled for a time when the vehicle 108, the smart home 187 and/or the personal electronic device 189 is ordinarily not in use in order to minimize the impact of the repairs on owners, occupants, or operators.

In further embodiments, the appointment may be presented to an owner, occupant, or operator for confirmation prior to being set. In yet further embodiments, alternative transportation may be scheduled for the vehicle owner or operator during the scheduled repairs. Such alternative transportation may include taxi service, temporary vehicle-sharing membership, vehicle rental, or similar temporary replacement transportation.

At block 914, in embodiments associated with the vehicle 108, the on-board computer 114 may determine whether the vehicle 108 is capable of fully autonomous operation to travel to the repair service provider location. In some embodiments, such determination may be made prior to or while scheduling the appointment, which may influence the selection of the time and location of the appointment. The determination of whether the vehicle 108 is capable of fully autonomous operation may include determining that the risk associated with fully autonomous operation of the vehicle 108 by its autonomous operation features is below a risk level below a risk threshold associated with safe operation, despite the component malfunction. When the vehicle 108 is determined to be capable of fully autonomous operation, the on-board computer 114 may control the vehicle to travel to the service location for the scheduled appointment (block 916). If fully autonomous operation of the vehicle 108 by its autonomous operation features would result in a risk above the risk threshold, the vehicle 108 may be determined unfit for fully autonomous operation. When the vehicle 108 is determined not to be capable of fully autonomous operation, the on-board computer 114 may alter an owner or operator of the vehicle 108 of the component malfunction and inability of the vehicle 108 to operate fully autonomously (block 918).

At block 916, in embodiments associated with the vehicle 108, the on-board computer 114 may control the vehicle 108 to travel fully autonomously to the service location to arrive at or before the scheduled service time using the autonomous operation features. The on-board computer 114 may select autonomous operation features or settings associated therewith to minimize risks or risk-weighted impacts associated with accidents during autonomous operation to the scheduled appointment. This may include limiting or eliminating use of one or more autonomous operation features that depend upon the one or more malfunctioning components.

The on-board computer 114 may further select a route to minimize risks of damage or injury, such as by avoiding highways or road segments previously determined to be associated with high risk for autonomous operation. The on-board computer 114 may further adjust settings to reduce risk, such as by limiting vehicle operation to travel below a specific speed or only travelling during daylight hours without precipitation. To meet such requirements, in some embodiments, the on-board computer 114 may cause the vehicle 108 to travel to the service location in advance of the service time. Information regarding the scheduled appointment or the fully autonomous operation of the vehicle 108 may be presented to an owner or operator of the vehicle 108 for review, adjustment, or approval.

At block 918, the on-board computer 114, the smart home 187 and/or the personal electronic device 189 may generate an alert to an owner, occupant, or operator of the vehicle 108, the smart home 187 and/or the personal electronic device 189 when the vehicle 108, the smart home 187 and/or the personal electronic device 189 cannot operate fully autonomously to travel to the service location. The on-board computer 114, the smart home 187 and/or the personal electronic device 189 may further cause the alert to be presented to the owner, occupant, or operator by a display of the vehicle 108, the smart home controller 185, the personal electronic device 189, mobile device 110, or other computing device associated with the owner, occupant, or operator. The alert may include information regarding the one or more malfunctions associated with the components of the vehicle 108, the smart home 187 and/or the personal electronic device 189, such as a summary of malfunctions or causes of the malfunctions. The alert may further include one or more repair recommendations. In some embodiments, information regarding the recommended repairs may be included in the alert, such as typical costs, time, or parts associated with such repairs. In further embodiments, information regarding one or more repair service providers may be provided, and one or more proposed appointments may be recommended. In yet further embodiments, the alert may include a request to the owner, occupant, or operator to confirm, reschedule, or cancel an automatically scheduled appointment with a repair service provider.

At block 920, in some embodiments, the on-board computer 114, the smart home 187 and/or the personal electronic device 189 may schedule an appointment to repair the one or more malfunctioning components at a service location not associated with the repair service provider. Such service location may include a current location of the vehicle 108, the smart home 187 and/or the personal electronic device 189 or a usual parking or garaging location of the vehicle 108. Thus, the vehicle 108, the smart home 187 and/or the personal electronic device 189 may be repaired without traveling to the repair service provider, which may be of particular value when the vehicle 108 is incapable of fully autonomous operation because of the one or more malfunctions. This may include automatically rescheduling the appointment with the repair service provider, or this may include changing the service location before scheduling the appointment (or before finalizing or confirming the appointment).

At block 922, in some embodiments, the on-board computer 114, the smart home 187 and/or the personal electronic device 189 or server 140 may determine an insurance policy coverage or other coverage for the one or more repairs. Such coverage may be determined based at least in part upon a determined cause of each malfunction. For example, a coverage for weather-related damage may be determined to apply to the one or more repairs when the one or more malfunctions are determined to have been caused by freezing temperatures or hail damage. In further embodiments, a payment may be automatically made to the repair service provider for the repair work based upon the determined coverage. This may be facilitated by one or more servers 140, which may cause a transfer of funds to be made to an account associated with the repair service provider. Such transfers may be made following completion of the repairs. The one or more server 140 may further cause a deduction to be made from an account associated with the vehicle 108, the smart home 187 and/or the personal electronic device 189 for a copayment or deductible payment associated with the coverage in yet further embodiments.

Exemplary Malfunction Detection Methods

Figure 10:
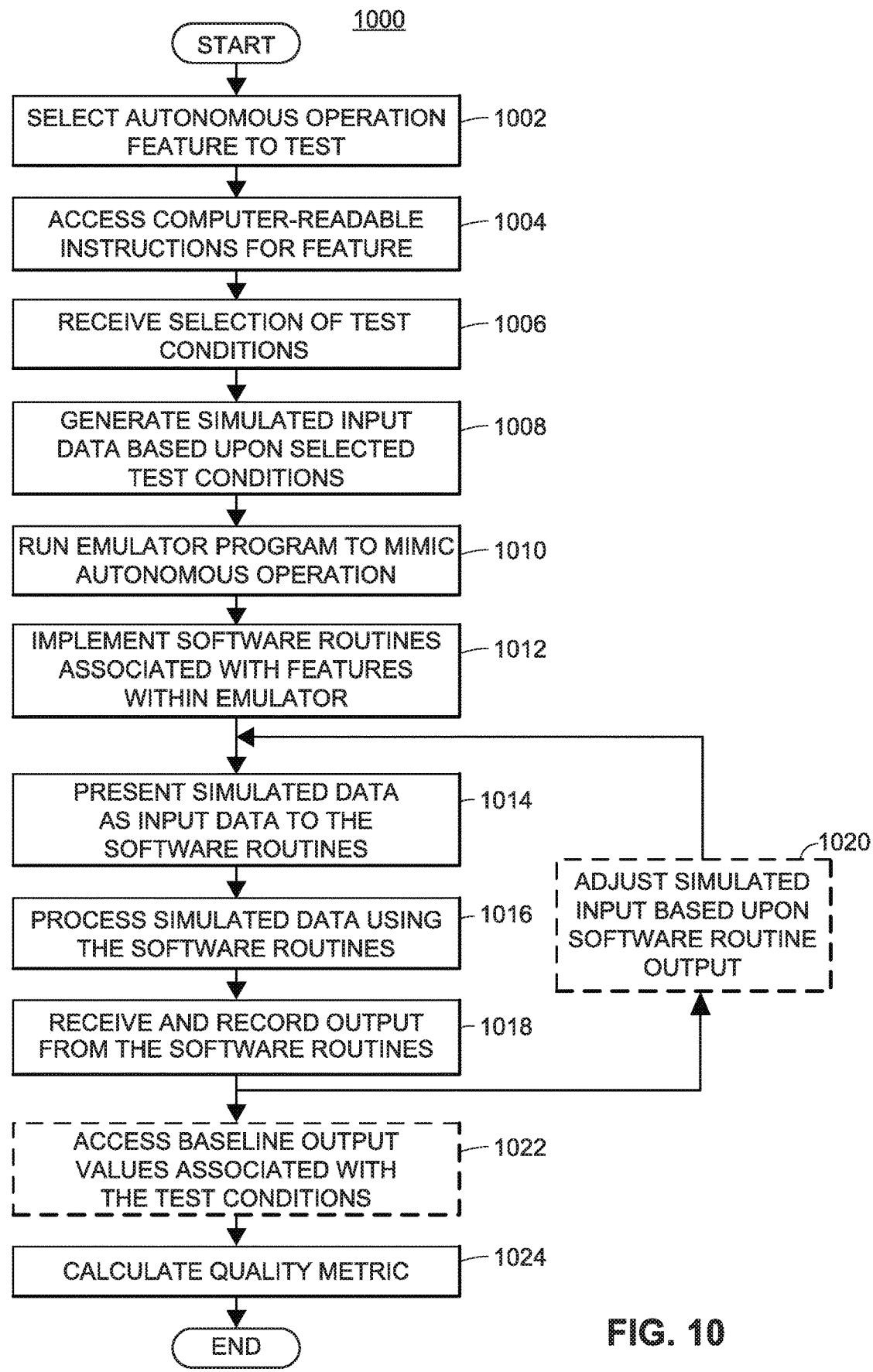
FIG. 10 illustrates a flow diagram of an exemplary autonomous environment control software evaluation computer-implemented method for testing the quality of control decisions generated by autonomous operation feature of an autonomous vehicle and/or smart home.

FIG. 10 illustrates a flow diagram of an exemplary autonomous environment control software evaluation method 1000 for testing the quality of control decisions generated by autonomous operation feature of an autonomous vehicle 108, a smart home 187, and/or a personal electronic device 189. Such method 1000 may be implemented to assess the operation of software components used in autonomous operation outside of a vehicle, a smart home, and/or a personal electronic device. Such testing may allow new software or software version updates to be evaluated in a realistic computing environment without the hazards associated with testing in a vehicle, a smart home, and/or a personal electronic device. In some embodiments, the test environment may include emulation of an autonomous operating system, such as the on-board computer architecture 114 and/or the smart home controller 185, operating at an artificially accelerated system clock speed to facilitate faster testing of control software under a variety of conditions.

Although the method 1000 is described below as being performed by one server 140 for simplicity, it should be understood that one or more mobile devices 110, on-board computers 114, smart home controllers 185, personal electronic device 189, or servers 140 may alternatively, or additionally, be used to perform part or all of the process. For example, multiple test scenarios representing a plurality of test conditions may be simultaneously run using a plurality of servers 140 (or a plurality of processors 162) to reduce the total time required to evaluate the software features.

The exemplary method 1000 may begin with selection of one or more autonomous operation features to test (block 1002). Based upon the selection of autonomous operation features, computer instructions associated with such autonomous operation features may be retrieved from a memory storage (block 1004). The computer instructions may include one or more software routines associated with the selected autonomous operation features. A further selection of test conditions to be used in testing the autonomous operation features may be received (block 1006), which may be associated with types of vehicles, smart homes, and/or personal electronic devices, other software features, or environmental conditions of a virtual operating environment mimicking a vehicle operating environment. Simulated input data may then be generated based upon the selected autonomous operation features and test conditions (block 1008). An emulation of an autonomous environment operating system may be started to test the software routines (block 1010), and the software routines may be implemented within the emulated operating system (block 1012).

Once the software environment is prepared, the test may be performed by presenting the simulated input data to the software routines (block 1014), processing the simulated input data by the software routines (block 1016), and recording output data received from the software routines (block 1018). Such output data may include control commands generated by the software routines configured to directly or indirectly control autonomous operation when executed within an autonomous environment during autonomous operation using the associated autonomous operation feature. One or more quality metrics indicative of effectiveness of the evaluated autonomous operation features may be calculated for the software routines based upon the recorded output data (block 1024). In some embodiments, baseline output values may be retrieved (block 1022) and used in generating and/or determining the one or more quality metrics by comparison with the recorded output data (block 1024).

At block 1002, a user may select one or more autonomous operation features to evaluate. The selection may be made from a list of autonomous operation features or groups of autonomous operation features. In some embodiments, the user may select the features via a user interface of a display 202, which selection may be communicated to the server 140. In further embodiments, the user may implicitly select one or more features to evaluate by storing or loading the features in a memory of the server 140 for testing. This may include storing computer-readable instructions associated with the autonomous operation features in a directory location that may be accessed for testing. In yet further embodiments, the user may select a directory location to select the computer-readable instructions stored at such location.

At block 1004, the server 140 may access computer-readable instructions associated with the selected one or more autonomous operation features in response to receiving the user selection. Such computer-readable instructions may comprise one or more software routines that may be implemented within an autonomous environment operating system, such as one running on an on-board computer 114 of an autonomous vehicle 108 and/or one running on a smart home controller 185 of a smart home 187, to perform control, monitoring, assessment, communication, and/or similar operations in support of autonomous operation. Although referred to as software routines for simplicity, such computer-readable instructions may include subroutines, programs, applications, scripts, or similar executable or callable code segments. Accessing the software routines may include retrieving the computer-readable instructions stored in one or more directory locations. In some embodiments, the software routines may be accessed from a remote storage device, such as another server connected to the server 140 via the network 130.

At block 1006, the server 140 may receive a selection of test conditions for evaluating the one or more autonomous operation features. The user may select the test conditions by selecting one or more indicators representing the test conditions, or the server 140 may automatically select the test conditions based upon a configuration file or other stored information. The test conditions may indicate parameters, scope, or duration of testing of the autonomous operation features. In some embodiments, the selection of test conditions may include selection of a make and/or model of an autonomous vehicle, an on-board computer, a smart home controller, or an autonomous environment operating system (or version thereof). This may include information regarding sensors or sensor data available for use by the autonomous operation features (e.g., number and type of sensors, operating status of sensors, or configuration of sensors within a simulated environment).

In further embodiments, the selection of test conditions may include indicating one or more types of environmental conditions to mimic in the simulated input data to be presented to the software routines during testing. Such environmental conditions may include conditions relating to time of day (e.g., daylight levels, glare, or headlights of other vehicles), weather (e.g., wind, precipitation, visibility, temperature, or other weather conditions), road type (e.g., highway, residential, urban, or rural), road integrity (e.g., road material, ice, pooling water, or potholes), traffic (e.g., congestion, mean or median speed, or average vehicle spacing), neighborhood (e.g., urban, suburban, apartment complex, or agricultural) construction (e.g., lane closures, temporary traffic patterns, or active construction work), and/or other similar conditions that affect effectiveness of autonomous operation features in controlling a vehicle and/or smart home. The environmental conditions may be specified at various levels of detail or in groupings, such as urban rush hour conditions or rural winter storm conditions.

At block 1008, the server 140 may generate simulated input data based upon the selected test conditions. The simulated input data may be generated as one or more sets of test data associated with test conditions. The test data may include simulated sensor data, such as a plurality of simulated sensor data points to be presented to the software routines as inputs during testing. The test data may further include simulated control data from one or more other autonomous operation features that may be provided to the software routines as inputs during testing, as well as simulated communication data from one or more communication components. In some embodiments, the set of test data may include a plurality of subsets of test data, each such subset representing a combination of conditions (e.g., daylight urban driving in moderate congestion during clear weather, daylight urban driving in moderate congestion during rain, daylight urban household during snow, etc.). In this manner, the selected autonomous operation features may be tested in a range of environments in an efficient manner, without requiring the user to specify each potential environmental condition. Similarly, the subsets of test data may be used to present a variety of scenarios with the same combination of conditions. For example, normal operation may be tested by one subset of test data, while response to the simulated vehicle being cut off by another vehicle within the simulation may be tested using another subset of test data.

The test data may include one or more sequences of simulated data signals, such as sensor data signals. Each sequence of simulated data signals may simulate a time series of continuous or discrete data over a time period during vehicle operation. For example, a sequence may be associated with a time series of data points over a time interval representing sensor readings from an accelerometer within the vehicle. Another sequence may be associated with a time series of data points over the same time interval of a proximity sensor at a location within the vehicle and/or smart home. The sequences may be standardized sequences generated in advance and stored in a database 146, to be retrieved by the server 140 to generate the set of test data. Such retrieved sequences may include recorded sequences of sensor data from actual autonomous operation that has previously occurred and been recorded by on-board computers 114 of a plurality of vehicles 108 and/or a plurality of smart home controller 185 from a plurality of smart homes 187. Such recorded sensor data may be associated with ordinary autonomous operation or incidents involving the vehicles and/or smart homes (e.g., loss of control situations, collisions, loss-events, etc.).

In some embodiments, the sequences may be generated by the server 140 based upon the received selections of autonomous operation features and test conditions, such as by generating expected sensor data based upon a simulation of an autonomous operation in a virtual environment meeting the criteria indicated by the selected test conditions. The set of test data may be generated by combining a plurality of sequences of simulated data signals, which sequences may be matched in time to be concurrent within the simulated test environment. In some embodiments, the combination of sequences may include a simple aggregation of such signal sequences. In further embodiments, combining the sequences may include generating one or more summary sequences or signals from two or more of the retrieved sequences, or combining the sequences may include modifying one or more of the sequences based upon other retrieved sequences.

At block 1010, the server 140 may start an emulator program to mimic an autonomous environment operating system. The emulator may be configured to mimic a specific version of an autonomous environment operating system running on a particular make and model of a smart home controller 185 and/or an on-board computer 114, which may be associated with a particular make, model, and year of an autonomous vehicle. The emulator may perform operations to execute the computer-readable instructions of the software routines on the hardware architecture of the server 140. This may include translating signals from the sets of test data into a format usable by the software routines and translating the output of the software routines for storage in the program memory 160 or database 146. Such translation may include interpolation or sampling of data points. In some embodiments, the emulator program may be configured to operate at an accelerated speed in order to process the test data faster than real-time. This may include keeping a separate internal system clock within the emulator program that is used by the software routines. Such internal system clock may progress faster than an external clock of the server 140. By operating at an accelerated speed, the emulator program may enable the software routines to process the simulated input data in less time than the time interval nominally associated with the data.

At block 1012, the emulator may implement the one or more software routines associated with the selected autonomous operation features. This may include accessing a directory location where the computer-readable instructions specifying the software routines are stored to load the software routines in the emulated environment. The software routines may be executed within the emulator to process the simulated input data in a manner similar to operation within an on-board computer 114 of an autonomous vehicle 108 and/or a smart home controller 185 of a smart home 187.

At block 1014, the emulator may present the simulated input data as inputs to the one or more software routines within the emulated environment. In some embodiments, the emulator may receive the set of test data from another program or routine running on the server 140. As noted above, the simulated input data may include simulated or prerecorded values of sensor data, control data, communication data, or a combination of such data. The emulator may parse the set of test data to separate the types of simulated input data for separate presentation to the software routines. For example, the sensor data may include data sequences with different periodicity from the update period of control data signals with in the data set. The emulator may then align the presentation of such various simulated input data to the software routines to represent a coherent set of inputs.

In some embodiments, the emulator may further implement one or more additional software routines to generate control data as further inputs to the software routines. Such additional software routines may be presented with part or all of the simulated input data as inputs, and the outputs generated by such additional software routines may be presented as inputs to the one or more software routines.

At block 1016, the one or more software routines may process the received inputs to generate output data within the emulator environment. The output data generated by the software routines may include output signals indicative of conditions determined by the software routines, control signals configured for controlling autonomous components, and/or other data generated by the software routines as inputs into further software or hardware components configured for controlling autonomous components. The one or more software routines may run within the emulator program on the server 140 to produce such output data in the same manner that the software routines would run within the autonomous environment operating system, such as on an on-board computer 114 during vehicle operation and/or a smart home controller 185 during smart home operation. In some embodiments, the emulator program may control one or more settings of the autonomous operation features associated with the software routines by adjusting parameter variable values stored within the emulated environment and accessed by the software routines during data processing.

At block 1018, the emulator may cause the output data or indications associated with the output data to be stored by the server 140. This may include sampling or translating the output data from the software routines to prepare the output data for storage by the server 140. The server 140 may receive the prepared output data or indications associated therewith and store such received data in the program memory 160 or database 146 for further analysis. The output data may be time-stamped or otherwise associated with sequences of simulated data signals in the set of test data. In some embodiments, the indications associated with the output data may include indications of errors or failures of the software routines. For example, the indications could including information regarding stack overflow, infinite looping, out-of-range values, or other events associated with failures of the software routines to operate properly or perform vehicle control functions in an effective manner.

In some embodiments, at block 1020, the emulator (or other application running on the server 140) may further use the output data generated by the one or more software routines in determining or adjusting the simulated input data to present to the software routines as inputs. This may include providing previously generated output data as input data (e.g., prior period control data generated by a software routine may be used as an input for generating current period control data). This may likewise include adjusting simulated sensor data or control data from additional software routines based upon output data generated by the software routines. For example, the server 140 may run a virtual vehicle environment simulation application that interfaces with the emulator to provide simulated input data to the emulator and to model movement of a virtual vehicle within a virtual environment based upon the output data generated within the emulator. Thus, output generated by the software routines may be used to control a virtual position of the virtual vehicle relative to other objects within the virtual environment, which updated position may then be used to generate further simulated input data. Similarly, the server 140 may run a virtual smart home environment simulation application that interfaces with the emulator to provide simulated input data to the emulator to model movement of objects within the virtual environment proximate to or within a smart home. For example, the virtual smart home environment simulation application may simulate and/or model a virtual fire on a neighboring property. The adjusted or updated simulated input data may then be presented to the one or more software routines running within the emulator program (block 1014).

In further embodiments, at block 1022, the server 140 may access baseline output values associated with the selected test conditions from the database 146. The baseline output values may be indicative of ordinary or acceptable functioning of the selected one or more autonomous operation features under the selected conditions. The baseline output values may be determined based upon calculated output values required for safe autonomous operation of a vehicle, smart home, and/or personal electronic device, or the baseline output values may be determined from analysis of data indicating actual output values from actual operation of a plurality of autonomous vehicles, smart homes, and/or personal electronic devices. In some embodiments, the baseline output values may be associated with test or actual output values from another version of a related software routine associated with an autonomous operation feature. For example, output values for a current version of control software routines associated with an autonomous operation feature that had been determined by previous testing (i.e., using the method described herein) may be used as baseline output values for comparison against output data generated by testing a new version or update to the control software routines associated with the same autonomous operation feature.

At block 1024, the server 140 may generate and/or determine one or more quality metrics indicative of effectiveness of the evaluated autonomous operation features in controlling an autonomous vehicle. The quality metrics may be generated and/or determined based upon the output data recorded during evaluation of the software routines associated with the autonomous operation features. In some embodiments, such quality metrics may be indicative of risks associated with the autonomous operation features. The quality metrics may be generated and/or determined by comparison of the recorded output data with output values indicative of effective control of an autonomous vehicle, smart home, and/or personal electronic device by the autonomous operation features. As discussed above, some embodiments may generate and/or determine the quality metrics by comparing the recorded output data with baseline output values.

Such comparison may include determining one or more measures of differences between record output and baseline output values, which may then be used to determine the one or more quality metrics. For example, the quality metric may be determined as a measure of magnitude of the differences between the record output and baseline output values. The differences may be indicative of improvement or deterioration of the operation of the tested software routines relative to the baseline performance indicated by the baseline output values. The determined quality metrics may be stored or presented to the user for review. Once the quality metrics have been generated, the method 1000 may terminate.

Exemplary Methods of Determining Risk Using Telematics Data

As described herein, telematics data may be collected and used in monitoring, controlling, evaluating, and assessing risks associated with autonomous or semi-autonomous operation of a vehicle 108. In some embodiments, the Data Application installed on the mobile computing device 110 and/or on-board computer 114 may be used to collect and transmit data regarding vehicle operation. This data may include operating data regarding operation of the vehicle 108, autonomous operation feature settings or configurations, sensor data (including location data), data regarding the type or condition of the sensors 120, telematics data regarding vehicle regarding operation of the vehicle 108, environmental data regarding the environment in which the vehicle 108 is operating (e.g., weather, road, traffic, construction, or other conditions). Such data may be transmitted from the vehicle 108 or the mobile computing device 110 via radio links 183 (and/or via the network 130) to the server 140. The server 140 may receive the data directly or indirectly (i.e., via a wired or wireless link 183e to the network 130) from one or more vehicles 182 or mobile computing devices 184. Upon receiving the data, the server 140 may process the data to determine one or more risk levels associated with the vehicle 108.

In some embodiments, a plurality of risk levels associated with operation of the vehicle 108 may be determined based upon the received data, using methods similar to those discussed elsewhere herein, and a total risk level associated with the vehicle 108 may be determined based upon the plurality of risk levels. In other embodiments, the server 140 may directly determine a total risk level based upon the received data. Such risk levels may be used for vehicle navigation, vehicle control, control hand-offs between the vehicle and driver, settings adjustments, driver alerts, accident avoidance, insurance policy generation or adjustment, and/or other processes as described elsewhere herein.

In some aspects, computer-implemented methods for monitoring the use of a vehicle 108 having one or more autonomous operation features and/or adjusting an insurance policy associated with the vehicle 108 may be provided. In some embodiments, the mobile computing device 110 and/or on-board computer 114 may have a Data Application installed thereon, as described above. Such Data Application may be executed by one or more processors of the mobile computing device 110 and/or on-board computer 114 to, with the customer's permission or affirmative consent, collect the sensor data, determine the telematics data, receive the feature use levels, and transmit the information to the remote server 140. The Data Application may similarly perform or cause to be performed any other functions or operations described herein as being controlled by the mobile computing device 110 and/or on-board computer 114.

The telematics data may include data regarding one or more of the following regarding the vehicle 108: acceleration, braking, speed, heading, and/or location. The telematics data may further include information regarding one or more of the following: time of day of vehicle operation, road conditions in a vehicle environment in which the vehicle is operating, weather conditions in the vehicle environment, and/or traffic conditions in the vehicle environment. In some embodiments, the one or more sensors 120 of the mobile computing device 110 may include one or more of the following sensors disposed within the mobile computing device 110: an accelerometer array, a camera, a microphone, and/or a geolocation unit (e.g., a GPS receiver). In further embodiments, one or more of the sensors 120 may be communicatively connected to the mobile computing device 110 (such as through a wireless communication link).

The feature use levels may be received by the mobile computing device 110 from the on-board computer 114 via yet another radio link 183 between the mobile computing device 110 and the on-board computer 114, such as link 116. The feature use levels may include data indicating adjustable settings for at least one of the one or more autonomous operation features. Such adjustable settings may affect operation of the at least one of the one or more autonomous operation features in controlling an aspect of vehicle operation, as described elsewhere herein.

In some embodiments, the method may further including receiving environmental information regarding the vehicle's environment at the mobile computing device 110 and/or on-board computer 114 via another radio link 183 or wireless communication channel. Such environmental information may also be transmitted to the remote server 140 via the radio link 183 and may be used by the remote server 140 in determining the total risk level. In some embodiments, the remote server 140 may receive part or all of the environmental information through the network 130 from sources other than the mobile computing device 110 and/or on-board computer 114. Such sources may include third-party data sources, such as weather or traffic information services. The environmental data may include one or more of the following: road conditions, weather conditions, nearby traffic conditions, type of road, construction conditions, location of pedestrians, movement of pedestrians, movement of other obstacles, signs, traffic signals, or availability of autonomous communications from external sources. The environmental data may similarly include any other data regarding a vehicle environment described elsewhere herein.

In further embodiments, the method may include collecting addition telematics data and/or information regarding feature use levels at a plurality of additional mobile computing devices 184 associated with a plurality of additional vehicles 182. Such additional telematics data and/or information regarding feature use levels may be transmitted from the plurality of additional mobile computing devices 184 to the remote server 140 via a plurality of radio links 183 and received at one or more processors of the remote server 140. The remote server 140 may further base the determination of the total risk level at least in part upon the additional telematics data and/or feature use levels. Some embodiments of the methods described herein may include determining, adjusting, generating, rating, or otherwise performing actions necessary for creating or updating an insurance policy associated with the vehicle 108.

Autonomous Vehicle Insurance Policies

The disclosure herein relates in part to insurance policies for vehicles with autonomous operation features. Accordingly, as used herein, the term "vehicle" may refer to any of a number of motorized transportation devices. A vehicle may be a car, truck, bus, train, boat, plane, motorcycle, snowmobile, other personal transport devices, etc. Also as used herein, an "autonomous operation feature" of a vehicle means a hardware or software component or system operating within the vehicle to control an aspect of vehicle operation without direct input from a vehicle operator once the autonomous operation feature is enabled or engaged. Autonomous operation features may include semi-autonomous operation features configured to control a part of the operation of the vehicle while the vehicle operator control other aspects of the operation of the vehicle.

The term "autonomous vehicle" means a vehicle including at least one autonomous operation feature, including semi-autonomous vehicles. A "fully autonomous vehicle" means a vehicle with one or more autonomous operation features capable of operating the vehicle in the absence of or without operating input from a vehicle operator. Operating input from a vehicle operator excludes selection of a destination or selection of settings relating to the one or more autonomous operation features. Autonomous and semi-autonomous vehicles and operation features may be classified using the five degrees of automation described by the National Highway Traffic Safety Administration's.

Additionally, the term "insurance policy" or "vehicle insurance policy," as used herein, generally refers to a contract between an insurer and an insured. In exchange for payments from the insured, the insurer pays for damages to the insured which are caused by covered perils, acts, or events as specified by the language of the insurance policy. The payments from the insured are generally referred to as "premiums," and typically are paid by or on behalf of the insured upon purchase of the insurance policy or over time at periodic intervals.

Although the exemplary embodiments discussed herein relate to automobile insurance policies, it should be appreciated that an insurance provider may offer or provide one or more different types of insurance policies. Other types of insurance policies may include, for example, commercial automobile insurance, inland marine and mobile property insurance, ocean marine insurance, boat insurance, motorcycle insurance, farm vehicle insurance, aircraft or aviation insurance, and other types of insurance products.

Autonomous Automobile Insurance

Some aspects of some embodiments described herein may relate to assessing and pricing insurance based upon autonomous (or semi-autonomous) operation of the vehicle 108. Risk levels and/or insurance policies may be assessed, generated, or revised based upon the use of autonomous operation features or the availability of autonomous operation features in the vehicle 108. Additionally, risk levels and/or insurance policies may be assessed, generated, or revised based upon the effectiveness or operating status of the autonomous operation features (i.e., degree to which the features are operating as intended or are impaired, damaged, or otherwise prevented from full and ordinary operation). Thus, information regarding the capabilities or effectiveness of the autonomous operation features available to be used or actually used in operation of the vehicle 108 may be used in risk assessment and insurance policy determinations.

Insurance providers currently develop a set of rating factors based upon the make, model, and model year of a vehicle. Models with better loss experience receive lower factors, and thus lower rates. One reason that this current rating system cannot be used to assess risk for vehicles using autonomous technologies is that many autonomous operation features vary for the same vehicle model. For example, two vehicles of the same model may have different hardware features for automatic braking, different computer instructions for automatic steering, and/or different artificial intelligence system versions. The current make and model rating may also not account for the extent to which another "driver," in this case the vehicle itself, is controlling the vehicle. The present embodiments may assess and price insurance risks at least in part based upon autonomous operation features that replace actions of the driver. In a way, the vehicle-related computer instructions and artificial intelligence may be viewed as a "driver."

Insurance policies, including insurance premiums, discounts, and rewards, may be updated, adjusted, and/or determined based upon hardware or software functionality, and/or hardware or software upgrades, associated with autonomous operation features. Insurance policies, including insurance premiums, discounts, etc. may also be updated, adjusted, and/or determined based upon the amount of usage and/or the type(s) of the autonomous or semi-autonomous technology employed by the vehicle. In one embodiment, performance of autonomous driving software and/or sophistication of artificial intelligence utilized in the autonomous operation features may be analyzed for each vehicle. An automobile insurance premium may be determined by evaluating how effectively the vehicle may be able to avoid and/or mitigate crashes and/or the extent to which the driver's control of the vehicle is enhanced or replaced by the vehicle's software and artificial intelligence.

When pricing a vehicle with autonomous operation features, artificial intelligence capabilities, rather than human decision making, may be evaluated to determine the relative risk of the insurance policy. This evaluation may be conducted using multiple techniques. Autonomous operation feature technology may be assessed in a test environment, in which the ability of the artificial intelligence to detect and avoid potential crashes may be demonstrated experimentally. For example, this may include a vehicle's ability to detect a slow-moving vehicle ahead and/or automatically apply the brakes to prevent a collision. Additionally, actual loss experience of the software in question may be analyzed. Vehicles with superior artificial intelligence and crash avoidance capabilities may experience lower insurance losses in real driving situations. Results from both the test environment and/or actual insurance losses may be compared to the results of other autonomous software packages and/or vehicles lacking autonomous operation features to determine relative risk levels or risk factors for one or more autonomous operation features. To determine such risk levels or factors, the control decisions generated by autonomous operation features may be assessed to determine the degree to which actual or shadow control decisions are expected to succeed in avoiding or mitigating vehicle accidents. This risk levels or factors may be applicable to other vehicles that utilize the same or similar autonomous operation features and may, in some embodiments, be applied to vehicle utilizing similar features (such as other software versions), which may require adjustment for differences between the features.

Emerging technology, such as new iterations of artificial intelligence systems or other autonomous operation features, may be priced by combining an individual test environment assessment with actual losses corresponding to vehicles with similar autonomous operation features. The entire vehicle software and artificial intelligence evaluation process may be conducted with respect to each of various autonomous operation features. A risk level or risk factor associated with the one or more autonomous operation features of the vehicle could then be determined and applied when pricing insurance for the vehicle. In some embodiments, the driver's past loss experience and/or other driver risk characteristics may not be considered for fully autonomous vehicles, in which all driving decisions are made by the vehicle's artificial intelligence. Risks associated with the driver's operation of the vehicle may, however, be included in embodiments in which the driver controls some portion of vehicle operation in at least some circumstances.

In one embodiment, a separate portion of the automobile insurance premium may be based explicitly on the effectiveness of the autonomous operation features. An analysis of how the artificial intelligence of autonomous operation features facilitates avoiding accidents and/or mitigates the severity of accidents in order to build a database and/or model of risk assessment. After which, automobile insurance risk and/or premiums (as well as insurance discounts, rewards, and/or points) may be adjusted based upon autonomous or semi-autonomous vehicle functionality, such as by individual autonomous operation features or groups thereof. In one aspect, an evaluation may be performed of how artificial intelligence, and the usage thereof, impacts automobile accidents and/or automobile insurance claims. Such analysis may be based upon data from a plurality of autonomous vehicles operating in ordinary use, or the analysis may be based upon tests performed upon autonomous vehicles and/or autonomous operation feature test units.

The adjustments to automobile insurance rates or premiums based upon the autonomous or semi-autonomous vehicle-related functionality or technology may take into account the impact of such functionality or technology on the likelihood of a vehicle accident or collision occurring or upon the likely severity of such accident or collision. For instance, a processor may analyze historical accident information and/or test data involving vehicles having autonomous or semi-autonomous functionality. Factors that may be analyzed and/or accounted for that are related to insurance risk, accident information, or test data may include the following: (1) point of impact; (2) type of road; (3) time of day; (4) weather conditions; (5) road construction; (6) type/length of trip; (7) vehicle style; (8) level of pedestrian traffic; (9) level of vehicle congestion; (10) atypical situations (such as manual traffic signaling); (11) availability of internet connection for the vehicle; and/or other factors. These types of factors may also be weighted according to historical accident information, predicted accidents, vehicle trends, test data, and/or other considerations.

Automobile insurance premiums, rates, discounts, rewards, refunds, points, etc. may be adjusted based upon the percentage of time or vehicle usage that the vehicle is the driver, i.e., the amount of time a specific driver uses each type of autonomous operation feature. In other words, insurance premiums, discounts, rewards, etc. may be adjusted based upon the percentage of vehicle usage during which the autonomous or semi-autonomous functionality is in use. For example, automobile insurance risks, premiums, discounts, etc. for an automobile having one or more autonomous operation features may be adjusted and/or set based upon the percentage of vehicle usage that the one or more individual autonomous operation features are in use, which may include an assessment of settings used for the autonomous operation features. In some embodiments, such automobile insurance risks, premiums, discounts, etc. may be further set or adjusted based upon availability, use, or quality of Vehicle-to-Vehicle (V2V) wireless communication to a nearby vehicle also employing the same or other type(s) of autonomous communication features.

Insurance premiums, rates, ratings, discounts, rewards, special offers, points, programs, refunds, claims, claim amounts, etc. may be adjusted for, or may otherwise take into account, the foregoing functionalities, technologies, or aspects of the autonomous operation features of vehicles, as described elsewhere herein. For instance, insurance policies may be updated based upon autonomous or semi-autonomous vehicle functionality; V2V wireless communication-based autonomous or semi-autonomous vehicle functionality; and/or vehicle-to-infrastructure or infrastructure-to-vehicle wireless communication-based autonomous or semi-autonomous vehicle functionality.

Machine Learning

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as time of day, weather conditions, traffic congestion, interaction between autonomous operation features, or other such variables that influence the risks associated with autonomous or semi-autonomous vehicle operation.

Some embodiments described herein may include automated machine learning to determine risk levels, identify relevant risk factors, optimize autonomous or semi-autonomous operation, optimize routes, determine autonomous operation feature effectiveness, predict user demand for a vehicle, determine vehicle operator or passenger illness or injury, evaluate sensor operating status, predict sensor failure, evaluate damage to a vehicle, predict repairs to a vehicle, predict risks associated with manual vehicle operation based upon the driver and environmental conditions, recommend optimal or preferred autonomous operation feature usage, estimate risk reduction or cost savings from feature usage changes, determine when autonomous operation features should be engaged or disengaged, determine whether a driver is prepared to resume control of some or all vehicle operations, and/or determine other events, conditions, risks, or actions as described elsewhere herein. Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as autonomous vehicle system, feature, or sensor data, autonomous vehicle system control signal data, vehicle-mounted sensor data, mobile device sensor data, and/or telematics, image, or radar data) in order to facilitate making predictions for subsequent data (again, such as autonomous vehicle system, feature, or sensor data, autonomous vehicle system control signal data, vehicle-mounted sensor data, mobile device sensor data, and/or telematics, image, or radar data). Models may be created based upon example inputs of data in order to make valid and reliable predictions for novel inputs.

Additionally or alternatively, the machine learning programs may be trained by inputting sample data sets or certain data into the programs, such as autonomous system sensor and/or control signal data, and other data discuss herein. The machine learning programs may utilize deep learning algorithms primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by the autonomous systems or sensors, and under what conditions those control signals were generated by the autonomous systems or sensors.

The machine learning programs may be trained with autonomous system data, autonomous sensor data, and/or vehicle-mounted or mobile device sensor data to identify actions taken by the autonomous vehicle before, during, and/or after vehicle collisions; identify who was behind the wheel of the vehicle (whether actively driving, or riding along as the autonomous vehicle autonomously drove); identify actions taken by the human driver and/or autonomous system, and under what (road, traffic, congestion, or weather) conditions those actions were directed by the autonomous vehicle or the human driver; identify damage (or the extent of damage) to insurable vehicles after an insurance-related event or vehicle collision; and/or generate proposed insurance claims for insured parties after an insurance-related event.

The machine learning programs may be trained with autonomous system data, autonomous vehicle sensor data, and/or vehicle-mounted or mobile device sensor data to identify preferred (or recommended) and actual control signals relating to or associated with, for example, whether to apply the brakes; how quickly to apply the brakes; an amount of force or pressure to apply the brakes; how much to increase or decrease speed; how quickly to increase or decrease speed; how quickly to accelerate or decelerate; how quickly to change lanes or exit; the speed to take while traversing an exit or entrance ramp; at what speed to approach a stop sign or light; how quickly to come to a complete stop; and/or how quickly to accelerate from a complete stop.

After training, machine learning programs (or information generated by such machine learning programs) may be used to evaluate additional data. Such data may be related to tests of new autonomous operation feature or versions thereof, actual operation of an autonomous vehicle, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, thus, be used to perform part or all of the analytical functions of the methods described elsewhere herein.

Other Matters

In some aspect, customers may opt-in to a rewards, loyalty, or other program. The customers may allow a remote server to collect sensor, telematics, vehicle, mobile device, and other types of data discussed herein. With customer permission or affirmative consent, the data collected may be analyzed to provide certain benefits to customers. For instance, insurance cost savings may be provided to lower risk or risk averse customers. Recommendations that lower risk or provide cost savings to customers may also be generated and provided to customers based upon data analysis. The other functionality discussed herein may also be provided to customers in return for them allowing collection and analysis of the types of data discussed herein.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention. By way of example, and not limitation, the disclosure herein contemplates at least the following aspects:

In one aspect, a computer-implemented method for detecting and responding to an autonomous vehicle collision may be provided. The method may include (1) detecting, by one or more processors, that an autonomous vehicle is operating in a fully autonomous mode and/or without passengers; (2) monitoring, by one or more processors, operation of the autonomous vehicle by receiving and processing operating data associated with a plurality of autonomous operation features while the autonomous vehicle is operating; (3) identifying, by one or more processors, an unusual condition in the operating data, the unusual condition indicative of a likelihood of an incident occurring during operation of the autonomous vehicle; (4) determining, by one or more processors, that a collision has occurred based upon a portion of the operating data associated with the unusual condition; (5) determining, by one or more processors, a response to the collision based upon the received operating data; and/or (6) causing, by one or more processors, the autonomous vehicle to implement the determined response. The method may include additional, less, or alternate actions, including those discussed elsewhere herein.

For instance, the operating data may include sensor data from a plurality of sensors associated with the autonomous operation features and control data generated by the plurality of autonomous operation features. Determining the response to the collision may include determining, by one or more processors, to continue operating the autonomous based upon the received operating data; and causing the autonomous vehicle to implement the determined response may include causing, by one or more processors, the autonomous vehicle to continue operating to a destination. Additionally or alternatively, determining the response to the collision may include determining, by one or more processors, not to continue operating the autonomous vehicle based upon the received operating data; and causing the autonomous vehicle to implement the determined response may include causing, by one or more processors, the autonomous vehicle to cease operation.

The method may include transmitting, via a communication network, (i) image data from one or more image capture devices within the autonomous vehicle and/or (ii) operating data associated with the autonomous vehicle to a computing device associated with a human reviewer; and/or receiving, via the communication network, an indication verifying the determined collision. The response may be determined based upon the received indication verifying the determined collision. The indication verifying the determined collision may include one or more instructions regarding the response to be implemented by the autonomous vehicle. The unusual condition may include a discontinuity in the operating data, a divergence between sensor data from one or more sensors and control data from one or more autonomous operation features, and/or a plurality of sensor malfunctions.

The method may include determining, by one or more processors, that damage to another object has occurred based upon the received operating data; and/or communicating, by one or more processors, information regarding the damage to another object. Additionally or alternatively, the method may include determining, by one or more processors, that the determined collision has resulted in an injury to a person outside the autonomous vehicle; and/or causing, by one or more processors, an emergency action to be implemented. The emergency action may include enabling communication between the person and an emergency assistance representative using (i) one or more speakers disposed within the autonomous vehicle and/or (2) video equipment disposed within the autonomous vehicle and/or operating the autonomous vehicle to convey the person to a facility associated with emergency services. The facility may be a hospital.

The method may include determining, by one or more processors, damage to the autonomous vehicle from the collision. The response may include (i) causing the autonomous vehicle to travel to a vehicle repair facility for repair of the determined damage and/or (ii) causing the autonomous vehicle to resume travel to a destination following repair. Additionally or alternatively, the response may include causing the autonomous vehicle to move out of a traffic lane of a roadway and/or establishing a two-way communication link between the autonomous vehicle and a remote user using input and output components of the autonomous. The remote user may be an owner or operator of the autonomous vehicle, the input component may include a microphone and/or a camera, and the output component may include a speaker and/or a display.

The response may include allowing manual control of the vehicle for a limited distance or duration of operation following the collision. Additionally or alternatively, the response may include granting autonomous control of the vehicle to a remote agent following the collision.

In another aspect, a computer system configured to detect and respond to an autonomous vehicle collision may be provided. The system may include (i) one or more processors; (ii) a communication module adapted to communicate with a plurality of components associated with autonomous operation features of the autonomous vehicle; and/or (iii) a non-transitory program memory coupled to the one or more processors and storing executable instructions. The instructions, when executed by the one or more processors, may cause the computer system to (1) detect that an autonomous vehicle is operating in a fully autonomous mode and/or without passengers; (2) monitor operation of the autonomous vehicle by receiving, via the communication module, and processing operating data associated with the plurality of autonomous operation features while the autonomous vehicle is operating; (3) identify an unusual condition in the operating data, such unusual condition indicative of a likelihood of an incident occurring during operation of the autonomous vehicle; (4) determine that a collision has occurred based upon a portion of the operating data associated with the unusual condition; and/or (5) determine a response to the collision based upon the received operating data; and cause the autonomous vehicle to implement the determined response. The system may include additional, less, or alternate components that perform additional, less, or alternate actions, including those discussed elsewhere herein.

For instance, the operating data may include sensor data from a plurality of sensors associated with the autonomous operation features and control data generated by the plurality of autonomous operation features. To determine the response to the collision, the instructions, when executed, may cause the computer system to determine to continue operating the autonomous vehicle based upon the received operating data; and to cause the autonomous vehicle to implement the determined response, the instructions, when executed, may cause the computer system to cause the autonomous vehicle to continue to a destination. Additionally or alternatively, to determine the response to the collision, the instructions, when executed, may cause the computer system to determine not to continue operating the autonomous vehicle based upon the received operating data; and to cause the autonomous vehicle to implement the determined response, the instructions, when executed, may cause the computer system to cause the autonomous vehicle to cease operation.

The instructions, when executed, may cause the computer system to transmit, via a communication network, (i) image data from one or more image capture devices within the autonomous vehicle and/or (ii) operating data associated with the autonomous vehicle to a computing device associated with a human reviewer; and receive, via the communication network, an indication verifying the determined collision. The response may be determined based upon the received indication verifying the determined collision.

The instructions, when executed, may cause the computer system to determine that the determined collision has resulted in an injury to a person outside the autonomous vehicle; and/or cause an emergency action to be implemented. The emergency action may include enabling communication between the person and an emergency assistance representative using one or more speakers disposed within the autonomous vehicle and/or operating the autonomous vehicle to convey the person to a facility associated with emergency services.

The instructions, when executed, may cause the computer system to determine damage to the autonomous vehicle from the collision. The response may include (i) causing the autonomous vehicle to travel to a vehicle repair facility for repair of the determined damage and/or (ii) causing the autonomous vehicle to resume travel to a destination following repair. Additionally or alternatively, the response may include establishing a two-way communication link between the autonomous vehicle and a remote user using input and output components of the autonomous and/or allowing manual control of the vehicle for a limited distance or duration of operation following the collision.

What is claimed is:

1. A computer-implemented method for detecting and responding to a smart home incident, comprising:
    detecting, by one or more processors, that a smart home is operating in a fully autonomous mode with or without occupants;
    monitoring, by one or more processors, operation of the smart home by receiving and processing operating data associated with a plurality of autonomous operation features while the smart home is operating;
    identifying, by one or more processors, a divergence between sensor data from one or more sensors and control data from one or more autonomous operation features;
    determining, by one or more processors, that an incident has occurred based upon the divergence between the sensor data from the one or more sensors and the control data from the one or more autonomous operation features;
    determining, by one or more processors, a response to the incident based upon the received operating data; and
    causing, by one or more processors, the smart home to implement the determined response.

2. The computer-implemented method of claim 1, further comprising identifying a plurality of sensor malfunctions and wherein determining that an incident has occurred is based on the plurality of sensor malfunctions.

3. The computer-implemented method of claim 1, wherein:
    determining the response to the incident includes determining, by one or more processors, to continue operating the smart home based upon the received operating data; and
    causing the smart home to implement the determined response includes causing, by one or more processors, the smart home to continue operating.

4. The computer-implemented method of claim 1, wherein:
    determining the response to the incident includes determining, by one or more processors, not to continue operating the smart home based upon the received operating data; and
    causing the smart home to implement the determined response includes causing, by one or more processors, the smart home to cease operation.

5. The computer-implemented method of claim 1, further comprising:
    transmitting, via a communication network, (i) image data from one or more image capture devices within the smart home and/or (ii) operating data associated with the smart home to a computing device associated with a human reviewer; and
    receiving, via the communication network, an indication verifying the determined incident,
    wherein the response is determined based upon the received indication verifying the determined incident.

6. The computer-implemented method of claim 5, wherein the indication verifying the determined incident further includes one or more instructions regarding the response to be implemented by the smart home.

7. The computer-implemented method of claim 1, further comprising identifying a discontinuity in the operating data and wherein determining that an incident has occurred is based on the discontinuity in the operating data.

8. The computer-implemented method of claim 1, further comprising:
    determining, by one or more processors, that damage to another object has occurred based upon the received operating data; and
    communicating, by one or more processors, information regarding the damage to another object.

9. The computer-implemented method of claim 1, further comprising:
    determining, by one or more processors, that the determined incident has resulted in an injury to a person outside the smart home; and
    causing, by one or more processors, an emergency action to be implemented.

10. The computer-implemented method of claim 9, wherein the emergency action includes enabling communication between the person and an emergency assistance representative using (i) one or more speakers disposed within the smart home and/or (ii) video equipment disposed within the smart home.

11. The computer-implemented method of claim 1, wherein the response includes establishing a two-way communication link between the smart home and a remote user using input and output components of the smart home.

12. The computer-implemented method of claim 11, wherein:
    the remote user is an owner or operator of the smart home,
    the input component includes a microphone and/or a camera, and
    the output component includes a speaker and/or a display.

13. The computer-implemented method of claim 1, wherein the response includes allowing manual control of the smart home for a limited duration of operation following the incident.

14. The computer-implemented method of claim 1, wherein the response includes granting autonomous control of the smart home to a remote agent following the collision.

15. A computer system configured to detect and respond to a smart home incident, comprising:
    one or more processors;
    a communication module adapted to communicate with a plurality of components associated with autonomous operation features of the smart home; and
    a non-transitory program memory coupled to the one or more processors and storing executable instructions that, when executed by the one or more processors, cause the computer system to:
        detect that a smart home is operating in a fully autonomous mode with or without occupants;
        monitor operation of the smart home by receiving, via the communication module, and processing operating data associated with the plurality of autonomous operation features while the smart home is operating;

identify a divergence between sensor data from one or more sensors and control data from one or more autonomous operation features;

determine that an incident has occurred based upon the divergence between the sensor data from the one or more sensors and the control data from the one or more autonomous operation features;

determine a response to the incident based upon the received operating data; and cause the smart home to implement the determined response.

16. The computer system of claim 15, wherein, the instructions, when executed by the one or more processors, further cause the computer system to:

transmit, via a communication network, (i) image data from one or more image capture devices within the smart home and/or (ii) operating data associated with the smart home to a computing device associated with a human reviewer; and receive, via the communication network, an indication verifying the determined incident, wherein the response is determined based upon the received indication verifying the determined incident.

17. The computer system of claim 16, wherein the indication verifying the determined incident further includes one or more instructions regarding the response to be implemented by the smart home.

18. The computer system of claim 15, wherein the response includes establishing a two-way communication link between the smart home and a remote user using input and output components of the smart home.

19. The computer system of claim 18, wherein:

the remote user is an owner or operator of the smart home, the input component includes a microphone and/or a camera, and the output component includes a speaker and/or a display.

20. A non-transitory computer-readable storage medium storing processor-executable instructions, that when executed cause one or more processors to:

detect that a smart home is operating in a fully autonomous mode with and/or without occupants;

monitor operation of the smart home by receiving, via a communication network, and processing operating data associated with a plurality of autonomous operation features while the smart home is operating;

identify a divergence between sensor data from one or more sensors and control data from one or more autonomous operation features;

determine that an incident has occurred based upon the divergence between the sensor data from the one or more sensors and the control data from the one or more autonomous operation features;

determine a response to the incident based upon the received operating data; and cause the smart home to implement the determined response.

\* \* \* \* \*